(12) United States Patent
Galloway

(10) Patent No.: US 7,739,767 B2
(45) Date of Patent: Jun. 22, 2010

(54) PIGGING SYSTEM

(75) Inventor: Tod R. Galloway, Appleton, WI (US)

(73) Assignee: Galloway Company, Neenah, WI (US)

( * ) Notice: Subject to any disclaimer, the term of this patent is extended or adjusted under 35 U.S.C. 154(b) by 0 days.

(21) Appl. No.: 11/588,556

(22) Filed: Oct. 26, 2006

(65) Prior Publication Data

US 2007/0110864 A1 May 17, 2007

Related U.S. Application Data

(60) Provisional application No. 60/730,757, filed on Oct. 27, 2005.

(51) Int. Cl.
B08B 9/04 (2006.01)
(52) U.S. Cl. .................... 15/104.061; 15/3.5
(58) Field of Classification Search .............. 15/3.5, 15/51, 104.061, 104.062; 137/268, 15.07, 137/242; 134/8, 10
See application file for complete search history.

(56) References Cited

U.S. PATENT DOCUMENTS

| | | | |
|---|---|---|---|
| 1,871,798 A | 8/1932 | King | |
| 2,965,125 A | 12/1960 | Osborne et al. | |
| 3,047,020 A | 7/1962 | Barrett | |
| 3,108,012 A | 10/1963 | Curtis | |
| 3,135,278 A | 6/1964 | Foord et al. | |
| 3,425,083 A | 2/1969 | Wennerberg et al. | |
| 3,428,489 A * | 2/1969 | Gentry, Jr. ..................... | 134/8 |
| 3,562,014 A | 2/1971 | Childers et al. | |
| 3,665,954 A | 5/1972 | McNeal et al. | |
| 3,779,270 A * | 12/1973 | Davis ......................... | 137/268 |
| 3,883,431 A | 5/1975 | Ishii et al. | |
| 4,016,621 A * | 4/1977 | Slegers et al. .......... | 15/104.062 |
| 4,113,890 A | 9/1978 | Long | |
| 4,198,293 A | 4/1980 | Ogawa et al. | |
| 4,447,925 A | 5/1984 | Riedel | |
| 5,072,476 A | 12/1991 | Bersch | |
| 5,433,236 A * | 7/1995 | Zollinger et al. ............... | 137/1 |
| 5,842,816 A * | 12/1998 | Cunningham ............... | 405/170 |
| 5,890,531 A | 4/1999 | Gairns et al. | |
| 5,891,260 A * | 4/1999 | Streets et al. .................. | 134/8 |
| 5,927,319 A * | 7/1999 | Burkhalter .................. | 137/268 |
| 7,003,838 B2 * | 2/2006 | Cunningham ................. | 15/3.5 |

FOREIGN PATENT DOCUMENTS

EP 0682993 11/1995

* cited by examiner

Primary Examiner—Dung Van Nguyen
(74) Attorney, Agent, or Firm—Thomas D. Wilhelm; Wilhelm Law, S.C.

(57) ABSTRACT

A liquid transport system has a number of access points, referred to generally as nodes, connected to an endless loop of piping such that liquid flowing in the system, to move the liquid from one node to another, flows in two generally discrete paths from a source node to a destination node. In general, any node can be associated with either a liquid source or a liquid destination. A source in a first liquid transfer can act as a destination in a subsequent liquid transfer, and vice versa. A single pigging system can be used to clean substantially the entirety of the liquid transport system among all sources and all destinations, except for leads from the nodes to the sources and/or destinations. The liquid transport system can be cleaned in place, thus to clean all of the piping which runs between the respective nodes in the liquid transport system.

43 Claims, 45 Drawing Sheets

US 7,739,767 B2

PIGGING SYSTEM

CROSS REFERENCE TO RELATED APPLICATIONS

This application is a Non-Provisional Application, claiming priority under 35 U.S.C. 119(e) to U.S. Provisional Application Ser. No. 60/730,757, filed Oct. 27, 2005, which is incorporated herein by reference in its entirety.

BACKGROUND

This invention relates to liquid transport systems, and especially to sequential transportation of multiple products through a single transport system defined by one or more pipes or tubes. More specifically, this invention relates to distribution of liquids from one or more source nodes in the liquid transport system to one or more destination nodes in the liquid transport system.

This invention relates especially to removing and/or cleaning product liquid from the pipeline system upon completion of the transport of one product through the pipeline system, and before commencing transport of the next product through the pipeline system.

This invention further relates to methods and apparatus for cleaning in place a pipeline system which transports food or other liquid product from a source node in the pipeline system to a destination node in the pipeline system.

Sanitation in the food processing industry is critical to maintaining purity of the food supply. Accordingly, where more than one food product is transported through a pipeline system, it is necessary to clean the pipeline system between the transport of a first food product and the transport of a second different food product through the same pipeline system.

Where the frequency of changes between different food products is infrequent, it is common to disassemble the pipeline system and clean each component individually. Where the frequency of changes is relatively more frequent, the incremental cost of such disassembly and cleaning between products can be prohibitively costly as to a given product, which may dictate against the cost effectiveness of producing relatively smaller quantities of a given product whereby other aspects of the production/distribution system may be adversely affected.

One solution to the process of cleaning the pipeline, without disassembly of the pipeline system, is to install a pigging system whereby a pig is forced through the pipeline from an entrance locus to a destination locus in the pipeline. As the pig is forced through the pipeline, the pig cleans residual material from the pipeline thus to leave the pipeline system generally cleaned and ready to receive the next product.

Pigging systems are generally known for use between the transport of related products in a pipeline system. Pigging systems are represented generally by U.S. Pat. No. 3,665,954 McNeal et al. McNeal et al teach pushing a pig through a relatively shorter pipeline, from a source node 15 to a destination node 9, using compressed air, thus to push a final portion of the product to the destination node, and accordingly into the representative truck. The pipeline is thus cleaned of product, and is empty, and the pig is returned along the same pipeline to a starting locus beyond the source node, and out of the line of travel of the product liquid.

Another pigging system, useful for cleaning a portion of a pipeline which is used in transporting petroleum products sequentially, is taught in U.S. Pat. No. 3,135,278 Foord et al. Foord et al teach use of a closed loop system of piping 1, 2, and 11 to transport liquid from a first tank to a destination. After completion of transporting the first product from the source node to the destination node, a pig is forced between first and second traps by a second product liquid, to clean a portion, but not substantially all, of the first product from the pipeline system. Indeed, a portion of the first product liquid remains in the pipeline system, in one or more main paths by which the second liquid is transported through the pipeline system to the destination node. Since less than substantially all of the first product liquid is removed from the pipeline system by the pigging operation, the second product liquid ultimately mixes with the remainder portion of the first product as the second product is being transported to the destination node. While Foord et al provide generally for a partial removal of that portion of the first product which remains in the pipeline after completion of the first product transport step, Foord et al do not provide for any cleaning of the pipeline before introduction of the second product into the pipeline system. Neither do Foord et al provide for cleaning of substantially all of the first product from the pipeline system before introduction of the second product into the pipeline system, and transport of the second product from a source node to a destination node.

It is an object of this invention to provide liquid transport systems which provide closed loop pipelines having multiple source/destination nodes connected to an endless loop of piping, wherein a first product liquid can be substantially cleaned from the closed loop of piping before a second product liquid is introduced into the closed loop of piping.

It is an object to provide liquid transport systems which contain at least product source/destination nodes connected to the endless loop of piping.

It is another object to provide such endless loop of piping with a cleaning system comprising at least one of a compressed gas inlet and a non-product liquid inlet, and a cleaning manifold which is disposed between first and second pig launchers, and wherein the pig launchers are between the cleaning manifold and all except no more than one of the source/destination nodes.

It is yet another object to provide such endless loop of piping wherein each product source/destination node is connected to a single product source structure or a single destination structure outside the endless loop of piping.

It is still another object to provide such endless loop of piping wherein a node control valve is disposed at or adjacent each product source/destination node, less no more than one node, wherein the node control valves are effective to control flow of liquid through the respective nodes and into or out of the endless loop of piping.

SUMMARY

In a first family of embodiments, the invention comprehends a liquid transport system, comprising a closed loop pipeline defining an endless loop of piping; at least three product source/destination nodes, connected to the endless loop of piping, including at least one node which can function as a product source node and at least one node which can function as a product destination node; and first and second pig launchers associated with the closed loop pipeline.

In some embodiments, at least part of a liquid flow stream, flowing from a first product source/destination node to a second product source/destination node, in the endless loop of piping, flows past at least one other product source/destination node.

In some embodiments, a liquid flowing from a first product source/destination node to a second product source/destination node, in the endless loop of piping, moves as first and second different liquid flow streams traversing first and second respective different portions of the endless loop of piping.

In some embodiments, liquid flowing through the endless loop of piping can flow through the pig launchers.

In some embodiments, a liquid flowing from a first product source/destination node to a second product source/destination node flows in a split path so as to approach the second product source/destination node from at least two different directions.

In some embodiments, the liquid transport system further comprises a clean-in-place cleaning system, adapted to clean substantially an entirety of the endless loop of piping.

In some embodiments, the cleaning system includes at least one of a compressed gas inlet and a non-product liquid inlet.

In a second family of embodiments, the invention comprehends a liquid transport system, comprising a closed loop pipeline defining an endless loop of piping; at least first and second product source/destination nodes connected to the endless loop of piping, including at least one node which can function as a product source node and at least one node which can function as a product destination node; first and second pig launchers associated with the closed loop pipeline; and a cleaning system comprising at least one of a compressed gas inlet and a non-product liquid inlet, the cleaning system comprising a cleaning manifold which is disposed between the first and second pig launchers, the first and second pig launchers being disposed between the cleaning manifold and all except no more than one of the product source/destination nodes.

In some embodiments, the liquid transport system further comprises a compressed air outlet and/or non-product liquid outlet associated with the cleaning manifold.

In some embodiments, the liquid transport system further comprises at least a third product source/destination node connected to the endless loop of piping.

In a third family of embodiments, the invention comprehends a liquid transport system, comprising a closed loop pipeline defining an endless loop of piping; at least first and second product source/destination nodes connected to the endless loop of piping, including at least one node which can function as a product source node and at least one node which can function as a product destination node; first and second pig launchers interactive with the closed loop pipeline, each product source/destination node being connected to a single product source structure or to a single product destination structure, which product source structure or product destination structure is outside the endless loop of piping.

In some embodiments, the liquid transport system further comprises a clean-in-place cleaning system, adapted to clean the entirety of the endless loop of piping.

In a fourth family of embodiments the invention comprehends a liquid transport system, comprising a closed loop pipeline defining an endless loop of piping; at least first and second product source/destination nodes connected to the endless loop of piping, including at least one node which can function as a product source node and at least one node which can function as a product destination node; first and second pig launchers associated with the closed loop pipeline; and a node control valve disposed at or adjacent each product source/destination node, less no more than one node, the node control valves being adapted to control flow of fluid through the nodes and into or out of the endless loop of piping, including to and/or from at least one of a product source structure or a product destination structure.

In some embodiments, the node control valves do not otherwise substantially control flow of liquid in the endless loop of piping.

In some embodiments, the node control valves are disposed outside the endless loop of piping such that liquid flowing through the endless loop of piping does not flow through the node control valves.

In some embodiments, a control valve is disposed at or adjacent each node and is adapted to control liquid flow in a conduit which is connected to the endless loop of piping, and the control valves are not otherwise adapted to substantially control flow of liquid in the endless loop of piping.

In some embodiments, one node is connected to at least one such product source structure and/or product destination structure, the one node being disposed between the first and second pig launchers, the first and second pig launchers collectively being disposed between the one node and the remaining nodes.

In some embodiments, the liquid transport system further comprises a clean-in-place cleaning system, adapted to clean an entirety of the closed loop pipeline, the cleaning system is disposed between the first and second pig launchers, and the first and second pig launchers are disposed between (i) the cleaning system and (ii) the remaining nodes, optionally between (i) the cleaning system and the one node, and (ii) the remaining nodes.

Figure 1:
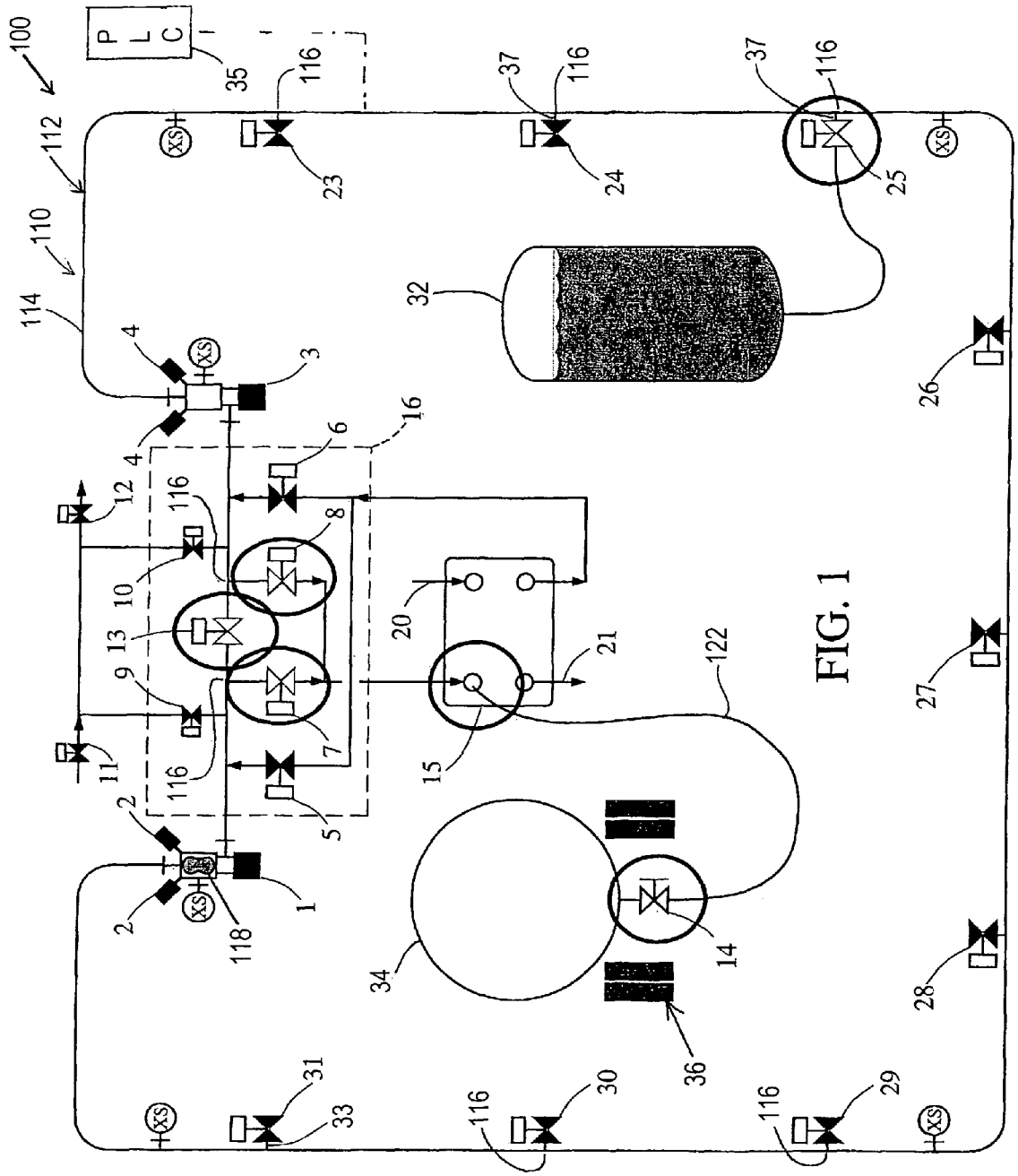
FIGS. 1-8 illustrate a first embodiment of pigging systems of the invention where product can flow from any source node in the endless loop of piping to a single destination node such as leading to a tank or truck.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Referring to FIG. 1, a pigging system 100 of the invention is embodied in a liquid transport system 110 which includes a closed loop pipeline 112 which defines an endless loop of piping 114, sometimes referred to herein as a header or manifold. Multiple source/destination nodes 116 are located at various locations about the endless loop of piping. At least one of the nodes 116 is capable of functioning as a source node, and at least one of the nodes 116 is capable of functioning as a destination node.

As used herein, a "node" is a locus, along the closed loop pipeline where a product source/destination can access the closed loop pipeline such as through a joining e.g. product-carrying, conduit 37. Individual segments of the closed loop pipeline can thus be defined between the joining conduits. Typically, the joining conduit 37 has a valve close to the node which enables the user to segregate liquid in the joining conduit from the closed loop pipeline. The node is a 2-dimensional concept, defined at the joinder of two intersecting conduits. Accordingly, a liquid flowing in the closed loop pipeline, but not into or out of the joining conduit does not pass "through" the node. Rather, the liquid passes "through" the node only to the extent the liquid passes from the adjoining conduit 37 into the closed loop pipeline, thus functioning as a "source", or from the closed loop pipeline into the adjoining conduit, thus functioning as a "destination".

First and second pig launchers 1 and 3 are incorporated into the endless loop of piping. Endless loop of piping 114 can be described as a closed loop which has an imaginary beginning at pig launcher 3. The endless loop progresses from pig launcher 3 in a clockwise direction past a first position sensor "XS", past a first node 116 adjacent valve 23, past a second node 116 adjacent valve 24, past a third node 116 adjacent valve 25, past a second position sensor "XS", past a fourth node 116 adjacent valve 26, past a fifth node 116 adjacent valve 27, past a sixth node 116 adjacent valve 28, past a third position sensor "XS" between nodes 116 adjacent valves 28 and 29, past a seventh node adjacent valve 29, past an eighth node 116 adjacent valve 30, past a ninth node 116 adjacent valve 31, past a fourth position sensor "XS" after valve 31, through pig launcher 1, through valve 13, and thence back to the imaginary starting point at pig launcher 3.

Still referring to FIG. 1, of all the valves illustrated, the only valve through which product liquid flows in the illustrated embodiment, in traversing the endless loop of piping, is valve 13. All of the remaining valves 26-31 are in adjoining conduit piping connections which divert fluid from the endless loop, or feed fluid to the endless loop. For example, valve 25 connects endless loop 114 to source tank 34 on truck 36. With cooperative valve settings, product liquid is pumped from source tank 32 through valve 25 into endless loop 114, via endless loop 114, through open valves 7 and 8, thence through valve 14 and into the tank on truck 36.

Pumping of product liquid is typically powered by one or more pumps located at or adjacent the outlet of a source tank such as tank 32, although pumps can be located at other locations. Pumps are not contemplated in the endless of loop of piping which is traversed by pig 118. While no pumps are shown in the drawings, pumps are inherently contemplated with any statement of pumping of liquid unless the liquid is otherwise pressurized such as by compressed gas. Since no pumps are contemplated in the endless loop of piping, and since the product liquid is moved from a source receptacle to a destination by a pump or other means of creating a pressure differential, each source/destination receptacle is typically associated with its own pump or pumps which move product liquid from the respective source tank to and through the endless loop of piping to the selected destination tank.

As illustrated in FIG. 1, pigging system 110 further comprises a cleaning system 16, compressed air supply valve 11, and compressed air exhaust valve 12. Valves 7 and 8 in the cleaning system are connected to hook-up panel 15 which is, in turn connected to a tank truck 36 at valve 14. As described in greater detail hereinafter, at least valves 7 and 8 of cleaning system 16 serve both to convey product liquid to the truck through valve 14 and to assist in cleaning out the line between valves 7, 8 and truck 34.

Pig launcher 1 includes first and second retaining pins 2 which capture and/or retain a pig 118, as appropriate in pig launcher 1. Pig launcher 3 includes third and fourth retaining pins 4 which capture and/or retain pig 118, as appropriate in pig launcher 3.

Pigging system 100, in all embodiments, further includes suitable computer controls, depicted as a programmable logic computer (PLC) 35.

Suitable communications cables are connected between PLC 35 and the various system components so as to enable PLC 35 to communicate with, and control, the various sensors and action components of system 100. Sensors include, without limitation, the various position sensors "XS". Actions include, without limitation, turning valves on and off, turning pumps on and off, and inserting and withdrawing pig launcher retaining pins.

Cleaning system 16 includes, in addition to left drain valve 7 and right drain valve 8, left manifold fill valve 5, right manifold fill valve 6, left manifold purge valve 9, and right manifold purge valve 10.

Throughout the drawings, as to each embodiment, each subsequent FIGURE represents a subsequent step in transport of product liquid or in cleaning of product liquid from the endless loop of piping, and indeed from substantially all of the liquid transport system, including cleaning of residual product liquid from cleaning system 16. In that regard, each change of e.g. a valve setting, change of condition of a pig launcher, change of a piping configuration on hook-up panel 15, is noted by a bold-line circle or ellipse about the respective element in the respective FIGURE.

In the embodiments illustrated in FIGS. 1-8, valves 23-31 are source tank valves, manifold valves 7 and 8 function as intermediary flow control valves, and valve 14 is a destination valve. Accordingly, in the embodiments of FIGS. 1-8, the nodes 116 adjacent valves 23-31 function as source nodes, and the connections between valves 7-8 and manifold 114 function as destination nodes.

Typically each valve 23-31 is connected to a single source tank, though connection to multiple source tanks is contemplated. In some instances, one or more of valves 23-31 need not be connected to any tank for a given operation. However, at least one source node and at least one destination node needs to be connected to the endless loop of piping in order for the product liquid transport system to function as intended e.g. to transport product liquid.

The number of valves 23-31, and corresponding maximum number of tanks, which are connected to the endless loop of piping, is not limited to the number of valves shown. Accordingly, the number of source valves can be more or less than the number shown. Similarly, the number of source tanks connected to a given endless loop of piping can be more or less than the number of valves shown in FIGS. 1-8. However, typically, the number of source tanks connected to the endless loop of piping is not greater than the number of source valves connected to the endless loop of piping.

The embodiment illustrated in FIGS. 1-8 is designed and configured so that product liquid can be transported/pumped from any of the source tanks which are connected to valves 23-31 along the path of travel of a pig 118, into the tank 34 on tank truck 36, which is not along the path of travel of such pig 118.

In setting up the tank-to-tank transfer of product liquid as illustrated in FIG. 1, a hose 122 is connected between hook-up panel 15 and truck valve 14. Valve 25, adjacent tank 32, and by-pass valve 13 are opened. Left and right manifold drain valves 7 and 8 are opened.

Throughout this teaching, valves shown with the butterfly element in solid black are closed valves. Valves shown only in line drawing format are open valves.

Dark circles and ellipses surround valves 7, 8, 13, 14, and 25, and the hook-up locus on hook-up panel 15, to indicate the actions being taken at set-up of the tank-to-tank transfer. Similar circle-and-ellipse indications in subsequent drawings indicate actions being represented in the respective drawings.

Figure 2:
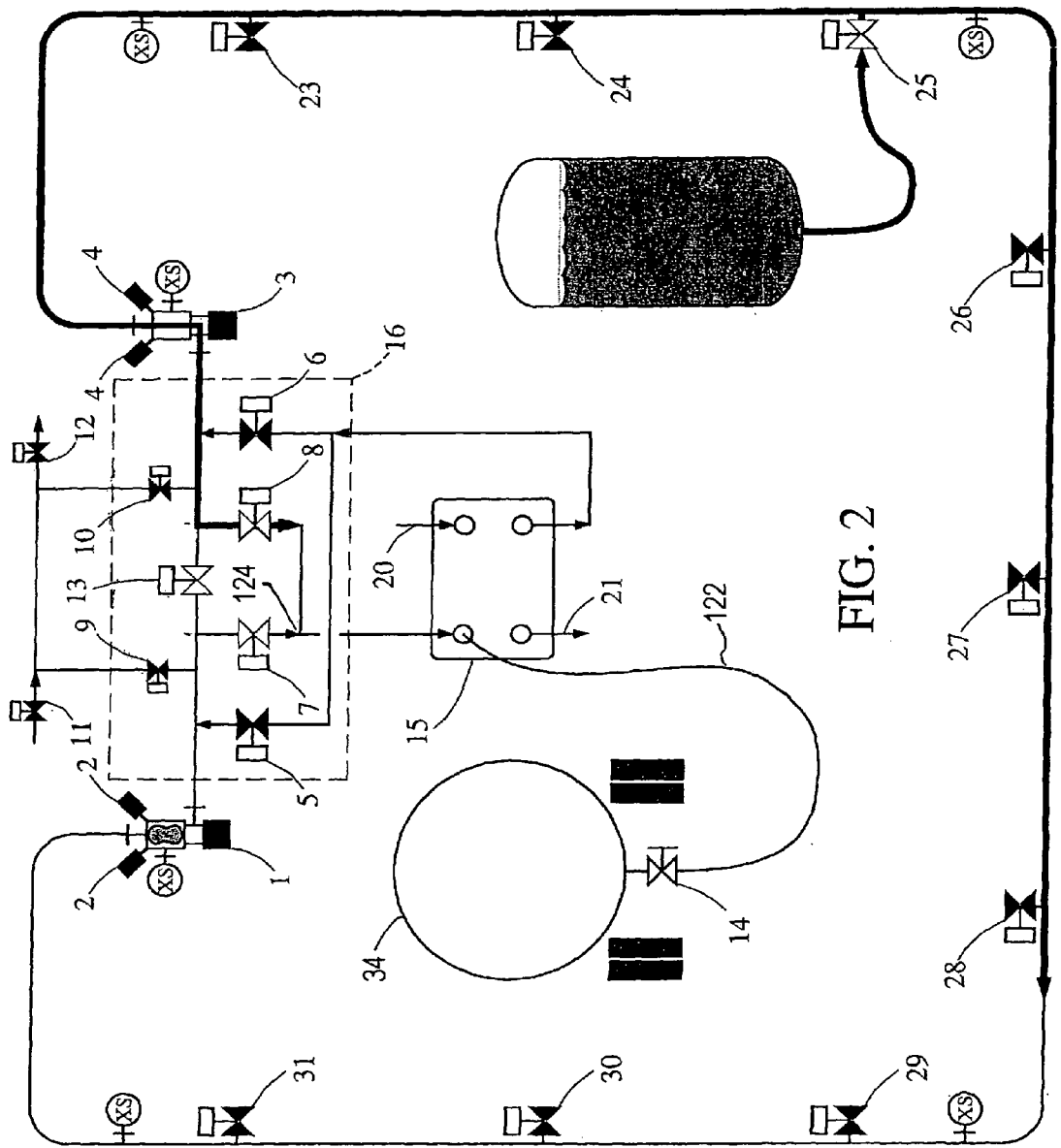

Returning to FIGS. 1-8, and now referring specifically to FIGS. 2 and 3, product liquid is pumped from tank 32 through open valve 25 into the endless loop of piping. As the product liquid enters the endless loop of piping, the product liquid begins to flow simultaneously in both directions as indicated in FIG. 2, both clockwise and counter-clockwise, around the endless loop of piping toward first and second exit nodes of the endless loop, including through pig launchers 1 and 3. Both flow streams ultimately reach the exit nodes 116 adjacent valves 7 and 8, from different, indeed opposing, directions. The product liquid exits the endless loop of piping through valves 7 and 8, whereupon the liquid flow is joined into a single stream at a joinder locus 124 downstream of valves 7 and 8.

In general, throughout the drawings, at locations where liquid product is traversing a section of piping, the corresponding section of piping is shown in expanded dark outline as adjacent and between the nodes at valves 23-28 as well as from valve 23 through pig launcher 3, in FIG. 2.

Figure 3:
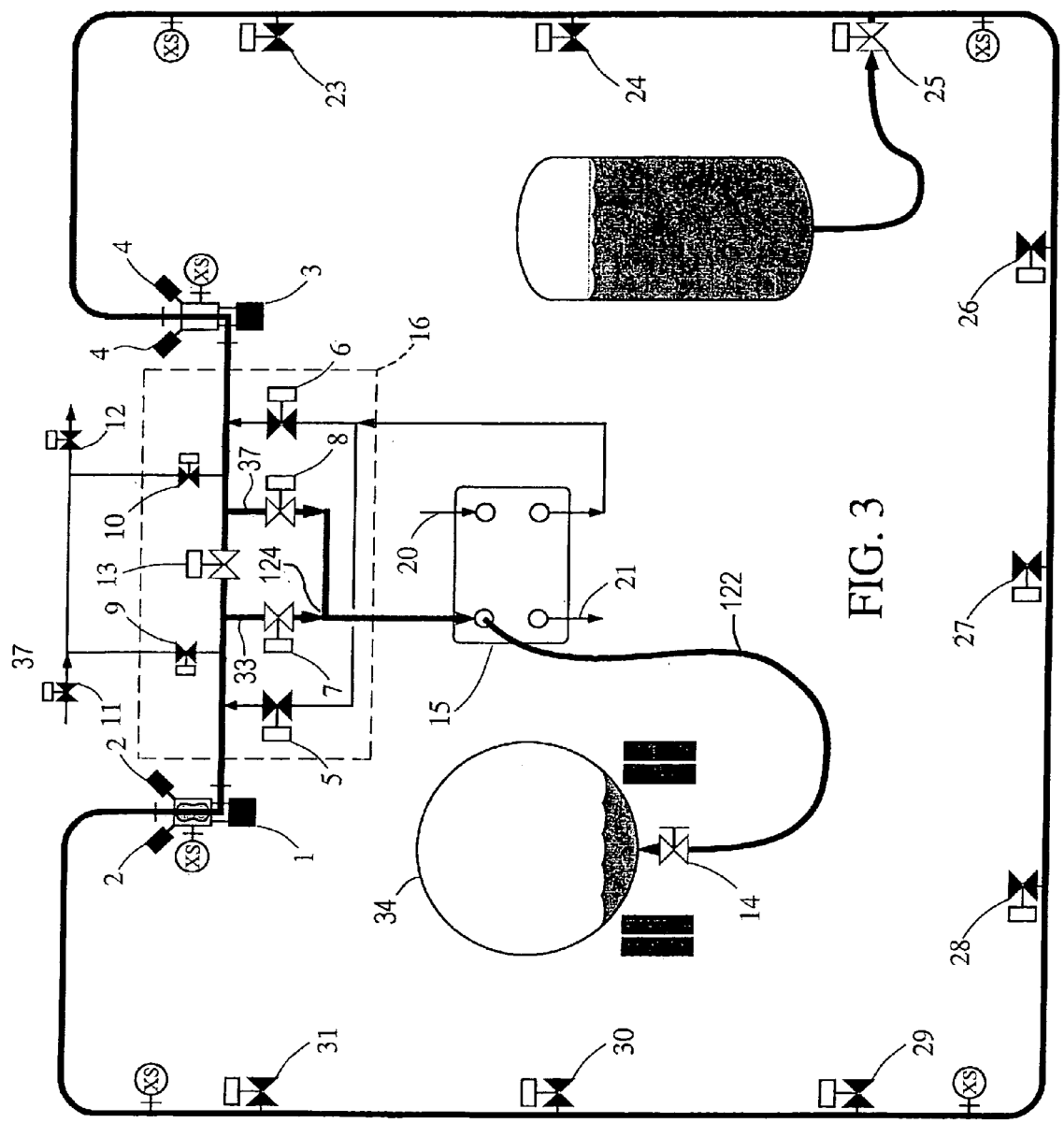

As desired, all of the flowing liquid can exit endless loop 114 through either valve 7 or valve 8. Whether all of the liquid flows through one of valves 7 or 8, or whether the liquid flow stream progresses in parallel through both valves 7 and 8, the product flows from valves 7 and/or 8 to hook-up panel 15, and from hook-up panel 15 through hose 122 to truck valve 14, and thence into the tank on truck 34, until the transfer is complete, all as indicated in FIG. 3 where the liquid level is seen to be rising in the tank on truck 36.

Figure 4:
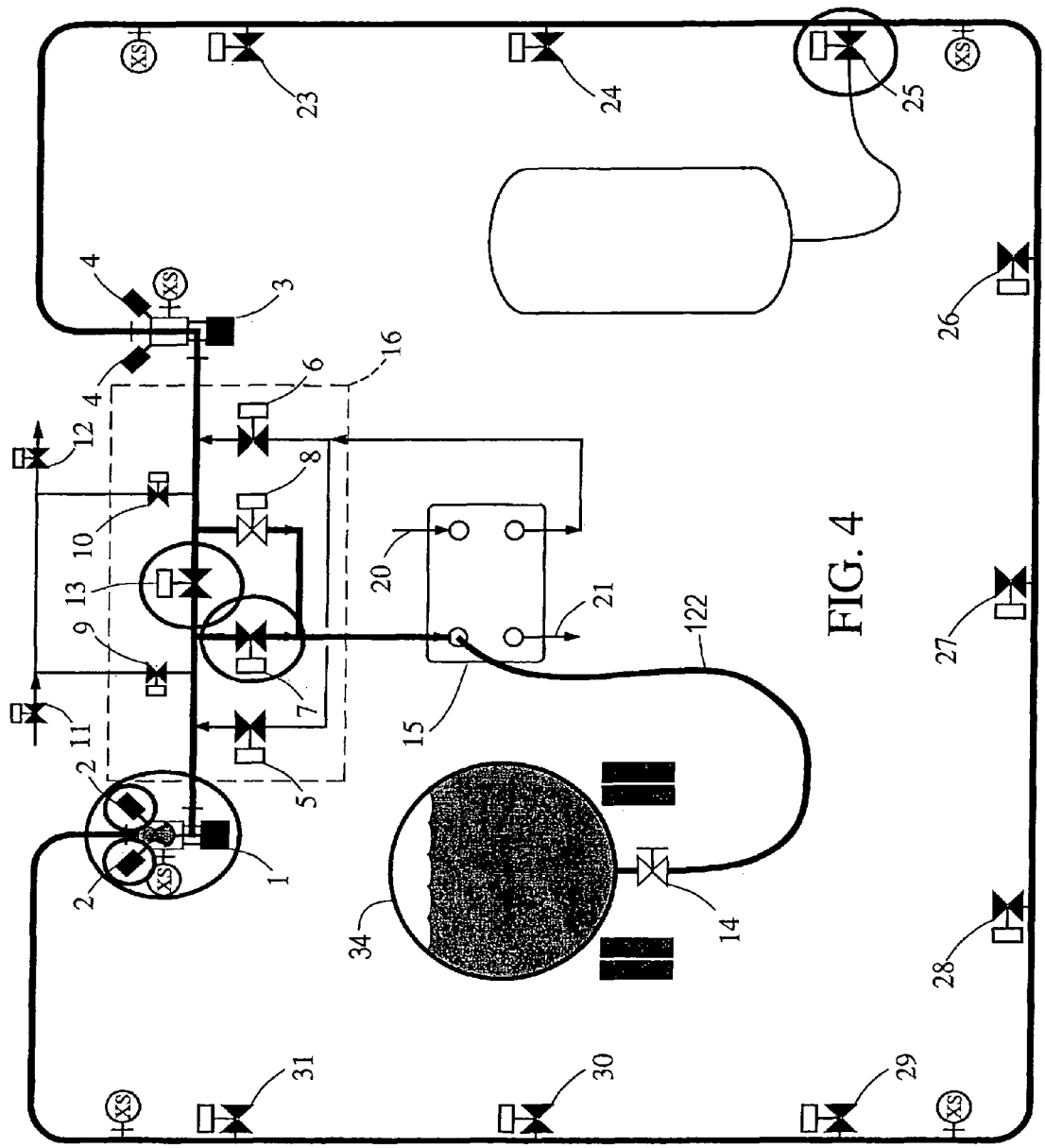

As indicated in FIG. 4, when the transfer of liquid is complete, valve 25 adjacent tank 32 is closed, left manifold valve 7 is closed, and manifold by-pass valve 13 is closed. Pins 2 of left pig launcher 1 are retracted and pig 118 is mechanically pushed out of left pig launcher 1 and into the endless loop piping manifold. Closure of valves 7, 13, and 25, and movement of pins 2 and pig 118 are indicated in FIG. 4 by corresponding circles and ellipses about the respective acting elements. It should be noted that pig launcher 3 is empty at this time.

Figure 5:
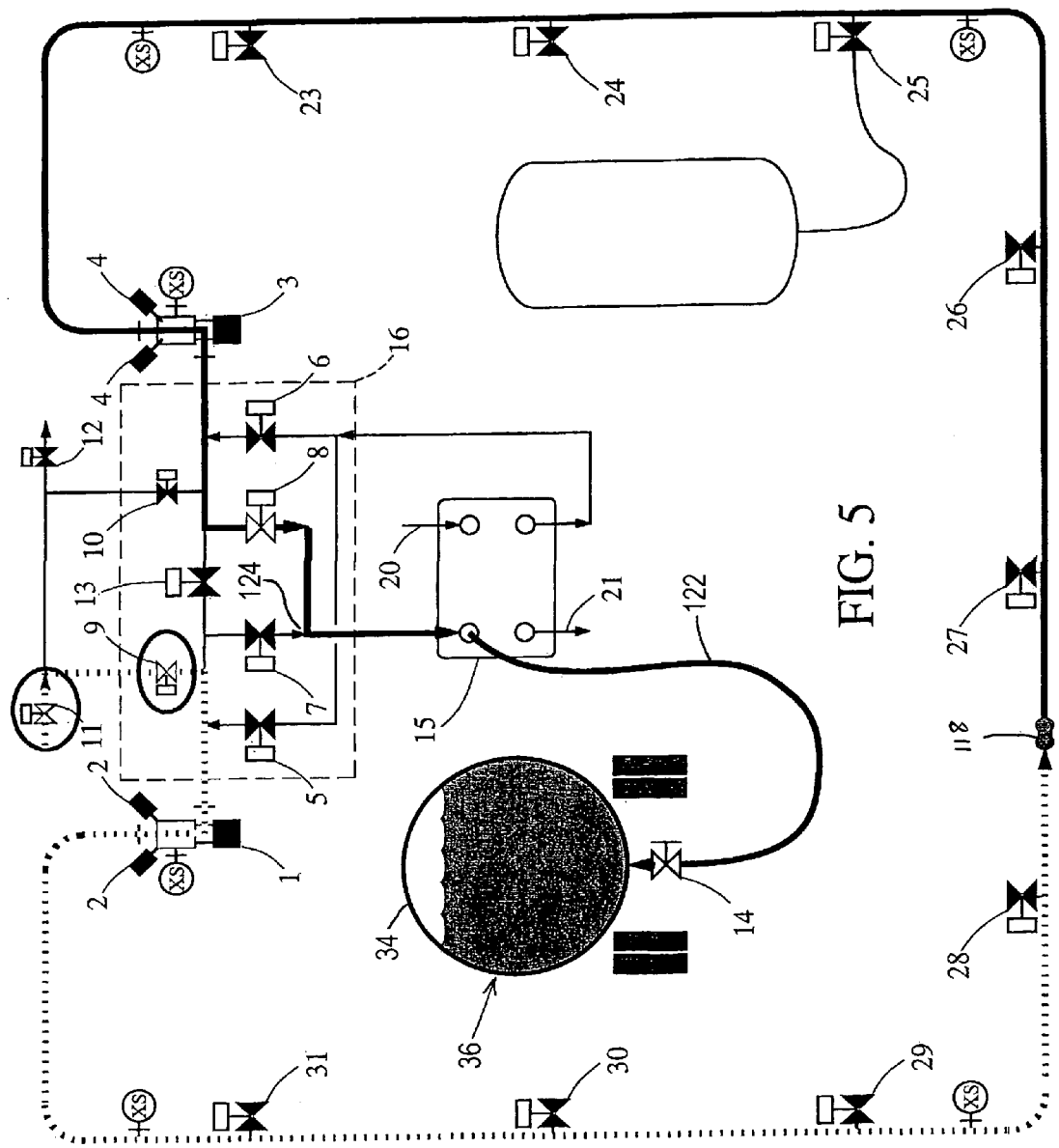

Referring to the actions indicated in FIG. 5 by the circled elements, left manifold purge valve 9 and compressed air supply valve 11 are opened and compressed air is fed into the manifold. As suggested by FIG. 5, the compressed air pushes the pig counter-clockwise around the manifold. In general, throughout the drawings, at locations where compressed air is being used in piping, the corresponding section of piping is shown with a spaced broken line as adjacent and between valves 28-31 in FIG. 5, and elsewhere.

As the pig moves about the manifold, the pig pushes the product liquid, which is in the endless loop of piping, ahead of the pig. It will be understood by those skilled in the art that the pig is sized and configured to generally fit snugly in the pipeline of manifold 114 such that the resilient e.g. rubber material of the pig is slightly deformed so as to scrape and clean product liquid from the pipeline as the pig moves along the manifold. Accordingly, pig 118 moves the product liquid ahead of the pig as the pig moves about the endless loop of the pipeline.

Figure 6:
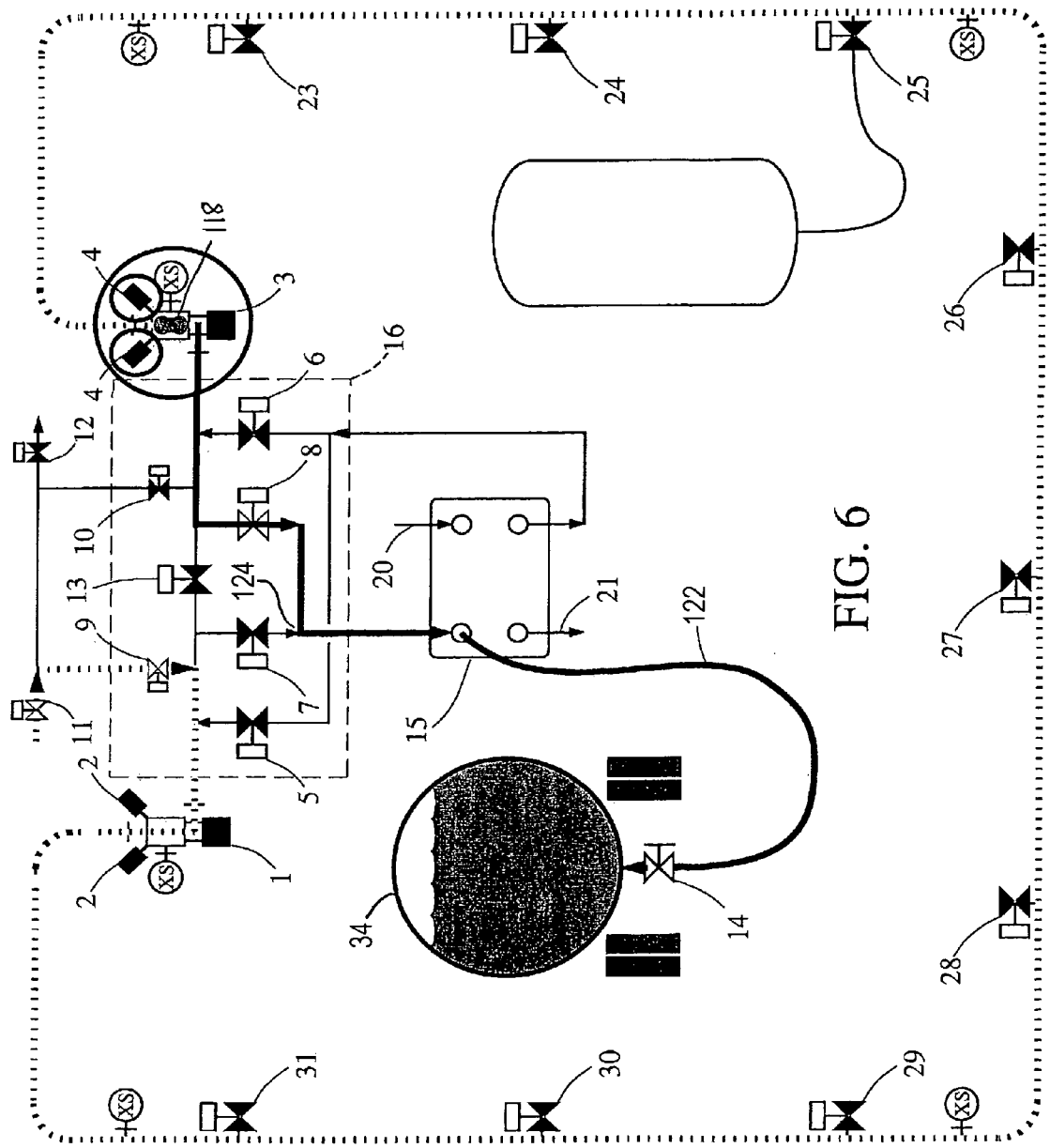

The product which is pushed ahead of pig 118 moves in the direction of least resistance, through right manifold drain valve 8, thence to hoop-up panel 15, thence to valve 14, and thence to tank 34 on truck 36. As indicated in FIG. 6, the compressed air continues to push the pig through the pipeline and into right pig launcher 3. Retaining pins 4 are then activated to capture and retain pig 118 in pig launcher 3.

Figure 7:
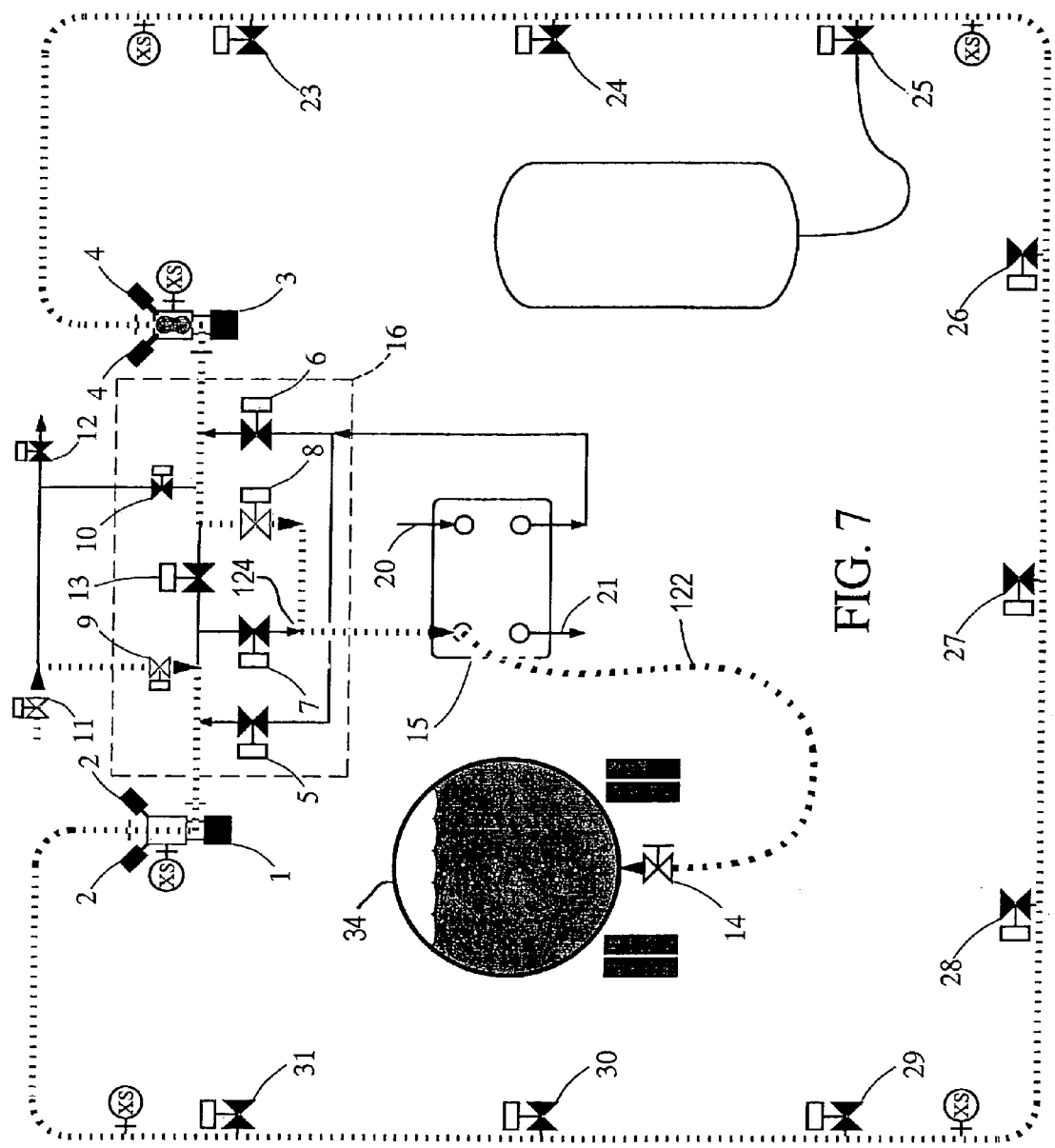
Figure 8:
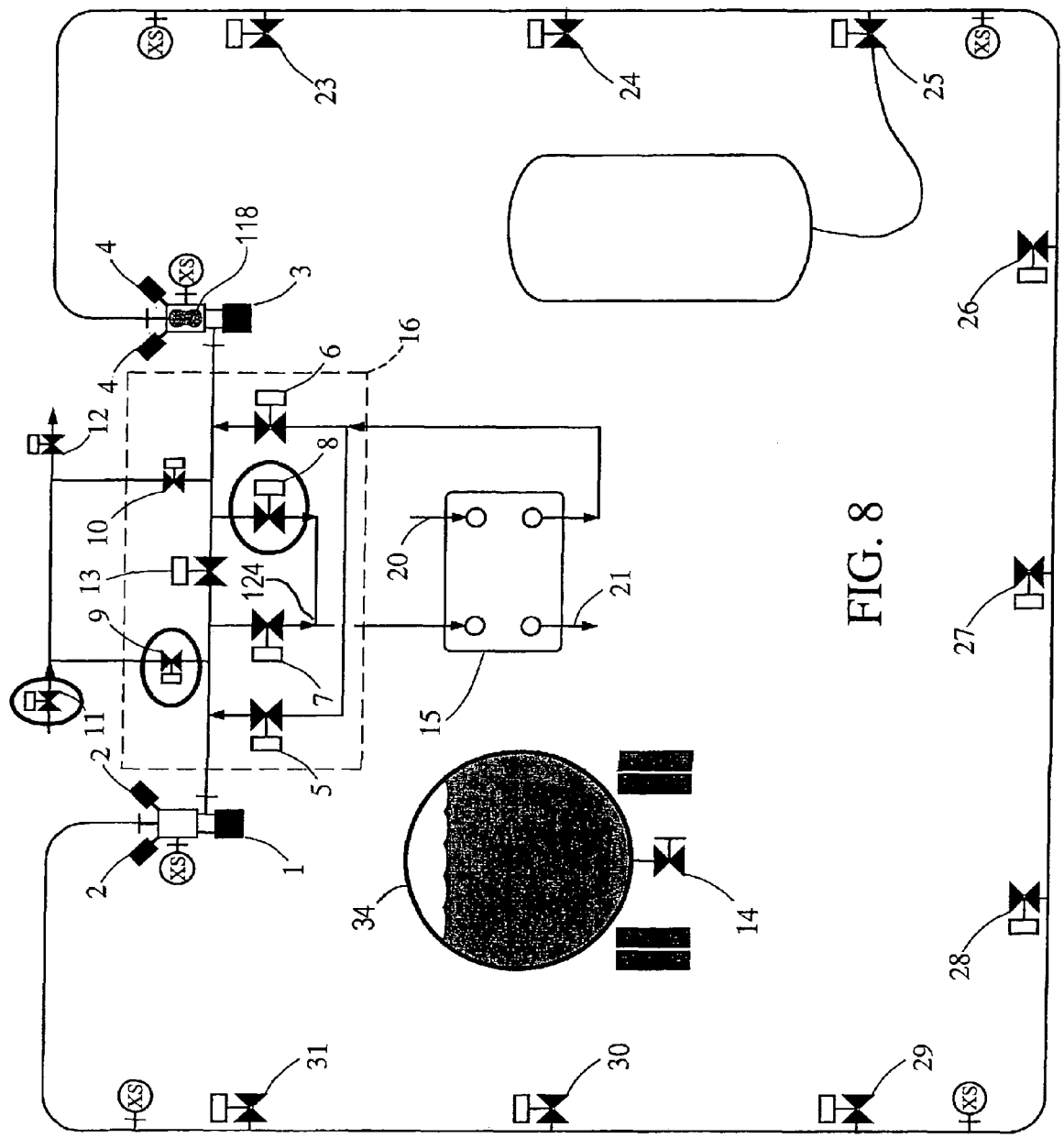

As illustrated in FIG. 7, continued expression of compressed air through valves 9 and 11, through the length of the pipeline, through pig launcher 3, and into the remaining portions of the open path of travel in the pipe, pushes remaining portions of the product liquid from the respective portions of the conduits, and from the hose, which extend between valve 8 and the tank on truck 36, and thus generally purges the product liquid from the liquid transport system. In the conduit between pig launcher 3 and truck 36, removal of product liquid from the conduits depends on the combination of any gravity drain, as well as on the force and flow velocity of the compressed air which is being fed into the pipeline system, in combination with the viscosity and other flow characteristics of the specific product liquid.

Once the purging of product liquid from the transport system has been completed, the system is shut down or otherwise readied for the next liquid transfer. The system is shut down and/or readied for the next liquid transfer by closing compressed air valve 11, which closes off the compressed air source from the pipeline, whereupon air pressure bleeds from the pipeline as into the tank at truck 36 or through a pressure relief valve, either in tank 34 of in the pipeline system. Manifold purge valve 9 is then closed, valve 14 is closed, and hose 122 is disconnected from truck 36. The truck is now disconnected from the transport system and is free to depart to its destination.

The transport system is now empty and ready for a second liquid transfer. After such second liquid transfer, the pig is pushed by compressed air around the manifold in a clockwise direction, from pig launcher 3, and is caught and held in pig launcher 1 as part of the system cleaning function.

This completes the general illustration of the use of the liquid transport system 110 of FIGS. 1-8 to transfer liquid from any one or more of the tanks associated with valves 23-31, thus with manifold 114, to a tank/truck which connects to the manifold between pig launchers 1 and 3 and at a location in manifold 114 which is not traversed by pig 118. Where liquid is transferred from more than one tank at valves 23-31 to truck 36, the liquid is preferably transferred from a first one of the tanks, and subsequently fed from a second tank, with suitable valve openings and closures between the uses of the respective source tanks to ensure that liquid from a first one of the tanks is not inadvertently fed to the other tank. However, in some instances, such as where the product liquid is the same in both source tanks, multiple source tanks can simultaneously feed into the closed loop pipeline 112 and thereby facilitate a shorter overall transfer time.

Figure 9:
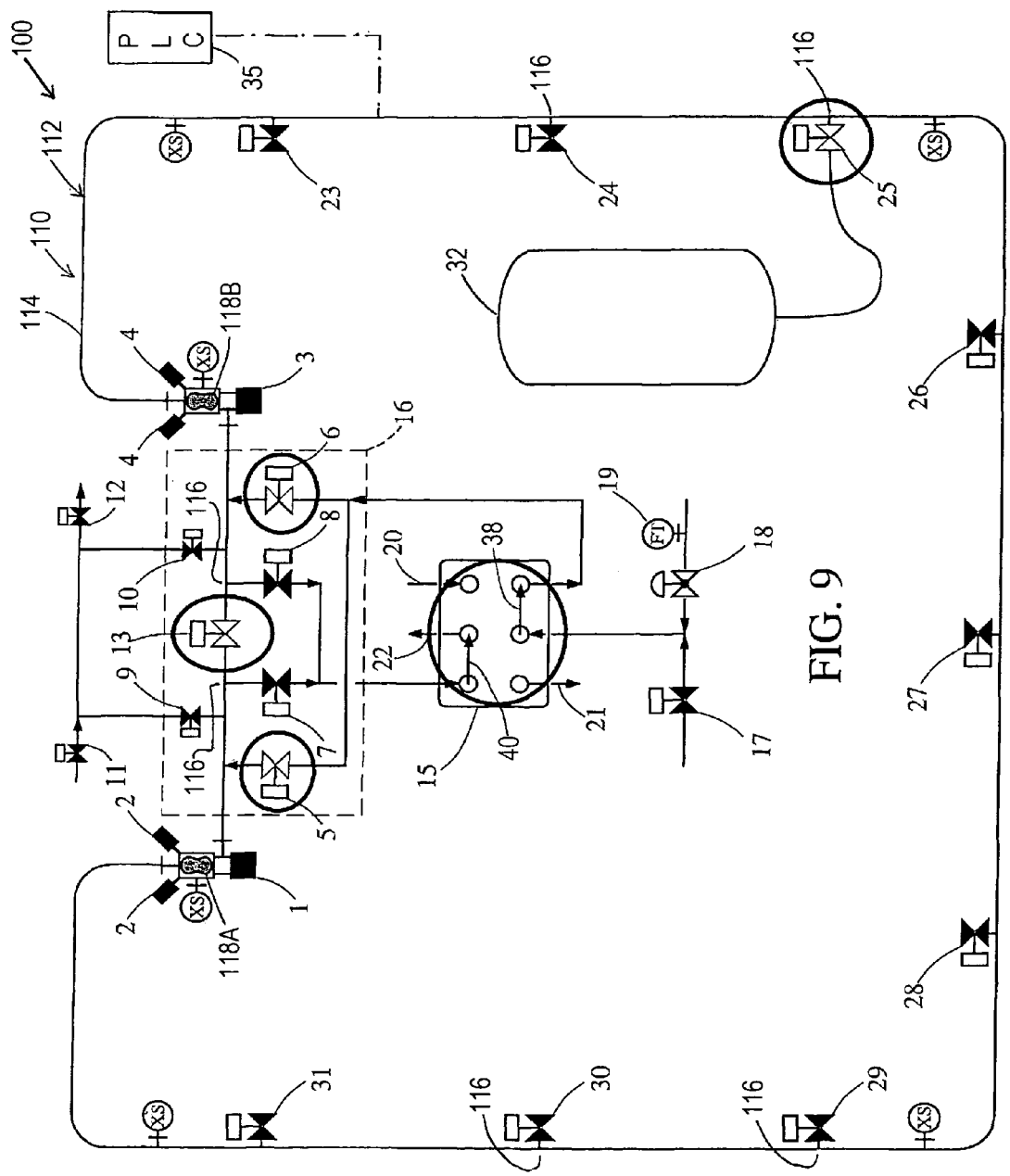
FIGS. 9-24 illustrate a second embodiment of pigging systems of the invention where product can flow from a single source node, for example originating at a source tank or source truck, to any of the destination nodes in the endless loop of piping.

The embodiment illustrated in FIGS. 9-24 is designed and configured so that product liquid can be transported/pumped from a given one source tank, which is along the path of travel of pig 118, to any one or more of a selected number of destination tanks which are all connected, directly or indirectly, to valves 23-31 about the pipeline manifold and which are also along the path of travel of pig 118. Referring to FIG. 9, a first jumper pipe is connected on hook-up panel 15, connecting process supply valve 17 and rinse control valve 18 to left manifold valve 5 and right manifold valve 6. A second jumper pipe is connected on hook-up panel 15, connecting left manifold drain valve 7 and right manifold drain valve 8 to drain 22. Left manifold fill valve 5, right manifold fill valve 6, valve 25 adjacent tank 32, and manifold bypass valve 13 are open, all as indicated by the circled action elements in FIG. 9.

Note that this embodiment employs first (118A) and second (118B) pigs, shown in the respective pig launchers 1 and 3.

Figure 10:
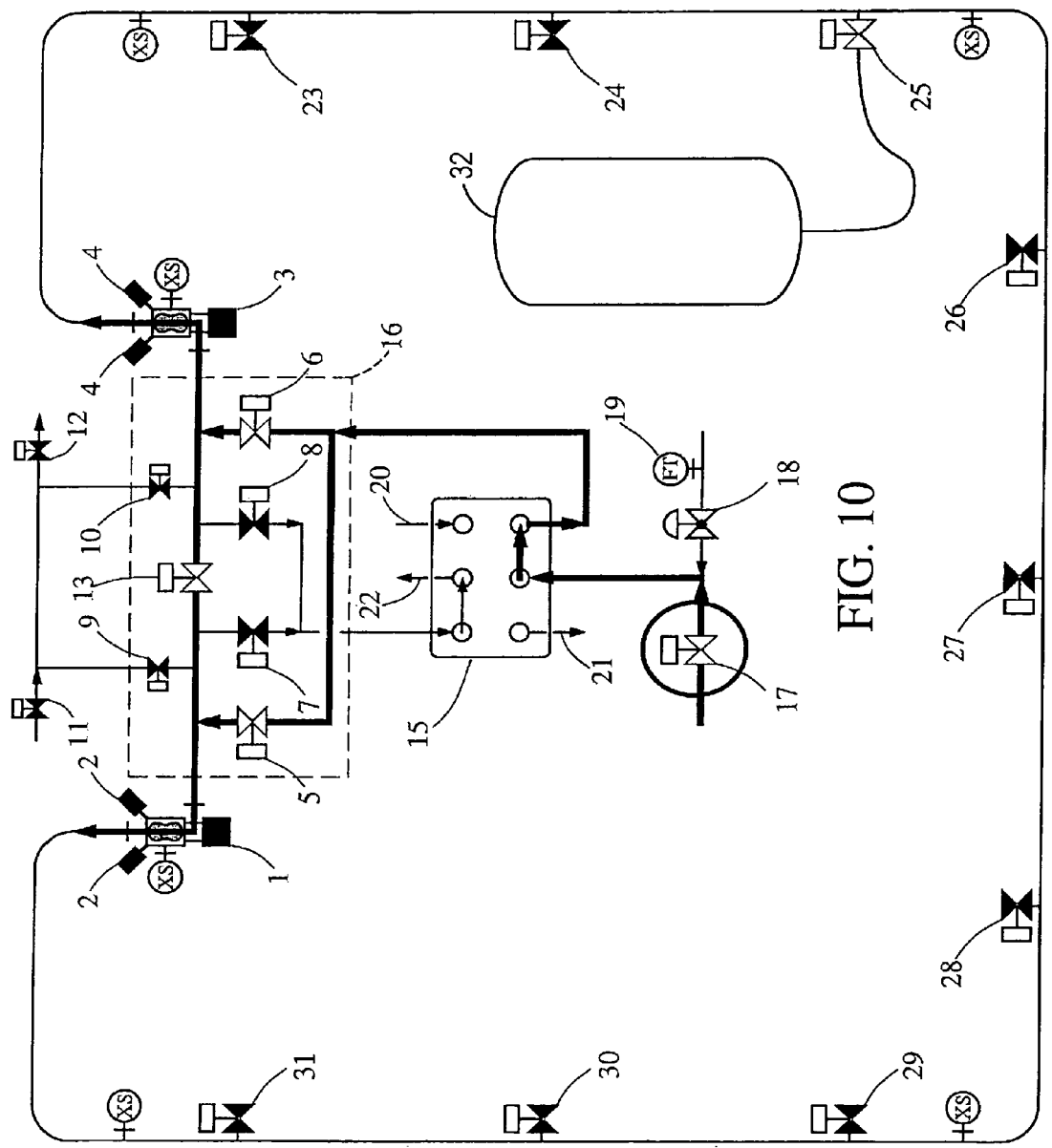

Referring to FIG. 10, process source valve 17, leading from e.g. a manufacturing process, is opened and product enters endless loop of piping 114 along the path shown in dark outline, through valves 5 and 6, and begins flowing both clockwise and counterclockwise around the manifold, toward tank 32, such that tank 32 functions as a destination tank. The product liquid could as well be directed to a destination tank associated with any one of valves 23-31, as the e.g. manufacturing or containment or warehousing or storage situation suggests.

Figure 11:
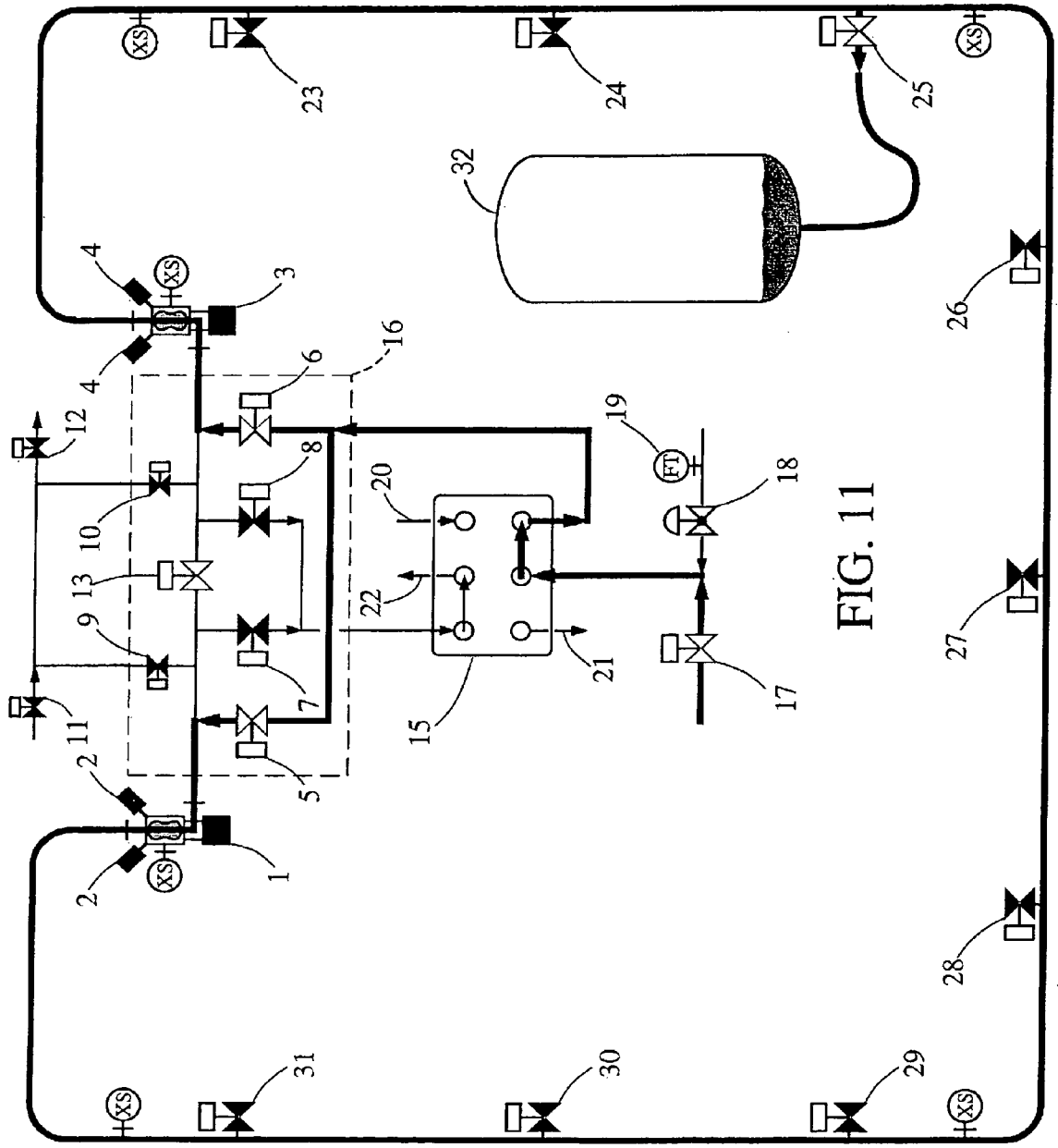

FIG. 11 shows the product liquid flowing both ways around the full extent of the path of travel of the product liquid through manifold 114 to tank 32.

Figure 12:
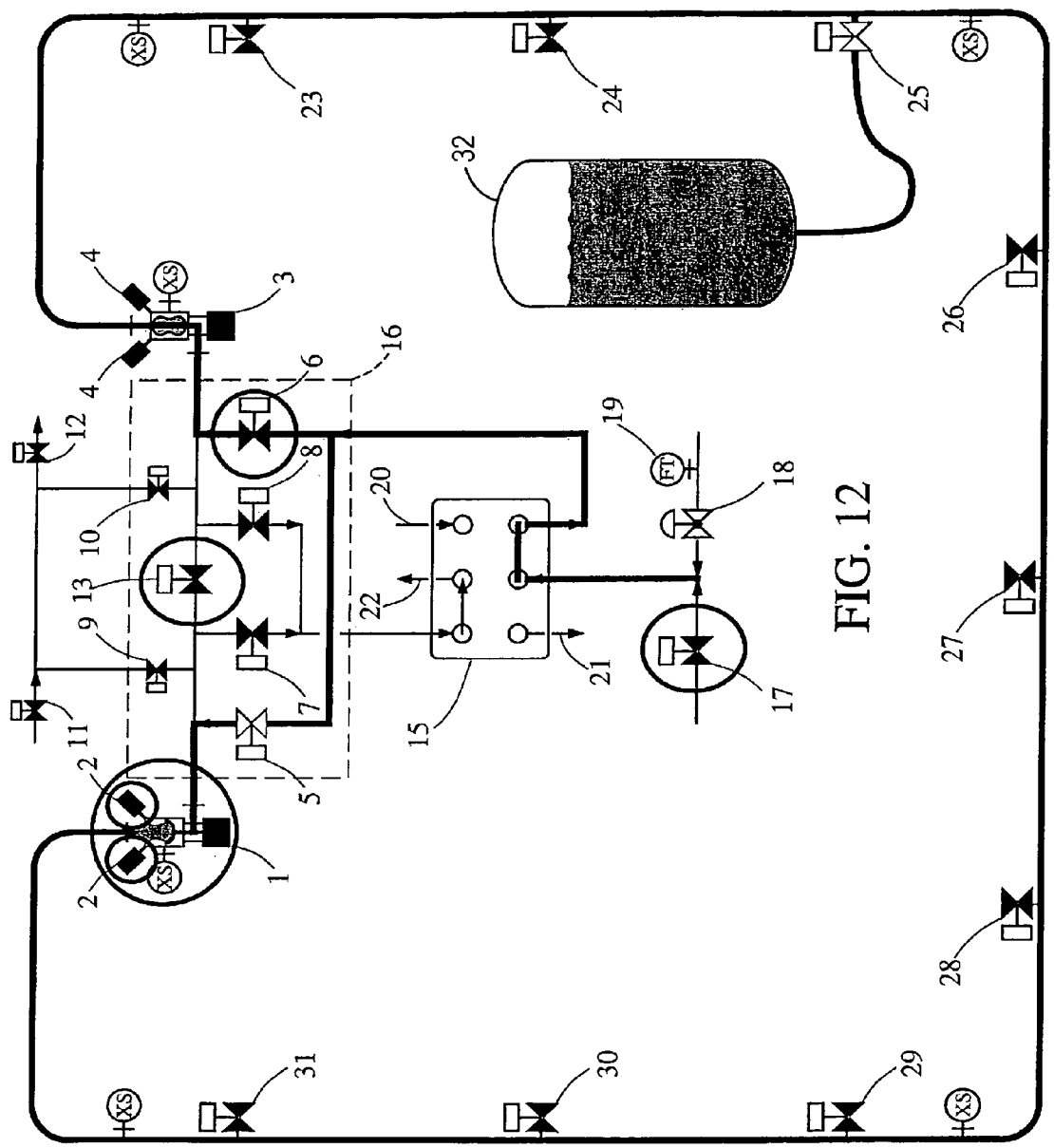

FIG. 12 shows the actions taken when the transfer of product liquid to tank 32 is complete. As seen in FIG. 12, source valve 17 is closed, manifold source valve 6 is closed, and manifold bypass valve 13 is closed. Left manifold fill valve 5 is left open. Retaining pins 2 on left pig launcher 1 are retracted and pig 118A is pushed out of launcher 1 and into manifold 114.

Figure 13:
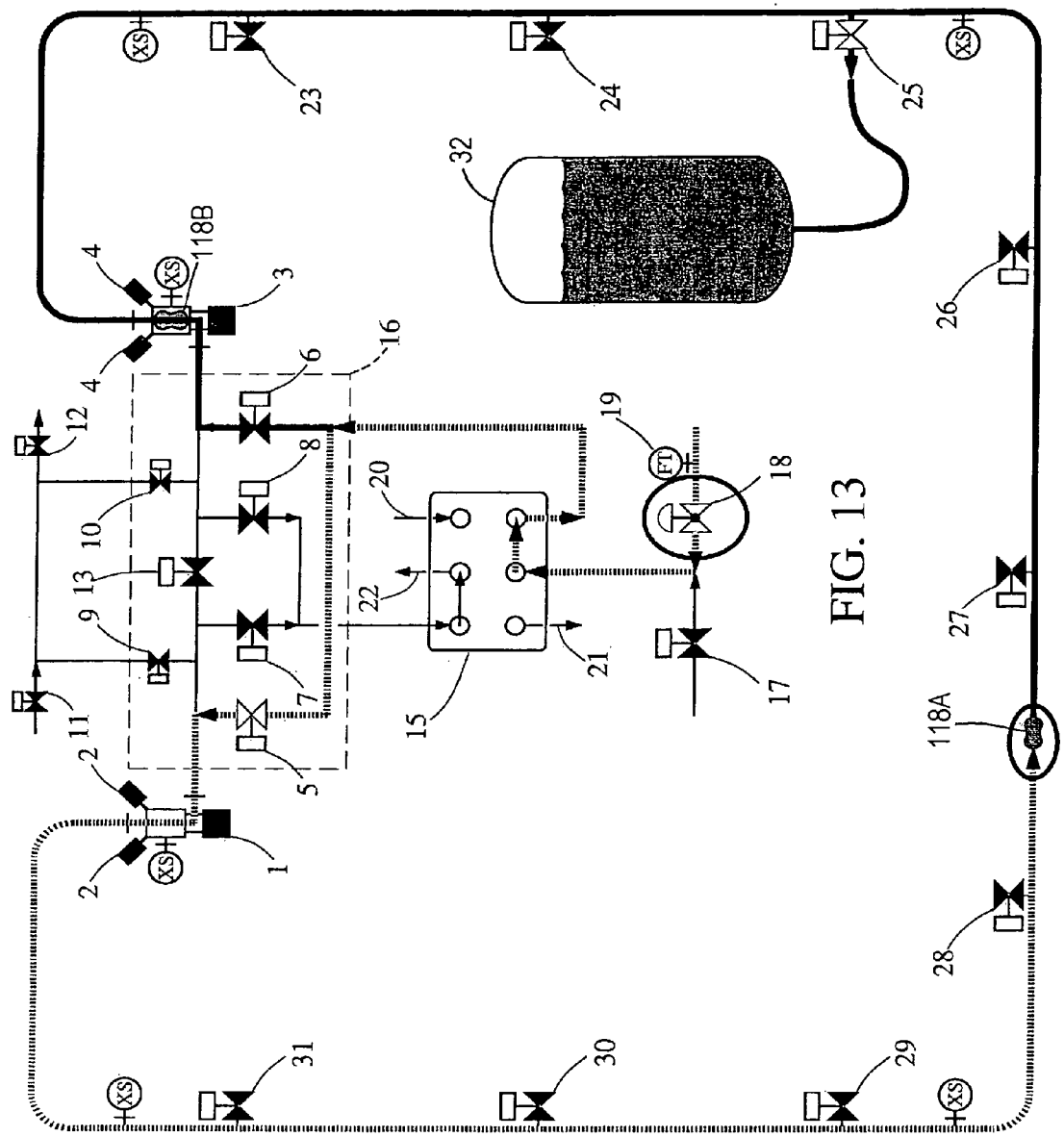

Referring to FIG. 13, rinse control valve 18 is opened, releasing rinse liquid such as water into transport system 110. In general, throughout the drawings, at locations where cleaning/rinse liquid such as water is being used in piping, the corresponding section of piping is shown in relatively narrowly-spaced broken line segments as adjacent valves 28-31 in FIG. 13.

The water pushes pig 118A from its position adjacent launcher 1 counterclockwise around manifold 114, pushing product ahead of the pig into tank 25.

Figure 14:
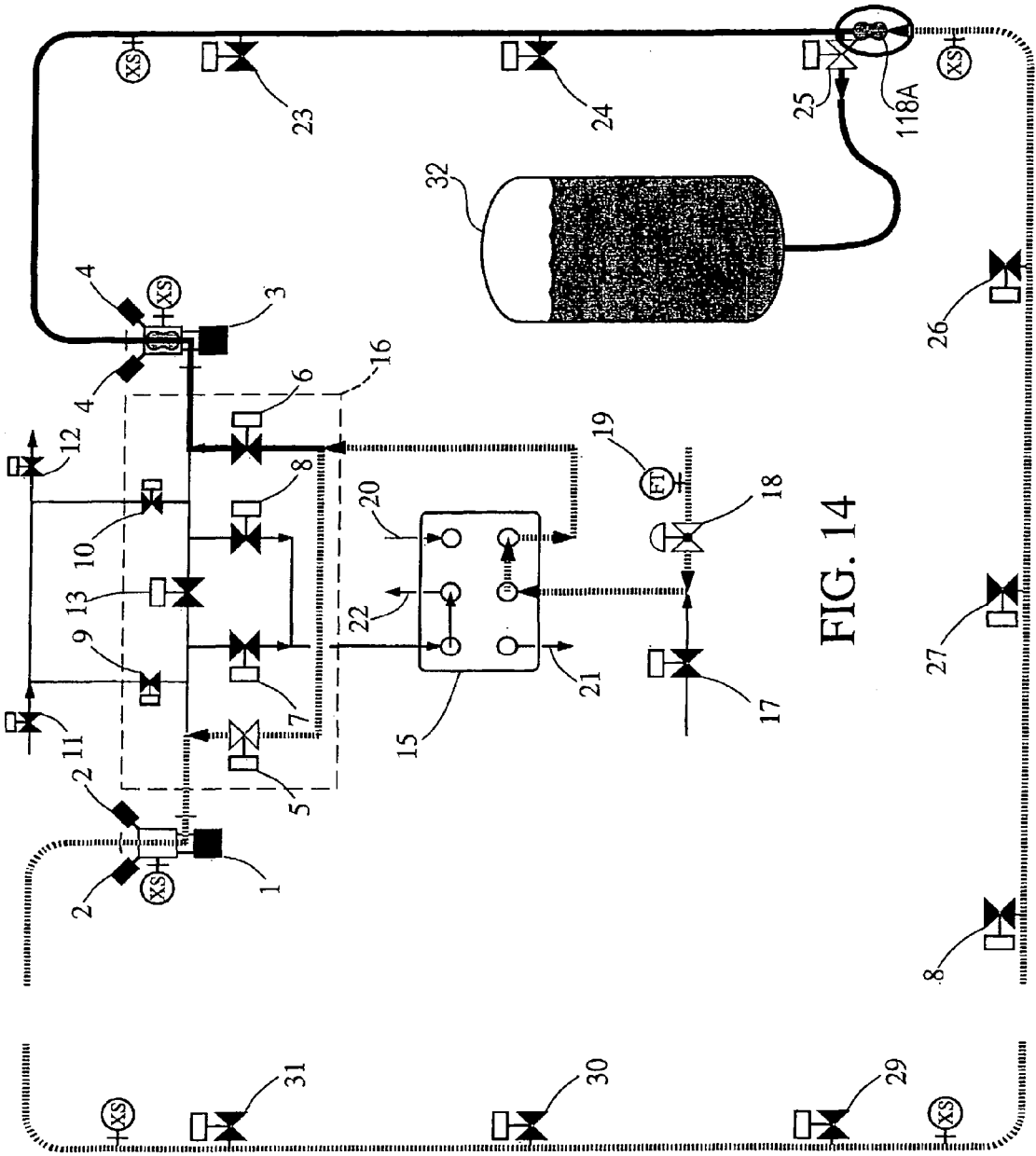

Referring to FIG. 14, by metering the total volume of rinse liquid supplied through valve 18, using volumetric flow meter 19, pig 118A is stopped just short of the reducing tee at the node 116 which connects to valve 25 and tank 32.

Figure 15:
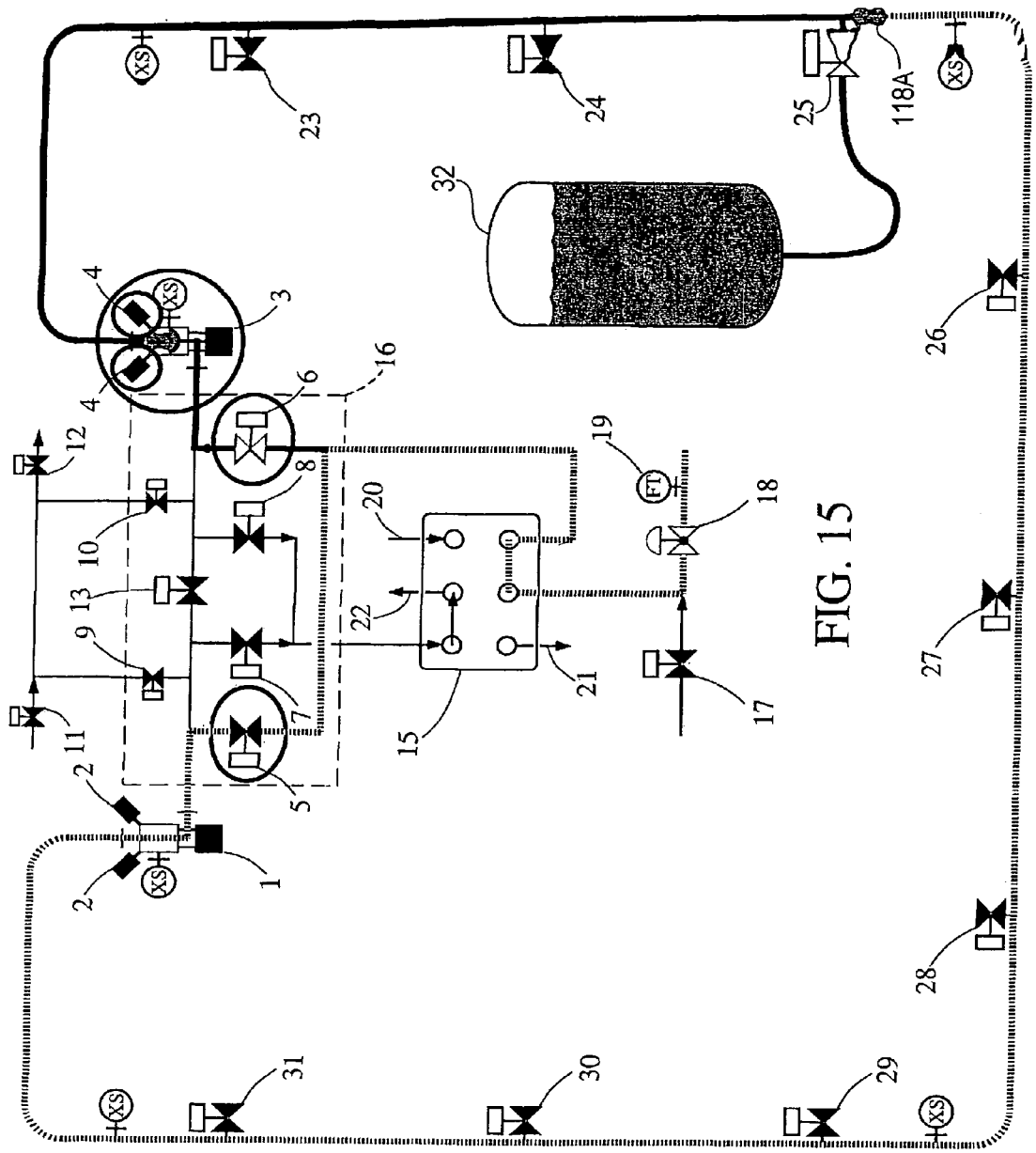

Referring now to FIG. 15, left manifold fill valve 5 is closed. Pins 4 in right pig launcher 3 are retracted, and pig 118B is mechanically pushed out of pig launcher 3 and into endless loop piping manifold 114. Right manifold fill valve 6 is opened.

Figure 16:
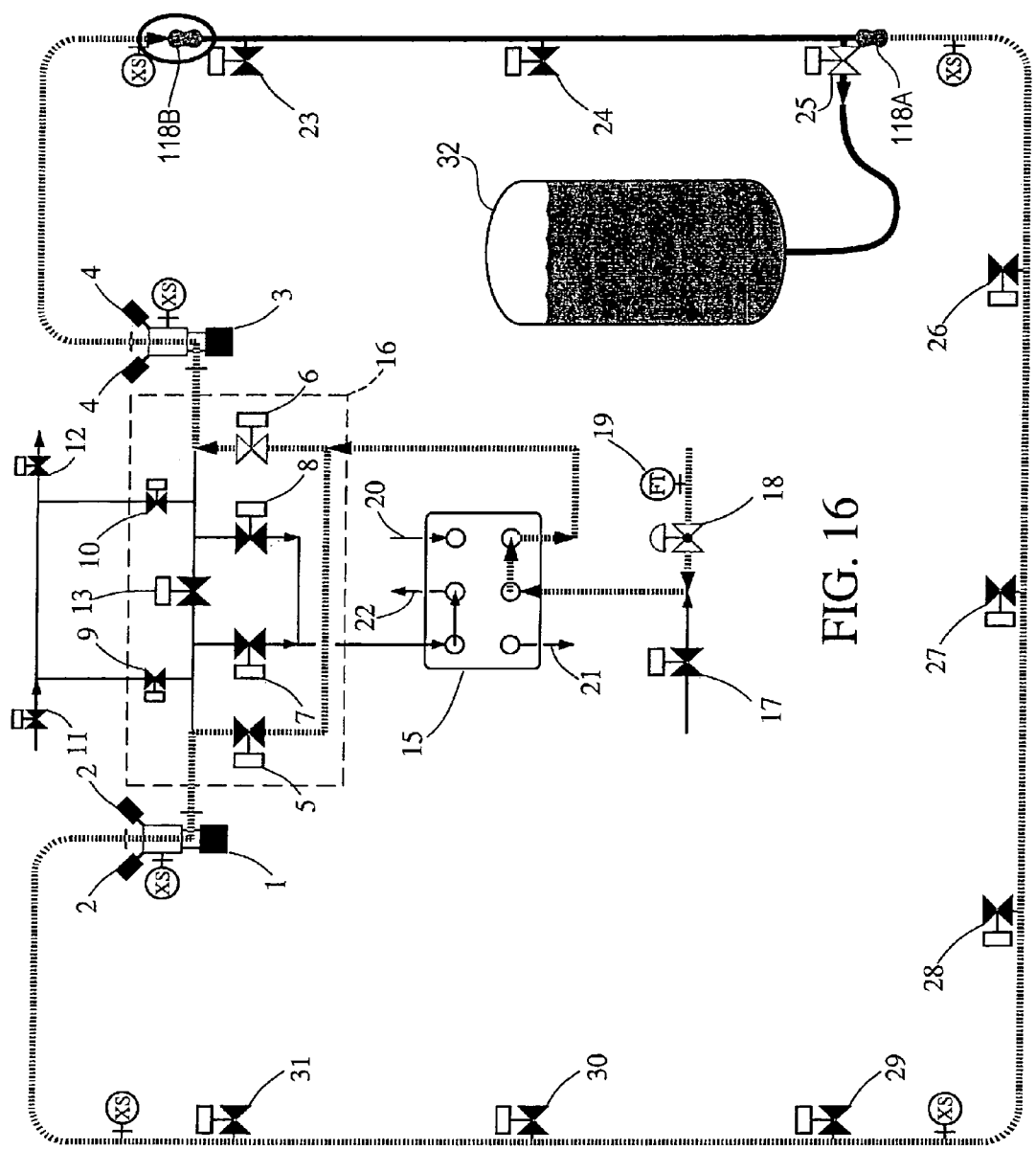

Referring to FIG. 16, as the rinse liquid flows through valve 6, the rinse liquid pushes against the product liquid in the manifold and thus pushes pig 118B clockwise around the right side of the manifold, pushing product liquid ahead of the pig and into tank 32. Pig 118A from launcher 1 is held in place by the incompressible liquid between pig 118A and closed valves 5, 7, 9, and 13.

Figure 17:
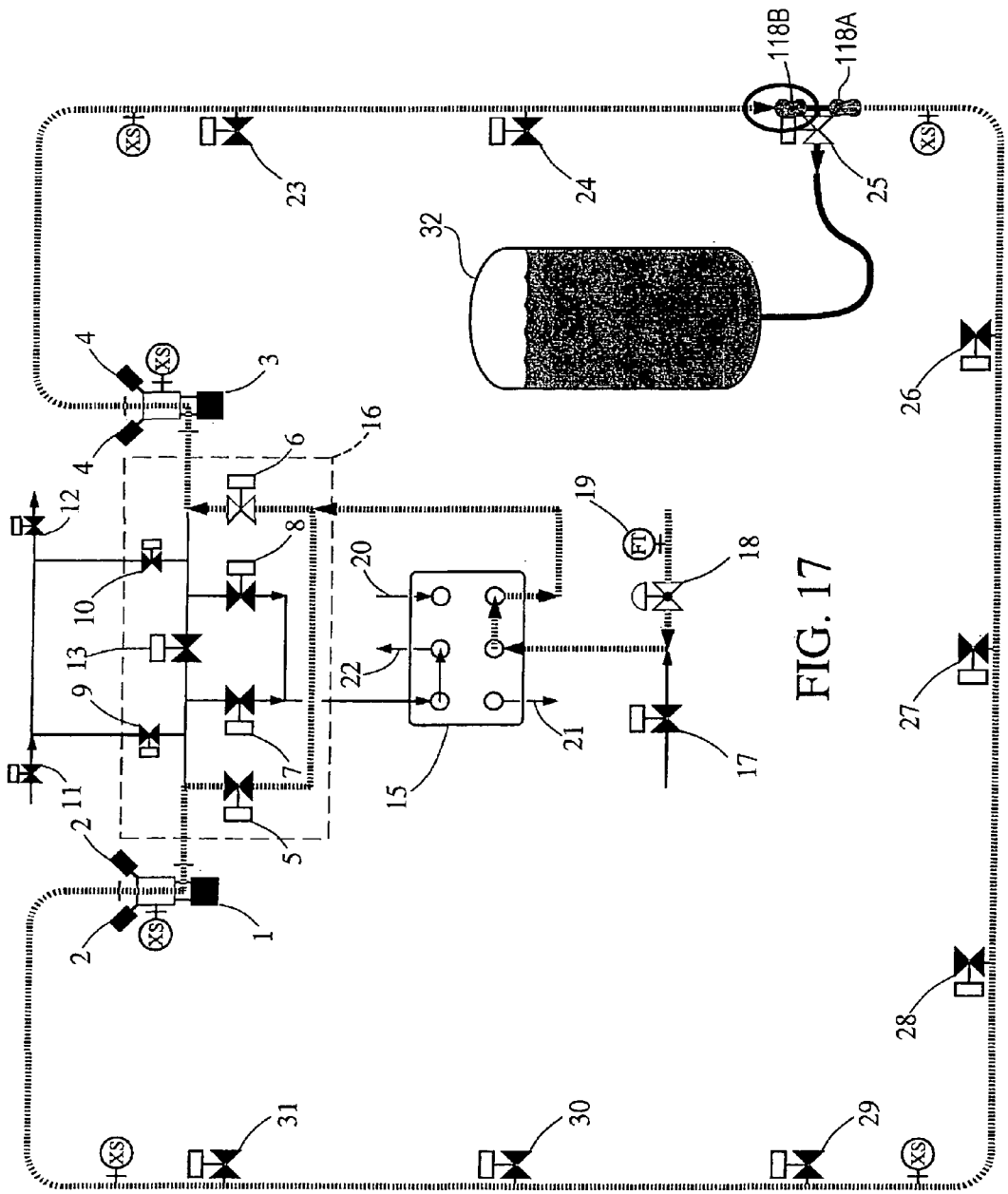

Referring to FIG. 17, by metering the total volume of rinse liquid supplied through valve 18, using volumetric flow meter 19, pig 118B is stopped just short of the reducing tee at the node 116 which connects to valve 25 and tank 32, whereby both of pigs 118A and 118B are closely adjacent the node 116 which is associated with valve 25 and tank 32.

Figure 18:
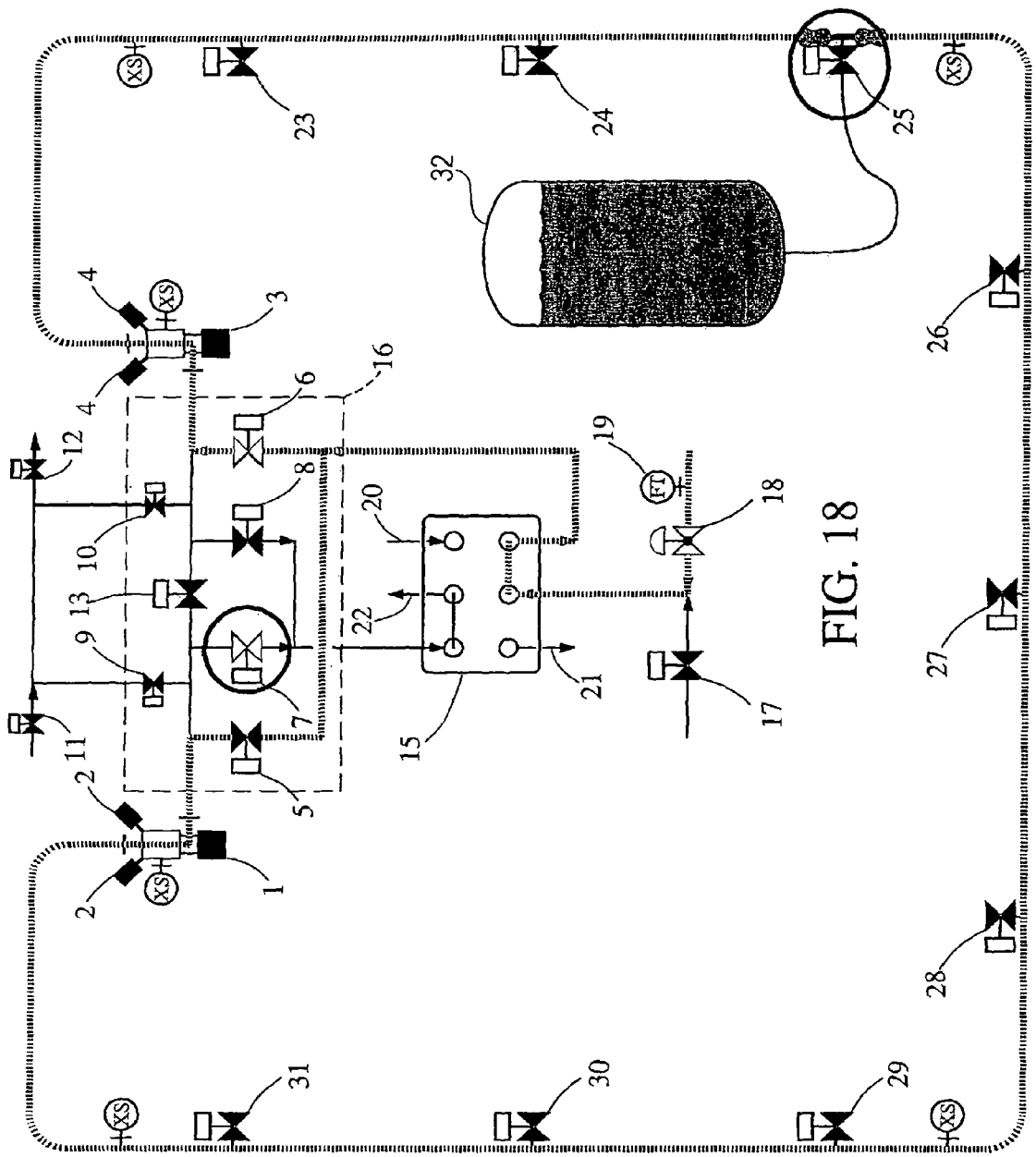

Referring to FIG. 18, once pig 118B has arrived adjacent pig 118A and the node adjacent valve 25, valve 25 is closed to isolate tank 32 from the endless loop piping manifold 114, and drain valve 7 is opened.

Figure 19:
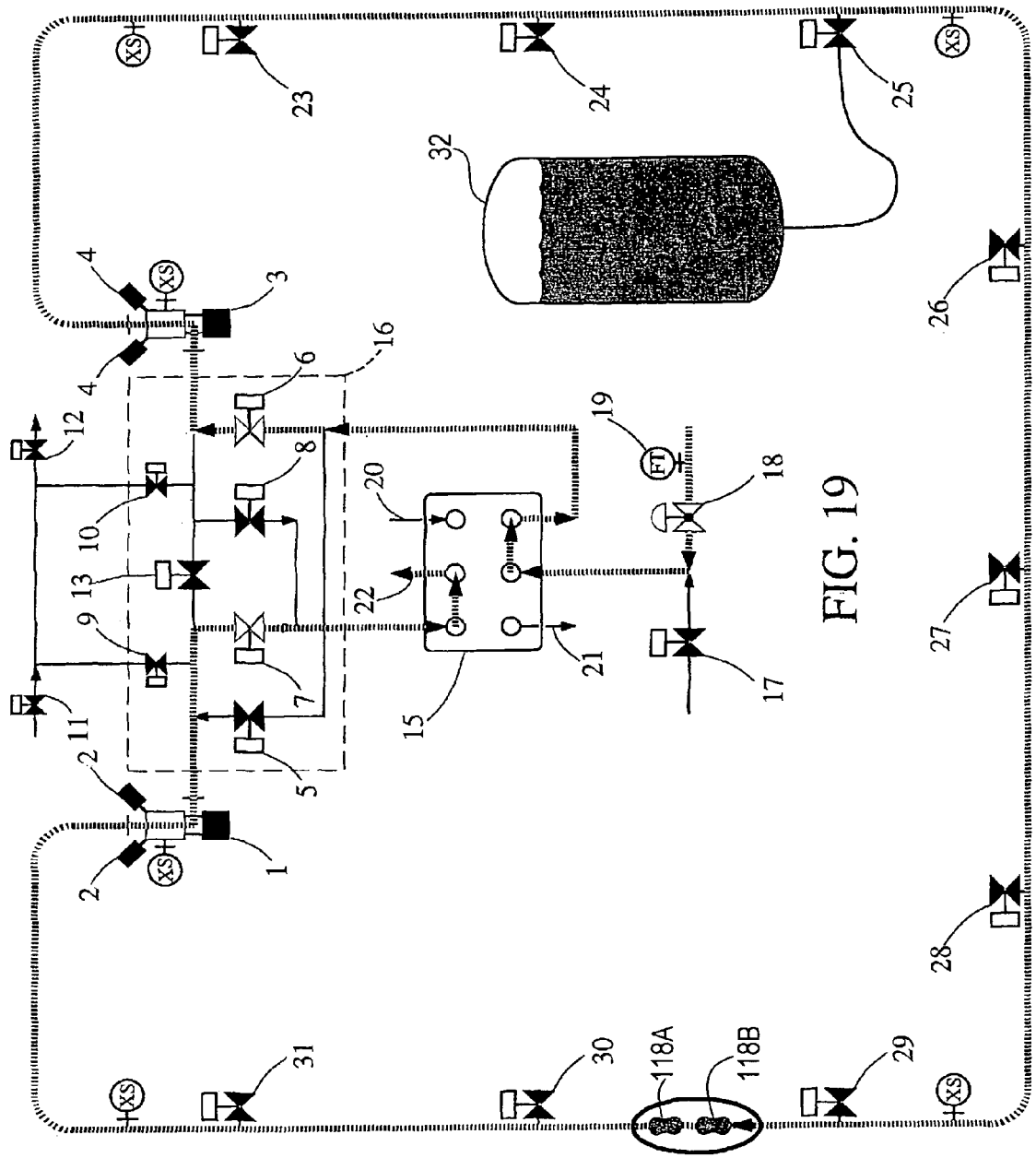

Now referring to FIG. 19, once drain valve 7 is opened, additional cleaning liquid is metered through valve 18 and into the manifold, which pushes both pigs 118A and 118B in a continuing clockwise direction back toward left pig launcher 1 as the excess cleaning liquid in the manifold is drained through valve 7, through hook-up panel 15 and out of the system at drain 22.

Figure 20:
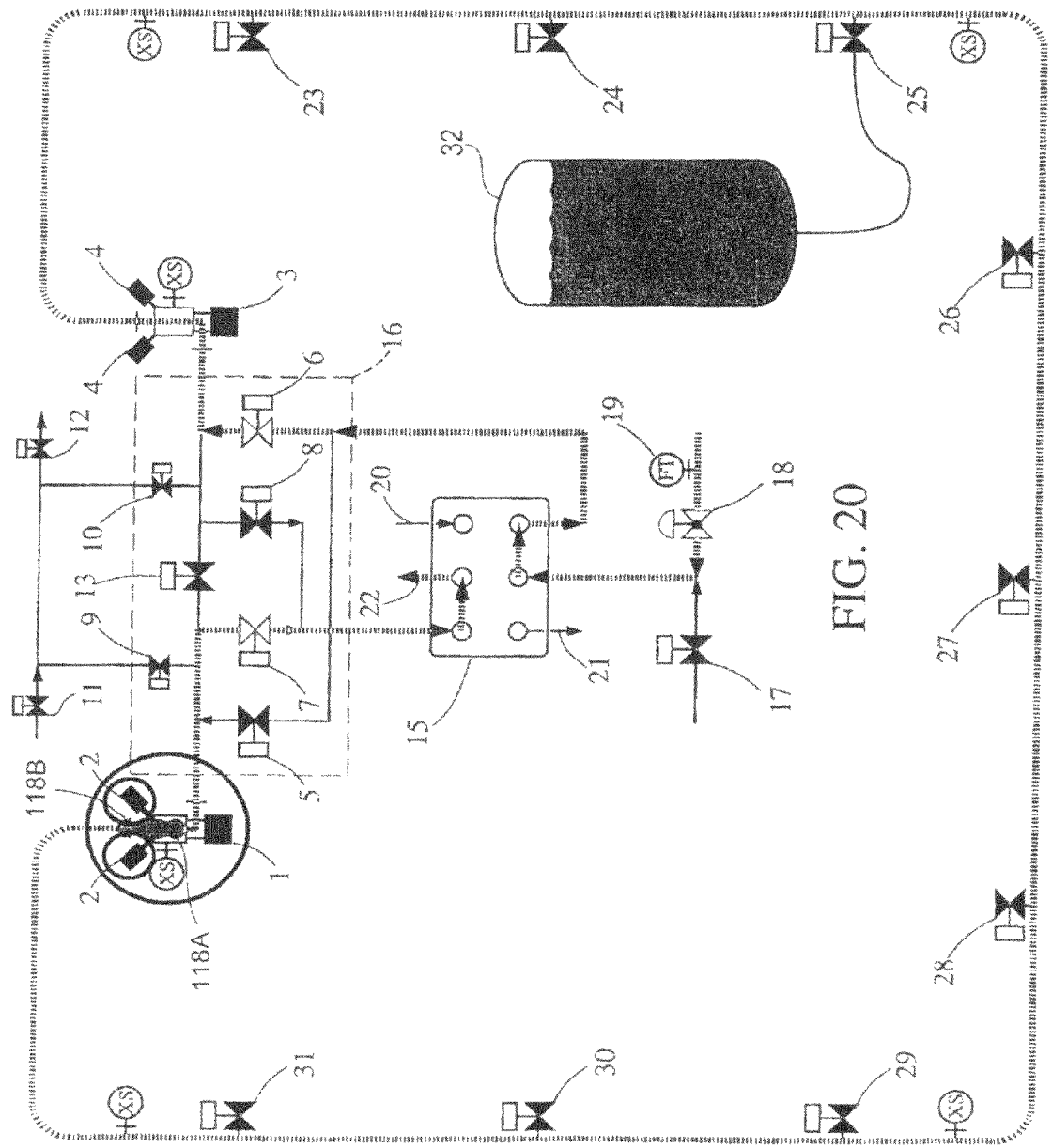

Referring to FIG. 20, the first pig 118A is pushed into left pig launcher 1 and is caught by inserting retaining pins 2 against pig 118A, thereby retaining pig 118A in pig launcher 1. Pig 118B remains in piping 114 outside pig launcher 1.

Figure 21:
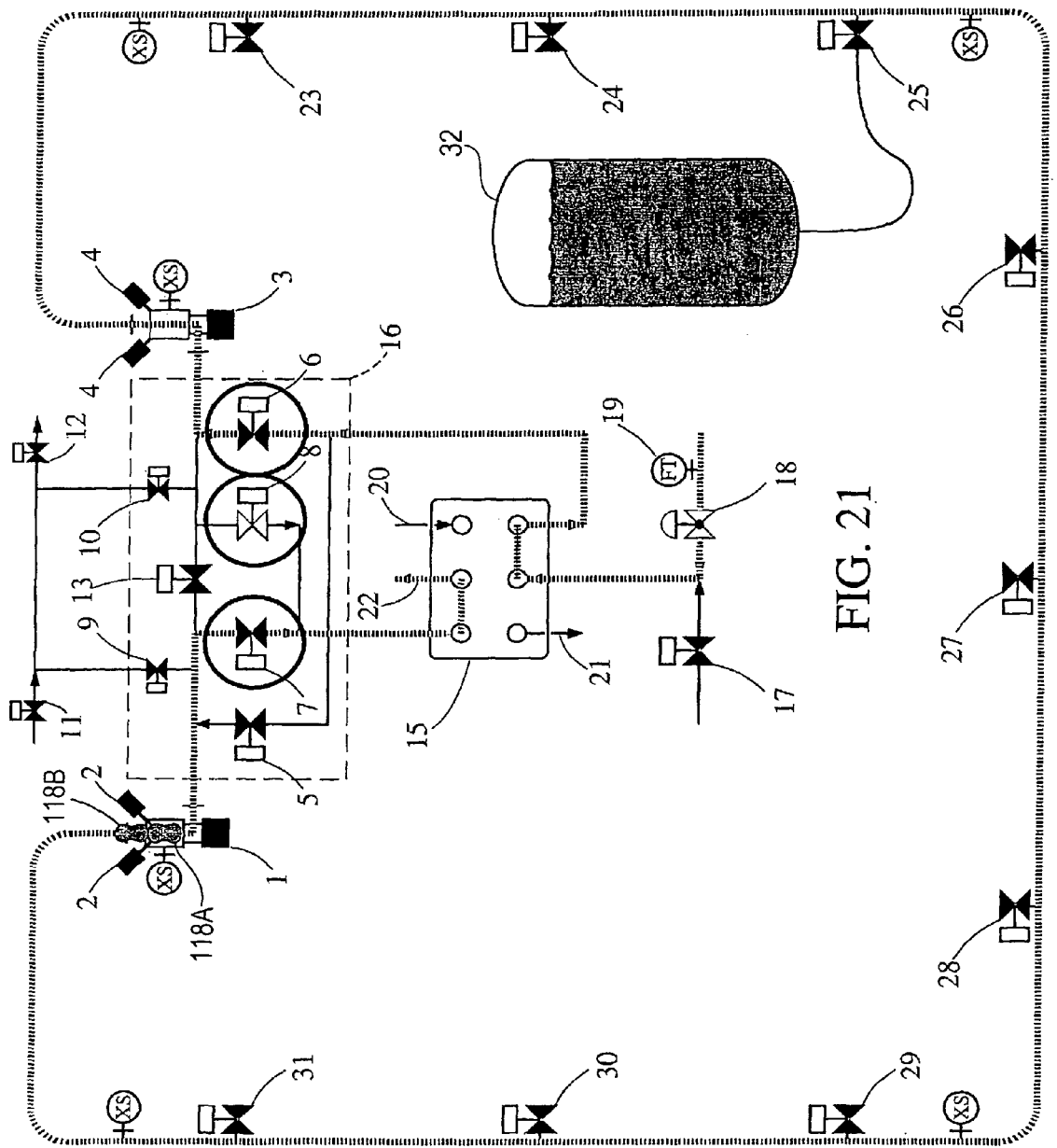

Referring to FIG. 21, right manifold drain valve 8 is opened. Left manifold drain valve 7 is closed; and right manifold fill valve 6 is also closed.

Figure 22:
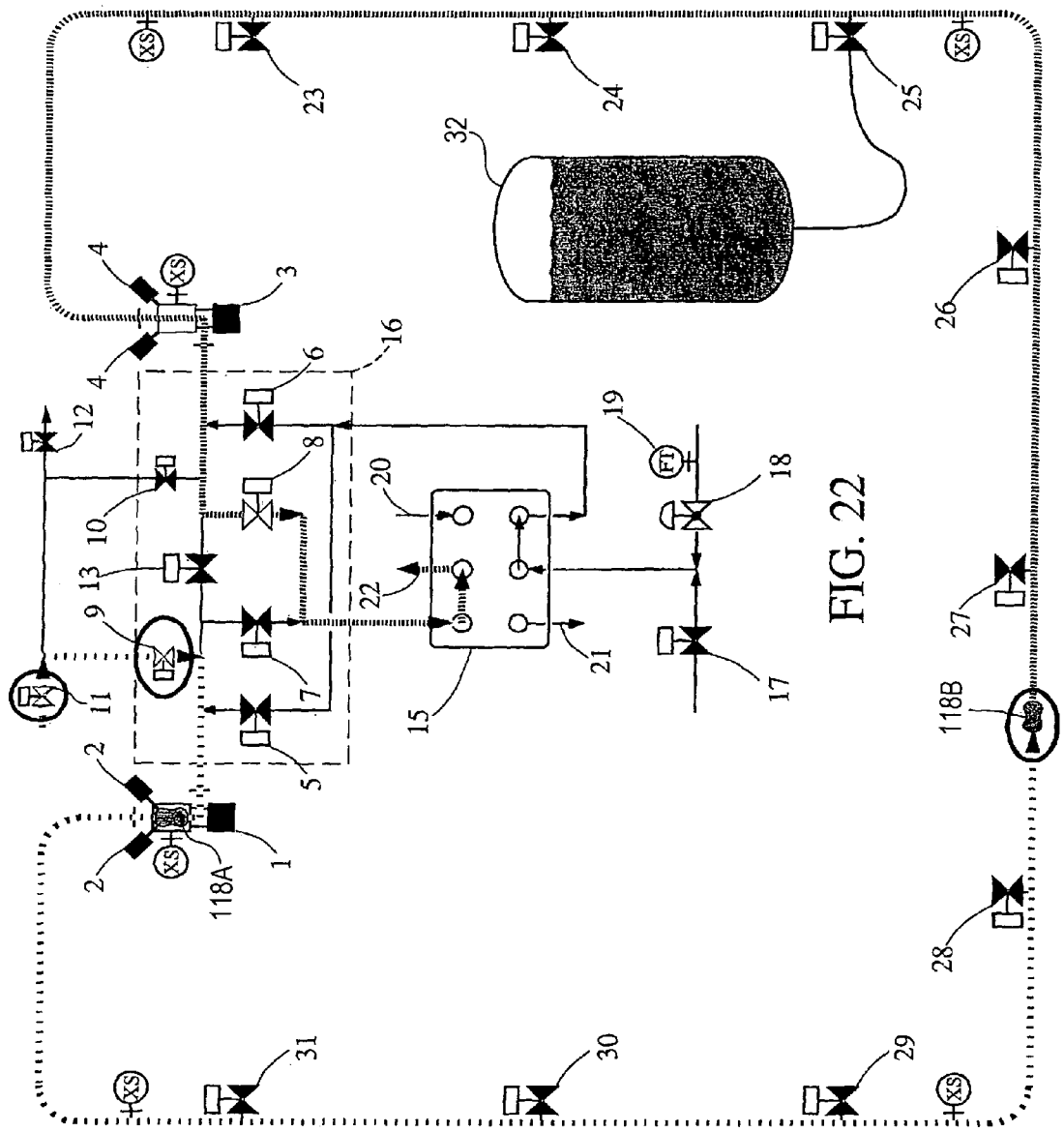

Referring to FIG. 22, left manifold purge valve 9 is opened, and compressed air supply valve 11 is opened. As the compressed air supply valve 11 is opened, pig 118B is pushed by the compressed air in a counterclockwise direction around manifold 114. The advancing of pig 118B pushes the rinse liquid ahead of the pig, out of manifold 114, and thus out of liquid transport system 110 at drain 22.

Figure 23:
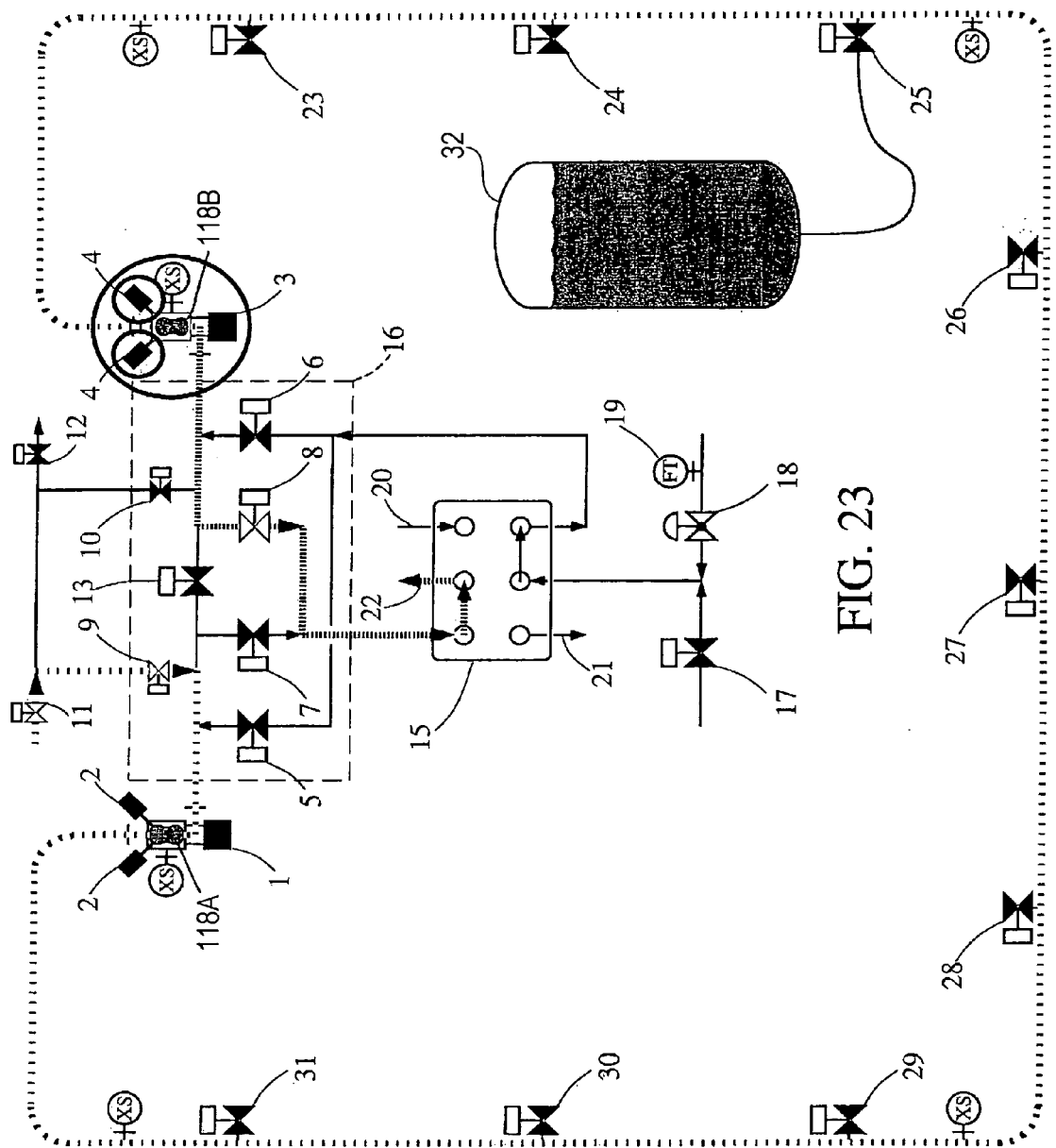

Referring to FIG. 23, pig 118B is pushed into right pig launcher 3 by the compressed air. Retaining pins 4 are inserted into pig launcher 3 and against pig 118B, thus catching and retaining pig 118B in pig launcher 3. Continued flow of the compressed air, through pig launcher 3 continues the process of pushing all liquid out of the lines/conduits which extend between pig launcher 3 and drain 22, until the manifold and connection lines are empty of substantially all liquid, including empty of product liquid and empty of rinse liquid. Any product liquid which may have been positioned between pig launcher 3 and valve 6 (FIG. 15) has now been pushed out of the system at drain 22.

Figure 24:
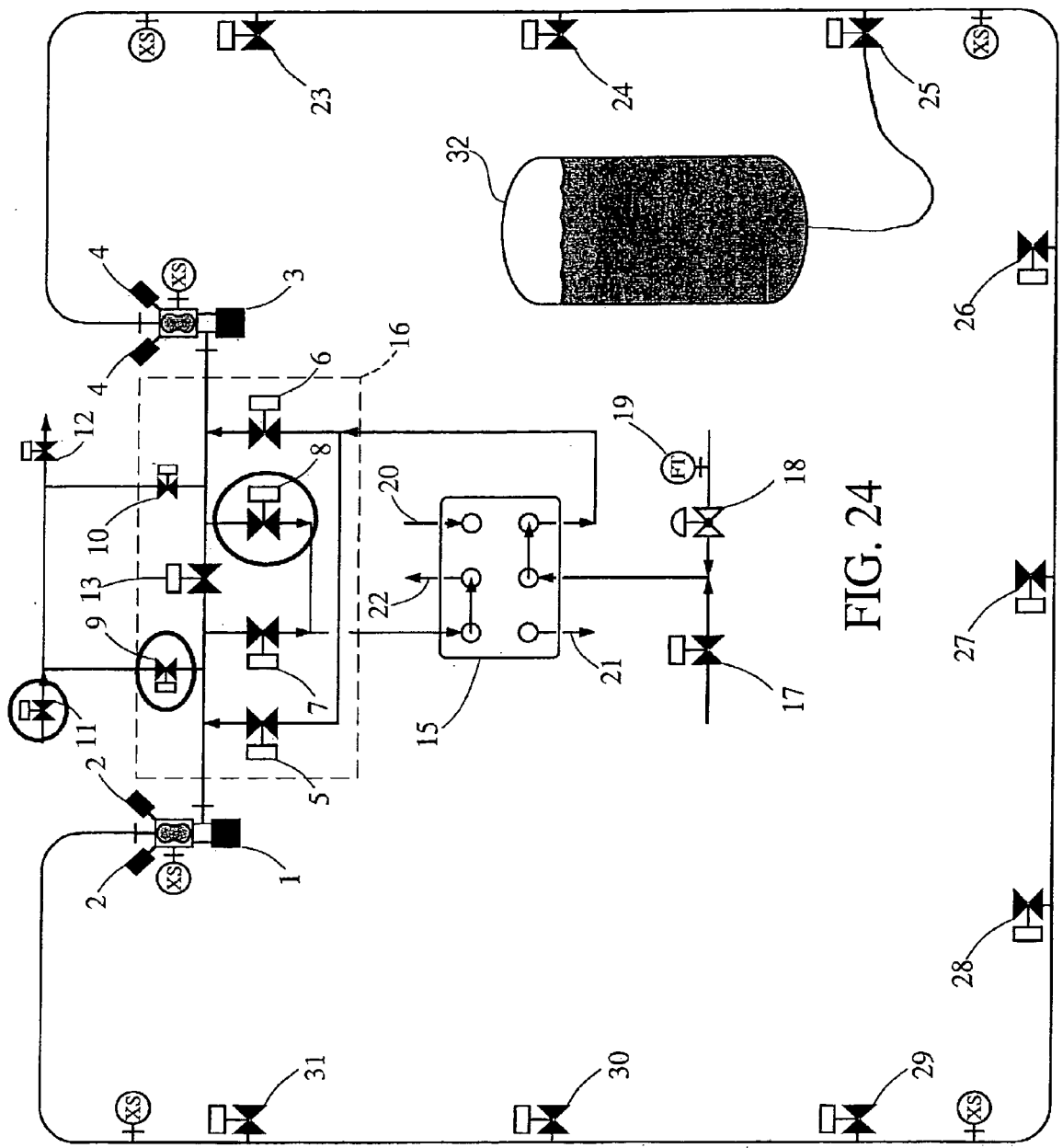

Referring to FIG. 24, compressed air valve 11 is closed, and left manifold purge valve 9 is closed. Right manifold drain valve 8 is also closed. The manifold is now empty, the transfer process is complete. The manifold is clean and ready for another transfer.

Figure 25:
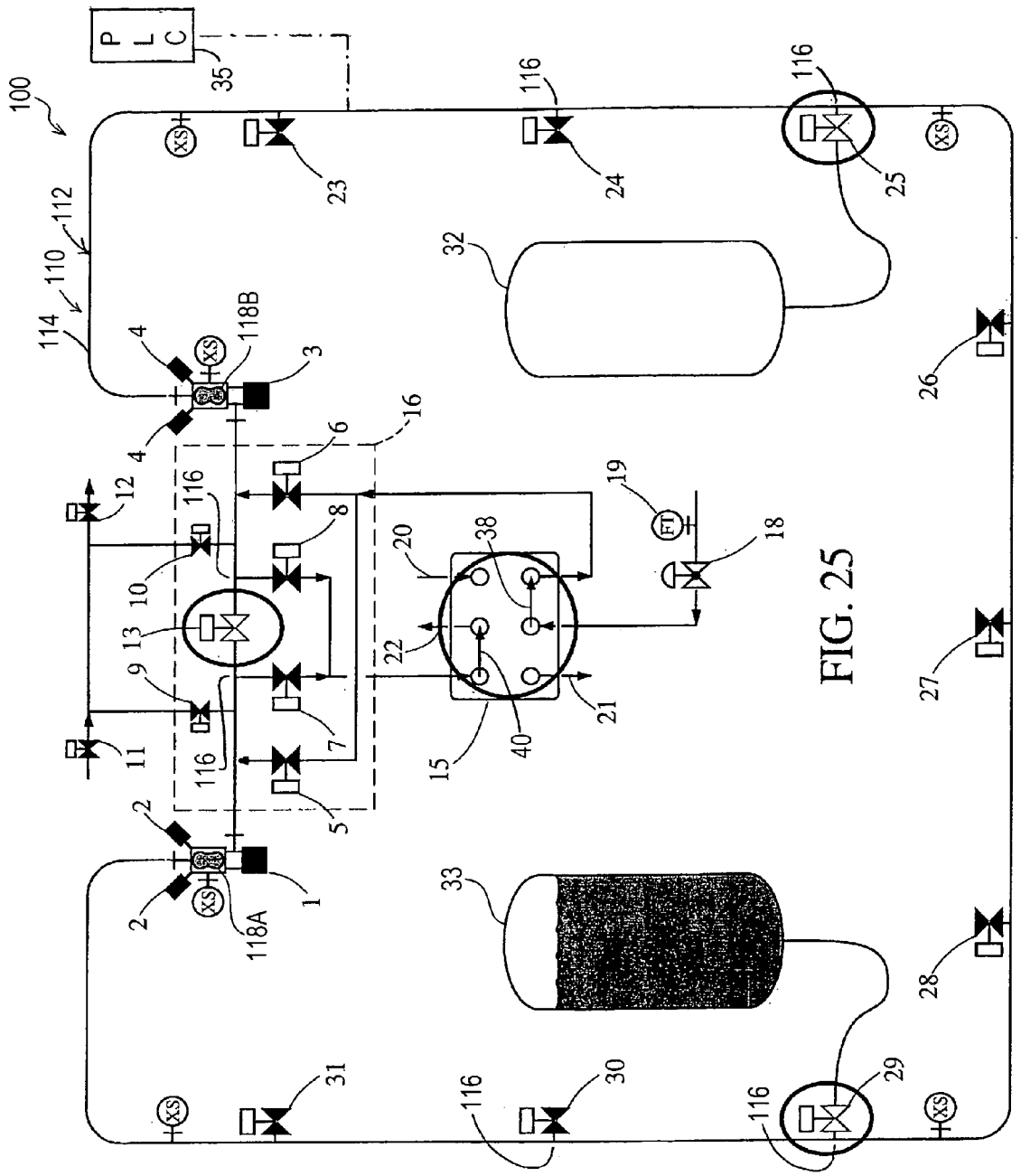
FIGS. 25-40 illustrate a third embodiment of pigging systems of the invention where product can flow from any node in the endless loop of piping, to any other node in the endless loop of piping.

The embodiment illustrated in FIGS. 25-40 is designed and configured so that product liquid can be transported/pumped from any tank in the endless loop piping manifold 114 and along the path of travel of pig 118, as a source tank, to any one or more of the other tanks in manifold 114 and along the path of travel of pig 118, as a destination tank. Referring to FIG. 25, and the initial set-up for liquid transfer, a first jumper pipe 38 is connected on hook-up panel 15, connecting rinse control valve 18 to left and right manifold fill valves 5 and 6. A second jumper pipe 40 is connected on the hook-up panel, connecting drain 22 to left and right manifold drain valves 7 and 8. Valve 25 shown adjacent destination tank 32 is opened. Valve 29, shown adjacent source tank 33, is opened. Manifold bypass valve 13 is opened. Pigs 118A and 118B are held in their respective pig launchers 1 and 3 by retaining pins 2 and 4.

Figure 26:
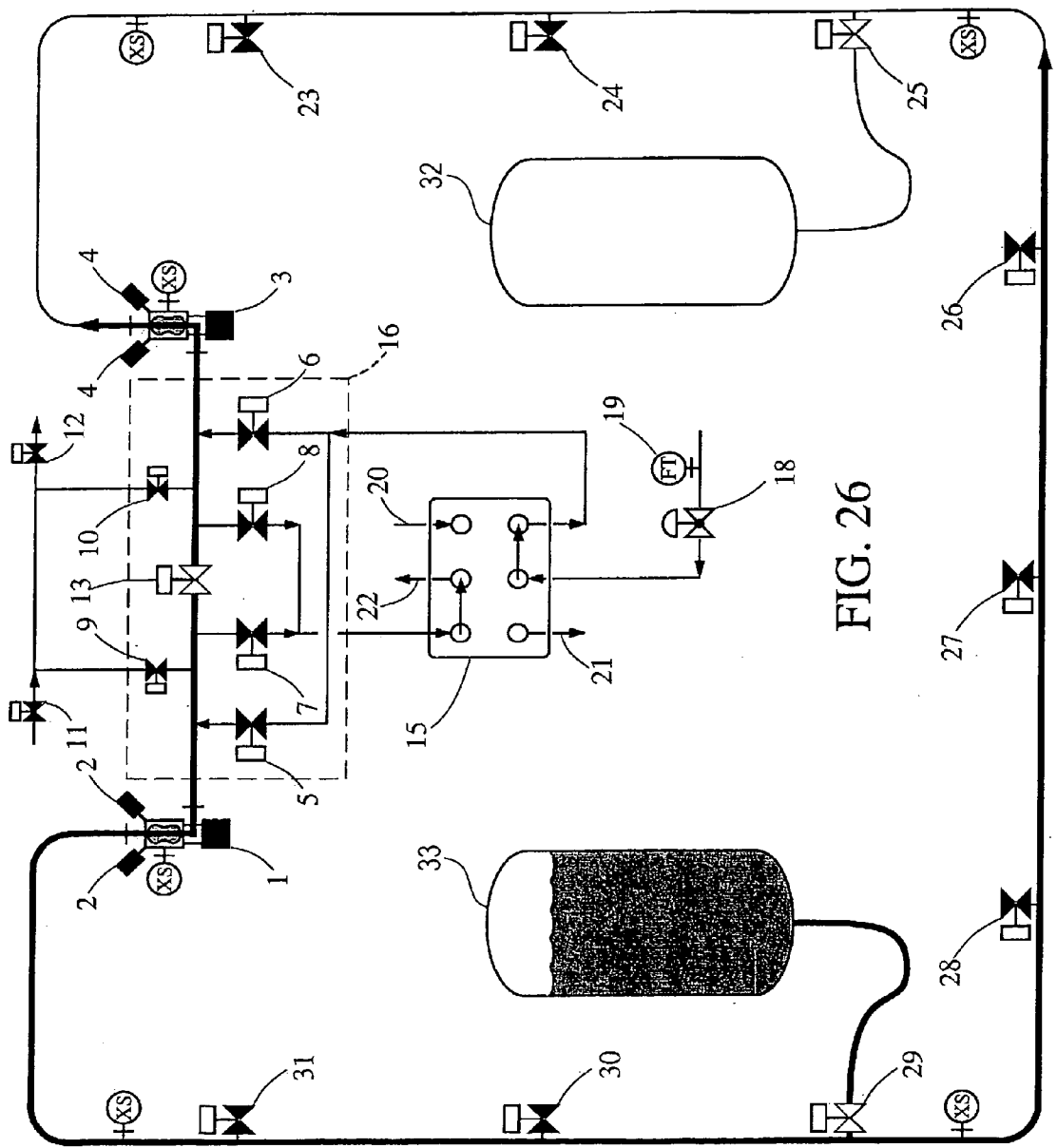

Referring to FIG. 26, product liquid is pumped or is otherwise pressurized, and flows from tank 33, through valve 29 and into manifold 114, and begins flowing both clockwise and counterclockwise around manifold 114 toward valve 25, and tank 32. In the clockwise flow, the liquid flows through both of pig launchers 1 and 3, and thus flows past said pigs, while the respective pigs 118A and 118B are retained in the pig launchers by respective retaining pins 2 and 4.

Figure 27:
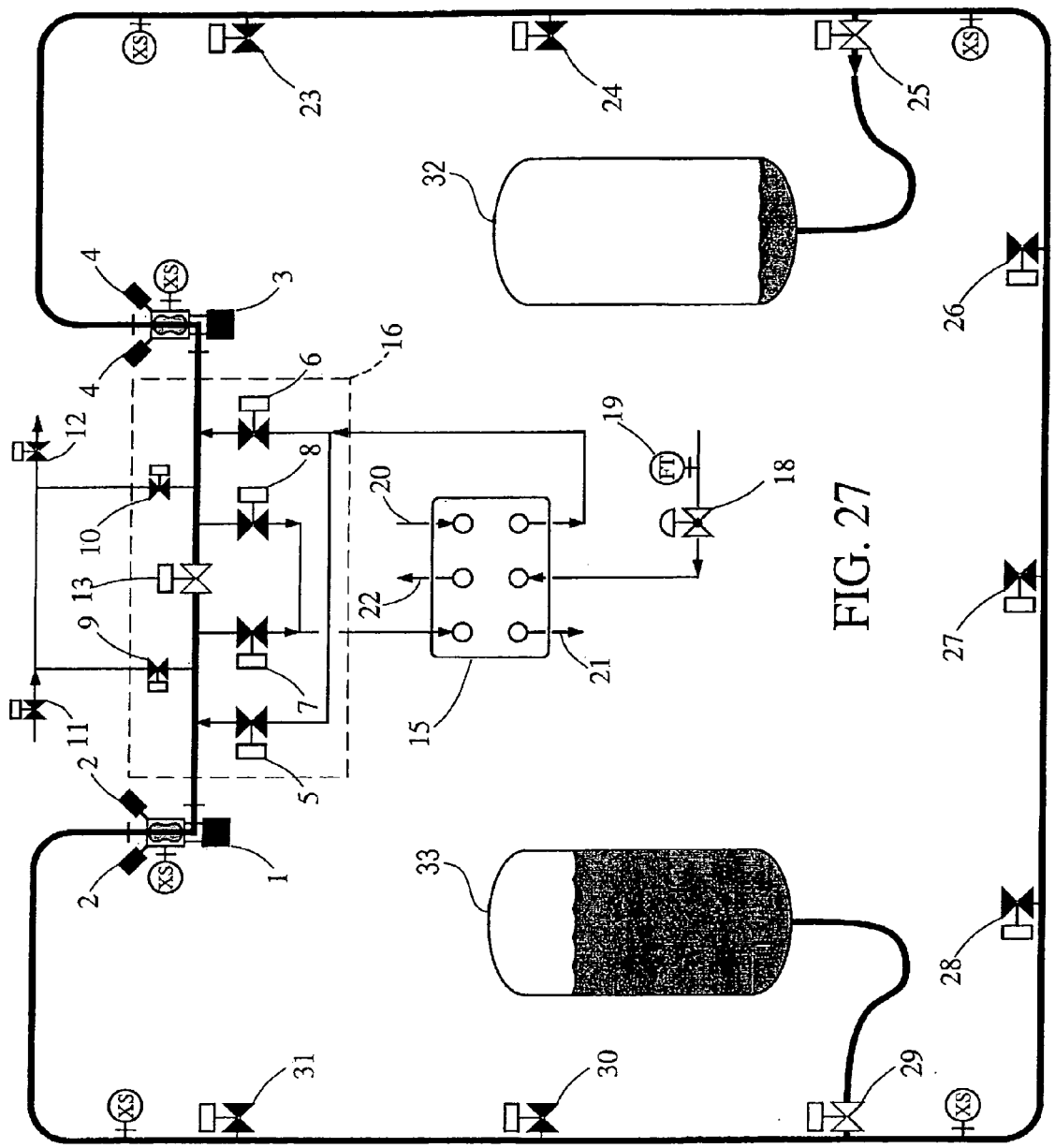

FIG. 27 illustrates the flow of product liquid from tank 33 through valve 29, both clockwise and counterclockwise through manifold 114, through valve 25, and into tank 32, until the desired amount of liquid has been transferred from tank 33 to tank 32. Valve 29 is then closed. If desired, a similar procedure can be subsequently followed to transfer additional liquid from a second source tank in manifold 114 to tank 32.

Figure 28:
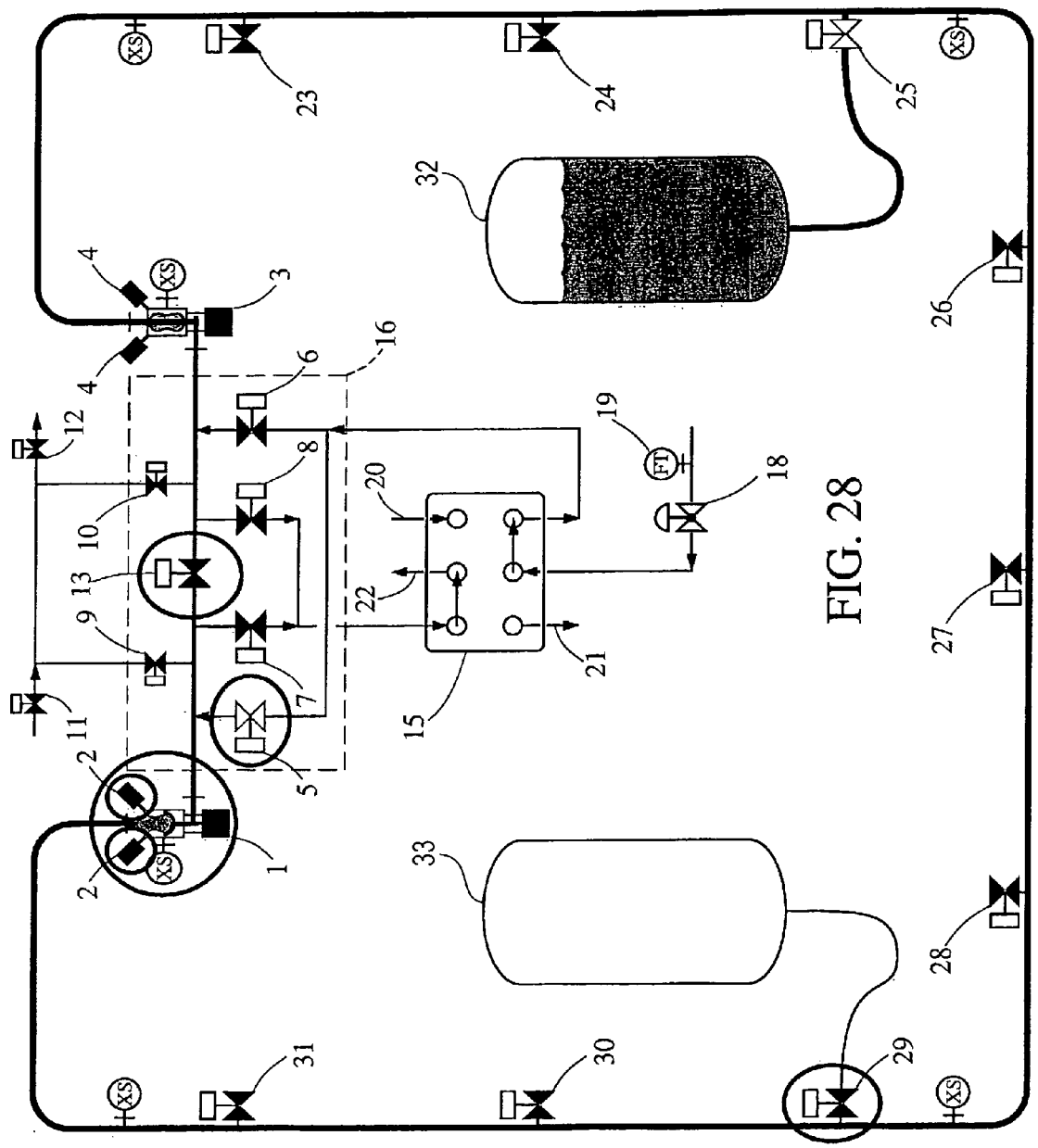

Referring to FIG. 28, after the desired amount of liquid has been transferred to tank 32, the respective source valve, e.g. valve 29, is closed, and manifold by-pass valve 13 is closed. Left manifold fill valve 5 is opened. Retaining pins 2 on left pig launcher 1 are retracted and pig 118A is pushed out of launcher 1 and into manifold 114.

Figure 29:
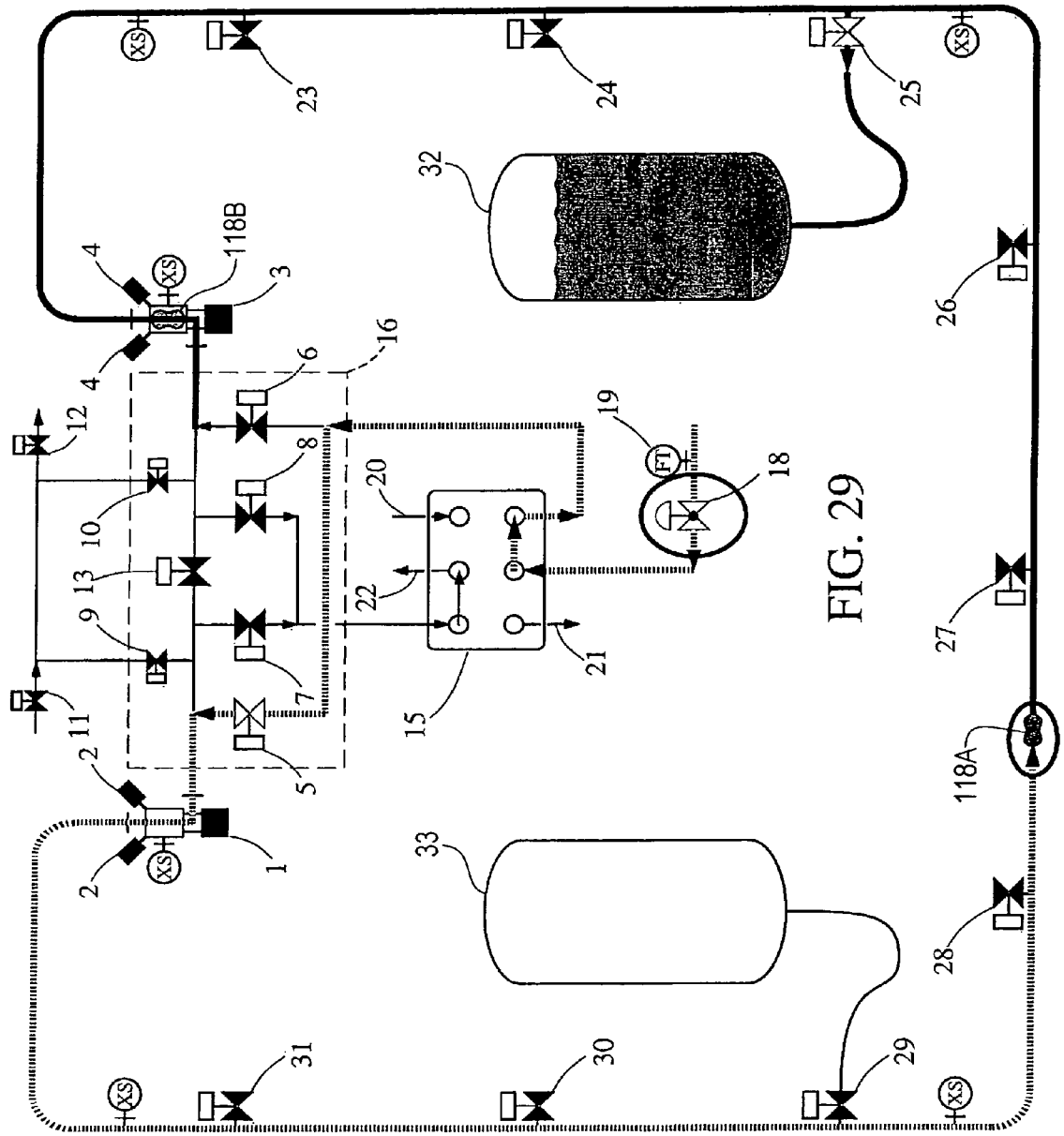

Referring to FIG. 29, rinse liquid is released into the system through rinse control valve 18, pushing pig 118A from pig launcher 1 in a counterclockwise direction around manifold 114. As pig 118A advances counterclockwise around manifold 114, the pig pushes the liquid which had come from e.g. tank 33 ahead of the pig, through the still-open valve 25, and into tank 32, thus capturing the value of that liquid which remained trapped in manifold 114, between pig launcher 1 and valve 25, after completion of the liquid transfer from tank 33 to tank 32.

Figure 30:
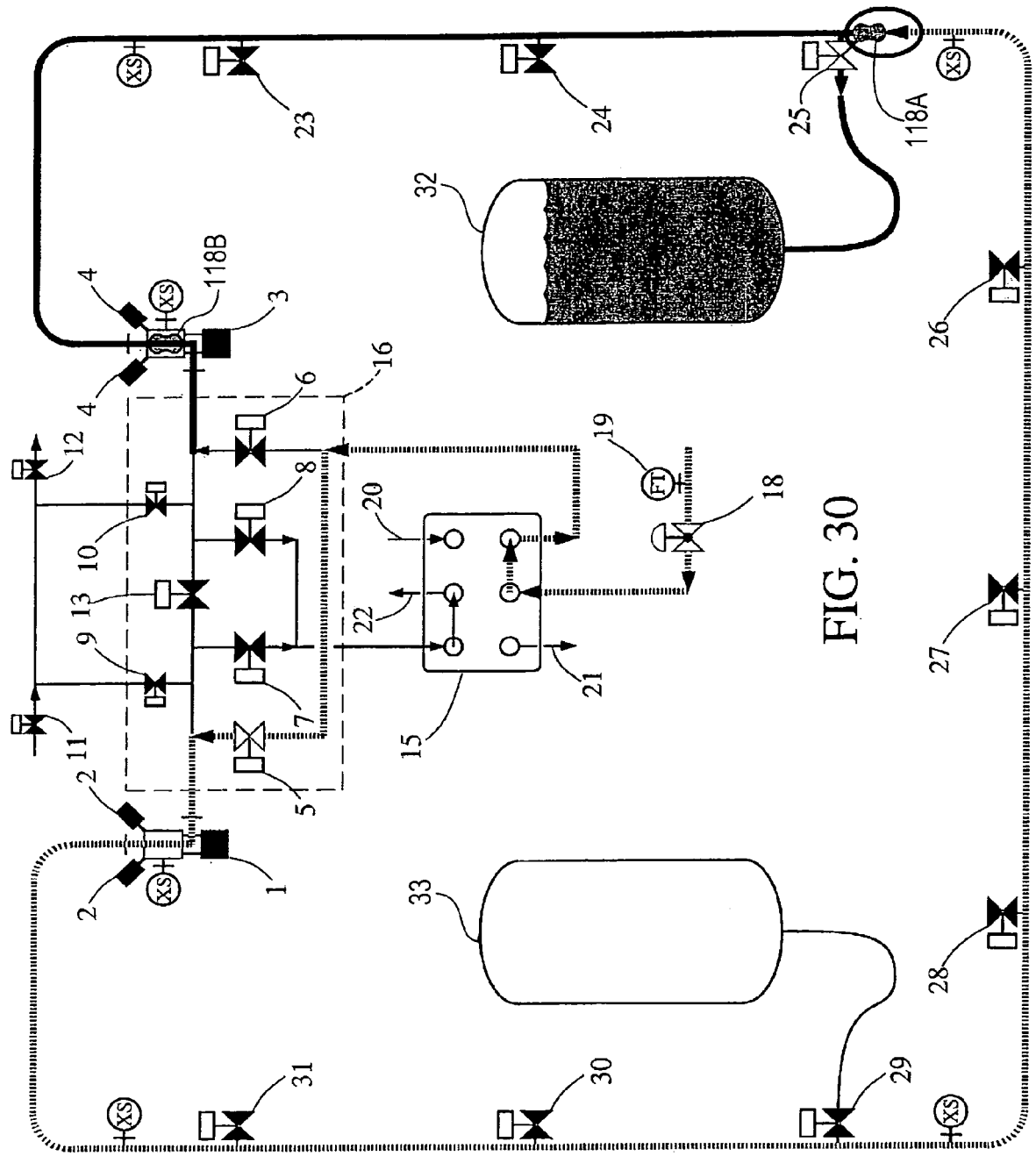

As illustrated in FIG. 30, by metering the total volume of rinse liquid introduced at valve 18, pig 118A is stopped just short of the reducing tee and node 116 which are associated with valve 25 and tank 32.

Figure 31:
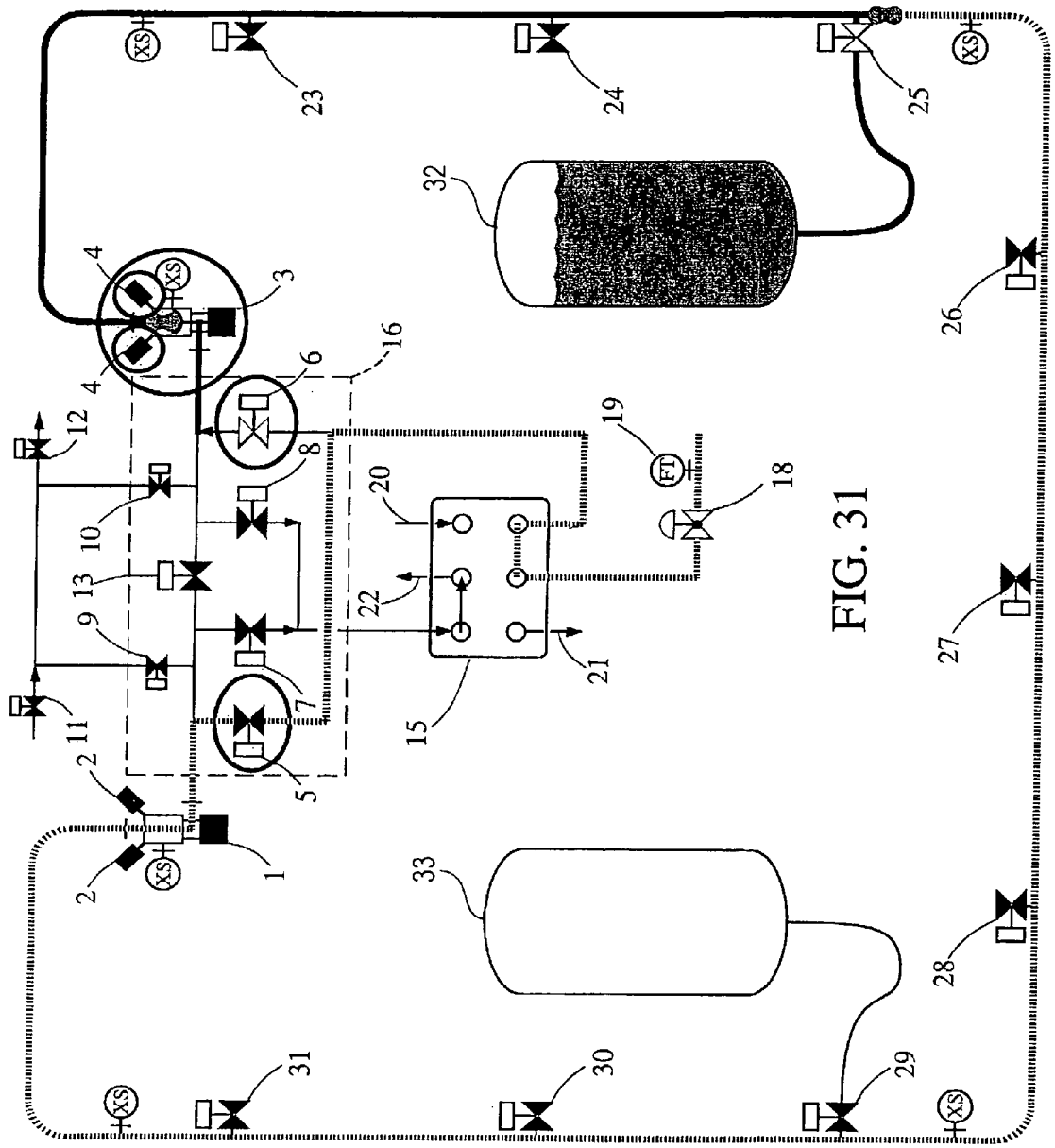

Referring now to FIG. 31, left manifold fill valve 5 is closed and right manifold fill valve 6 is opened. Retaining pins 4 in right pig launcher 3 are retracted and pig 118B is mechanically pushed out of pig launcher 3 and into manifold 114.

Figure 32:
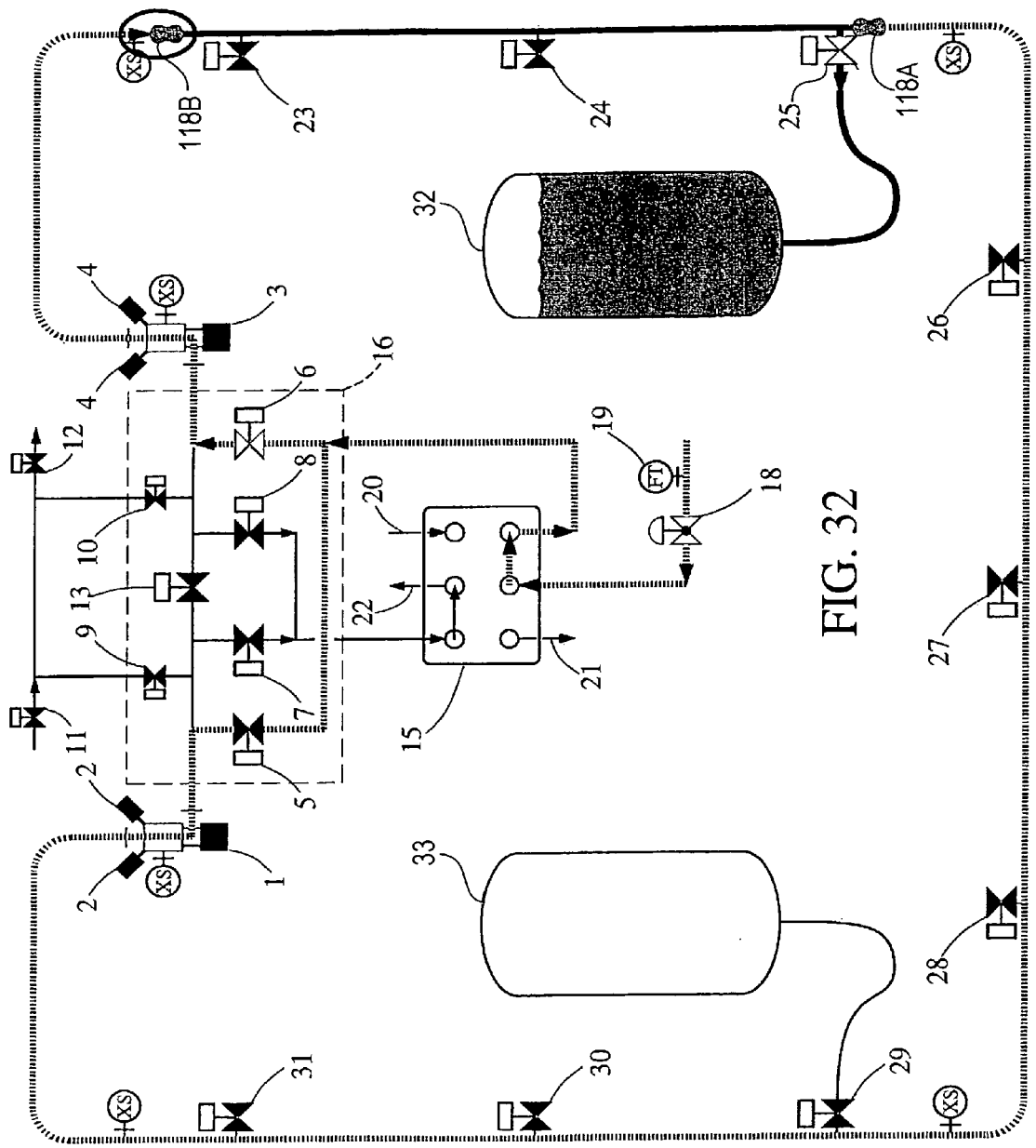

Referring to FIG. 32, rinse liquid is released by rinse control valve 18 into the manifold, pushing pig 118B from launcher 3 in a clockwise direction around the right side of manifold 114. As pig 118B advances, the pig pushes product liquid which originated in tank 33 ahead of the pig, through valve 25 and into tank 32. Pig 118A is held in place adjacent valve 25 by the incompressible rinse liquid which is now trapped between pig 118A and valves 5, 7, 9, and 13.

Figure 33:
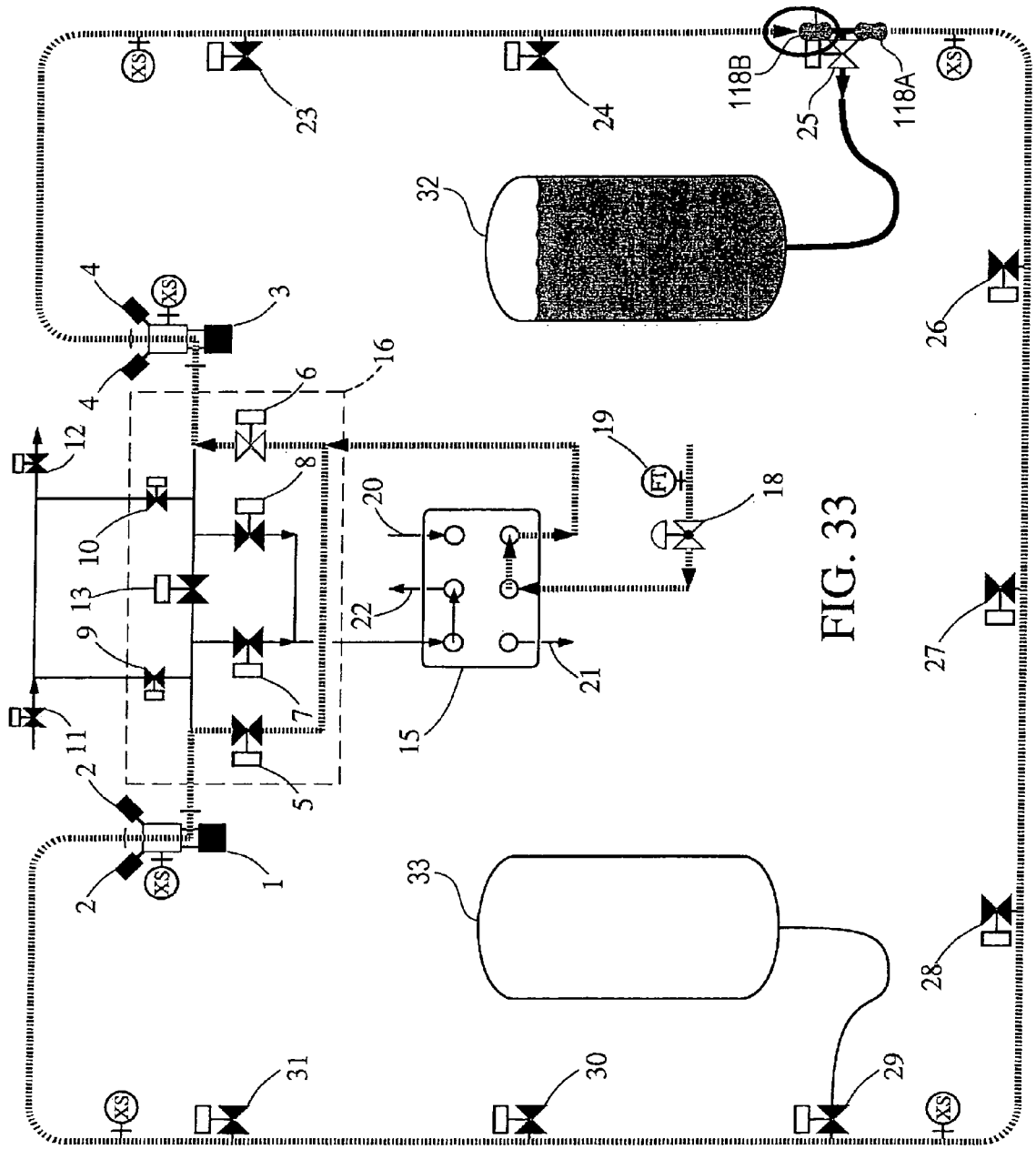

Referring to FIG. 33, by metering the total volume of rinse liquid, e.g. using flow control meter 19, pig 118B is stopped just short of the node 116 which is associated with valve 25 and tank 32, whereby pig 118B is closely adjacent pig 118A. At this stage of the process, pigs 118A and 118B are generally positioned quite close to each other and on opposing sides of the conduit junction/node 116 which joins the endless loop of piping, through valve 25, to tank 32.

Figure 34:
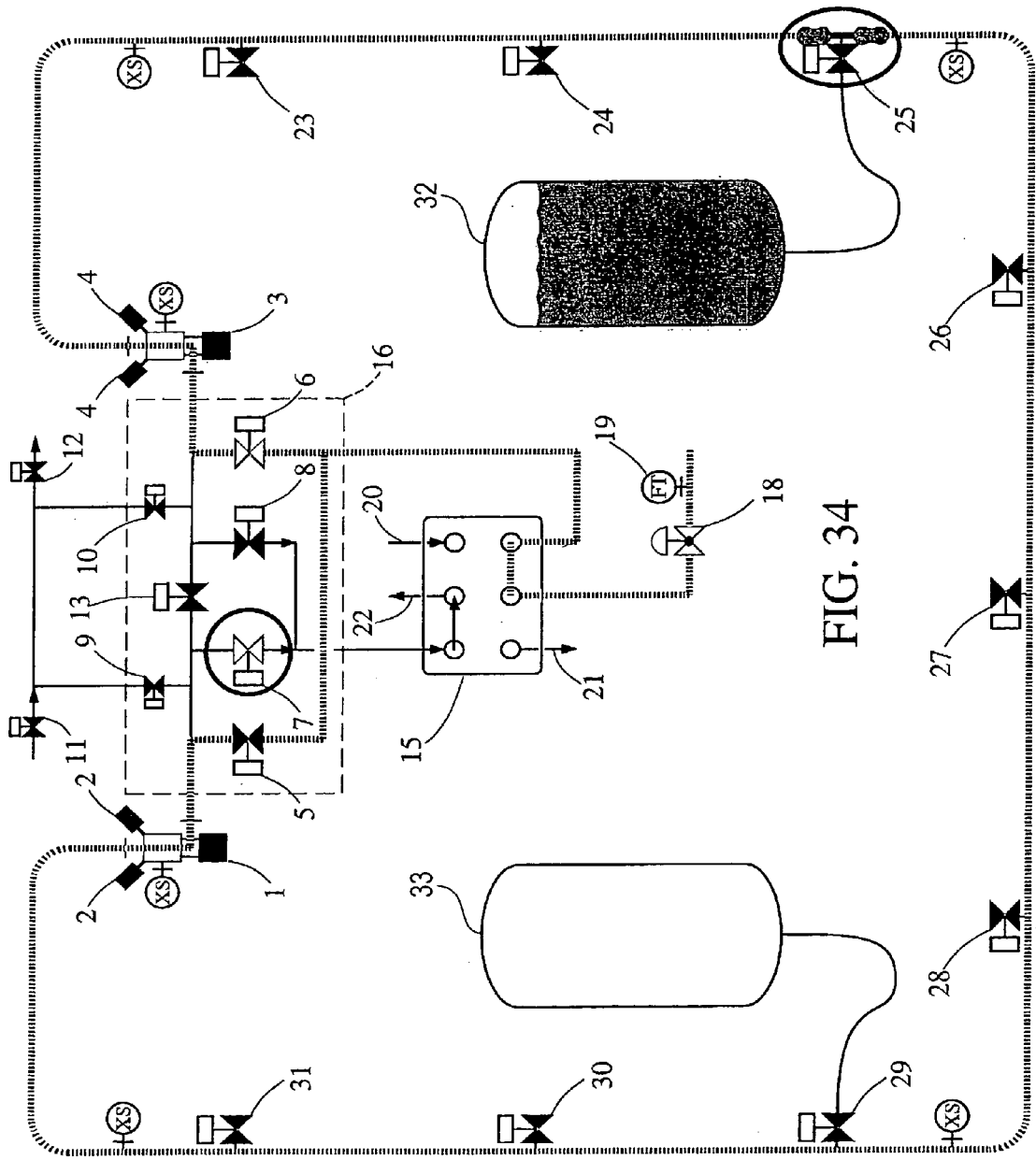

Referring to FIG. 34, once pig 118B has arrived at the respective position shown in FIG. 33, e.g. adjacent the respective junction of manifold 114 and the conduit which leads to valve 25, valve 25 is closed, isolating the liquid in tank 32 from the liquid in the manifold. Left header drain valve 7 is opened.

Figure 35:
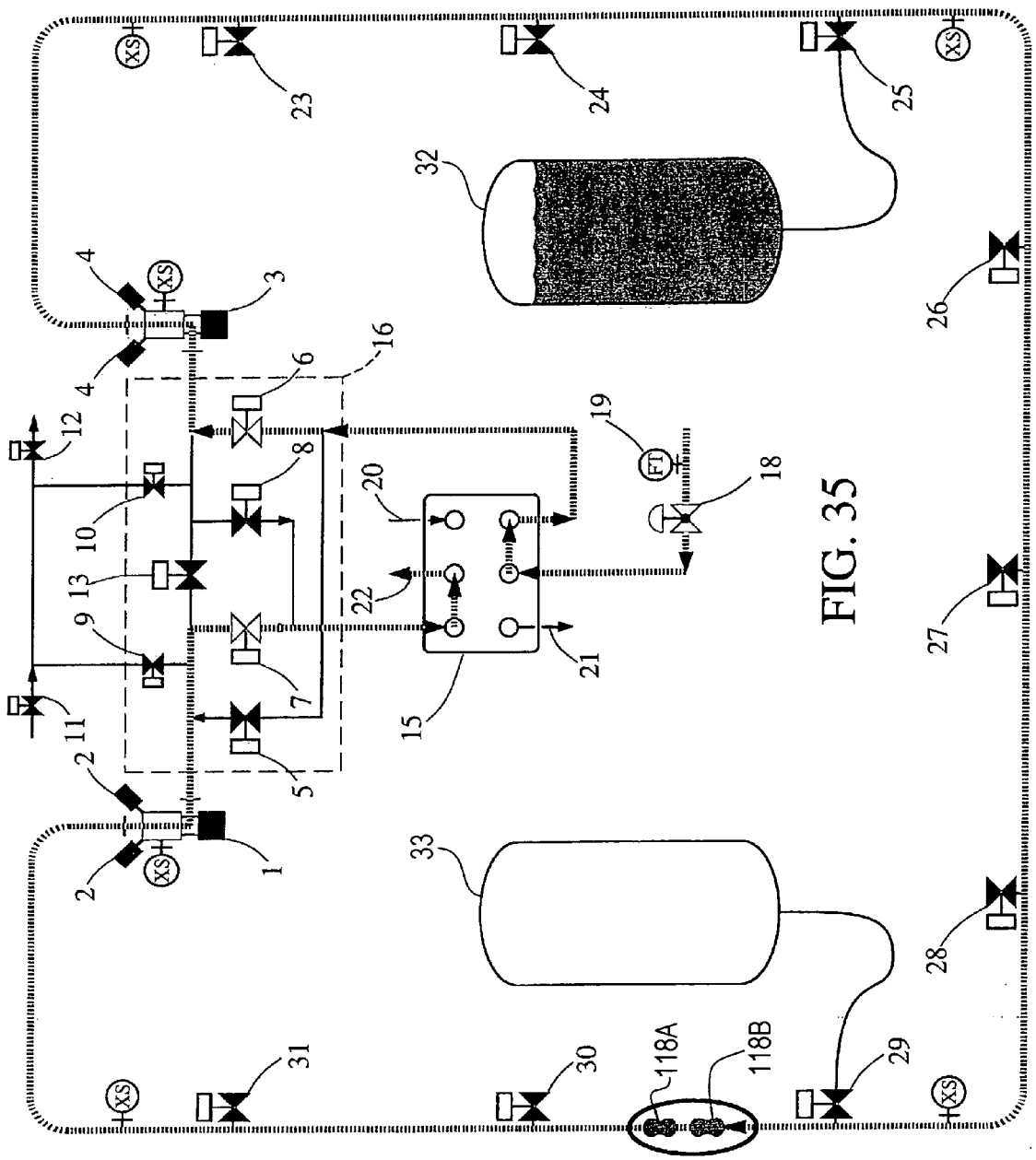

Referring to FIG. 35, additional rinse liquid enters the manifold system through rinse control valve 18, through valve 6, and thence up through the manifold, including through pig launcher 3. As the additional rinse liquid flows into manifold 114, the rinse liquid pushes both pigs 118A and 118B in a clockwise direction about the manifold toward pig launcher 1. As the pigs move toward pig launcher 1, rinse liquid is emptied from the manifold ahead of the pigs, and out of the system at drain 22.

Figure 36:
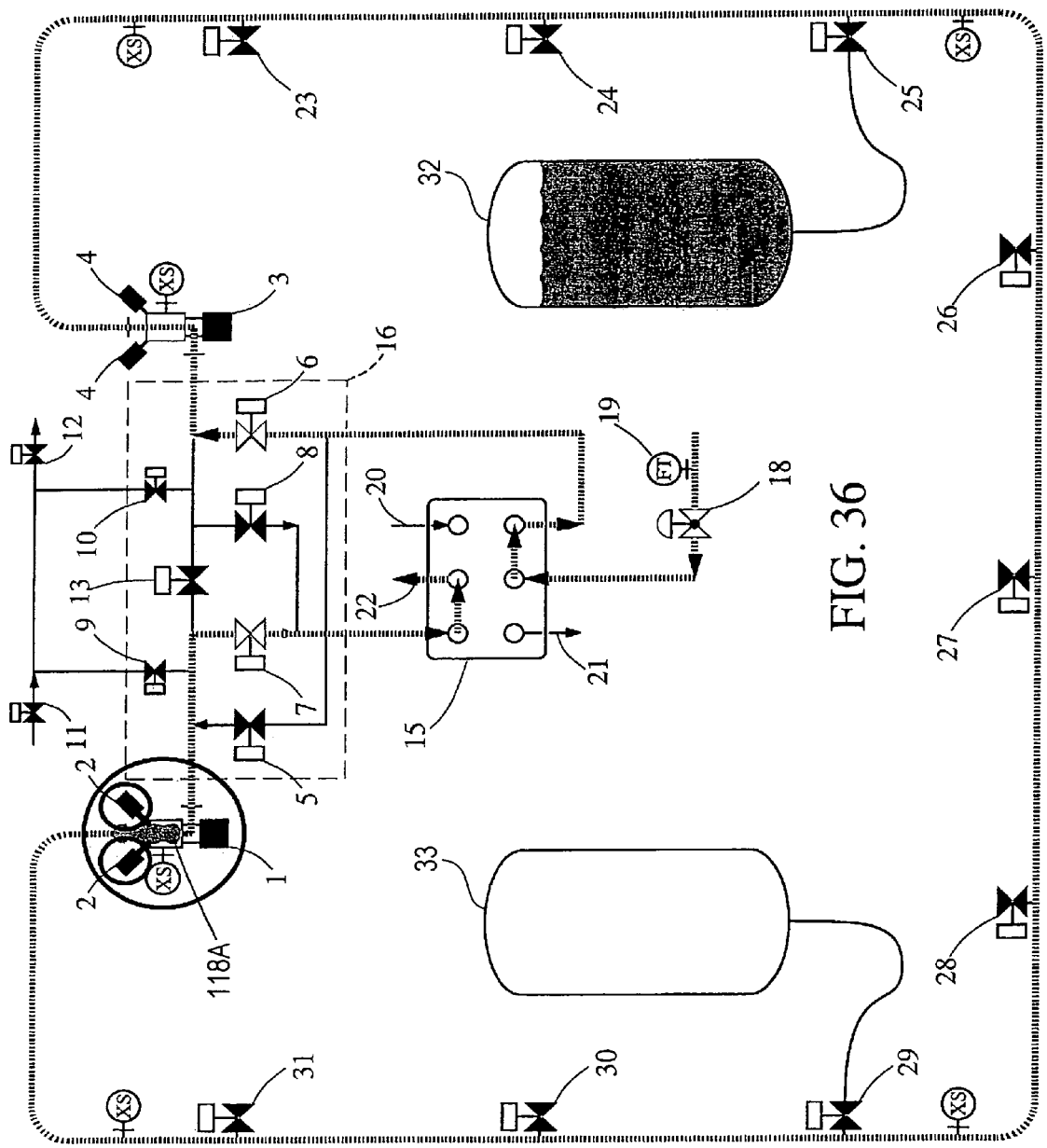

Turning now to FIG. 36, as the pigs approach pig launcher 1, pig 118A is pushed into pig launcher 1. Retaining pins 2 are inserted into pig launcher 1, catching and retaining pig 118A in pig launcher 1. Pig 118B remains outside pig launcher 1, typically above pig launcher 1, depending on the orientation of the pig launcher.

Figure 37:
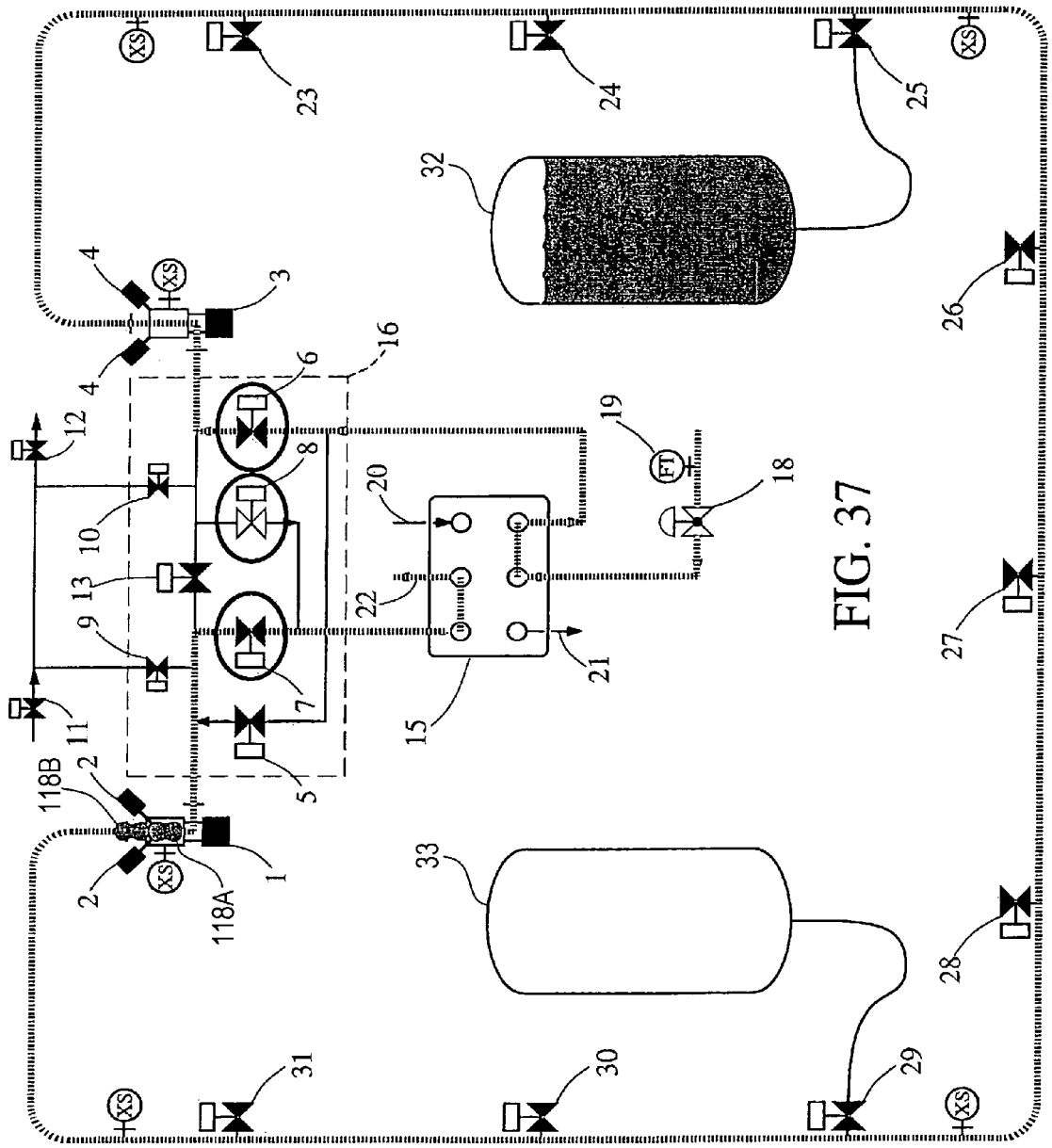

Referring to FIG. 37, once pig 118A has been captured in pig launcher 1, right manifold fill valve 6 is closed, left manifold drain valve 7 is closed, and right manifold drain valve 8 is opened.

Figure 38:
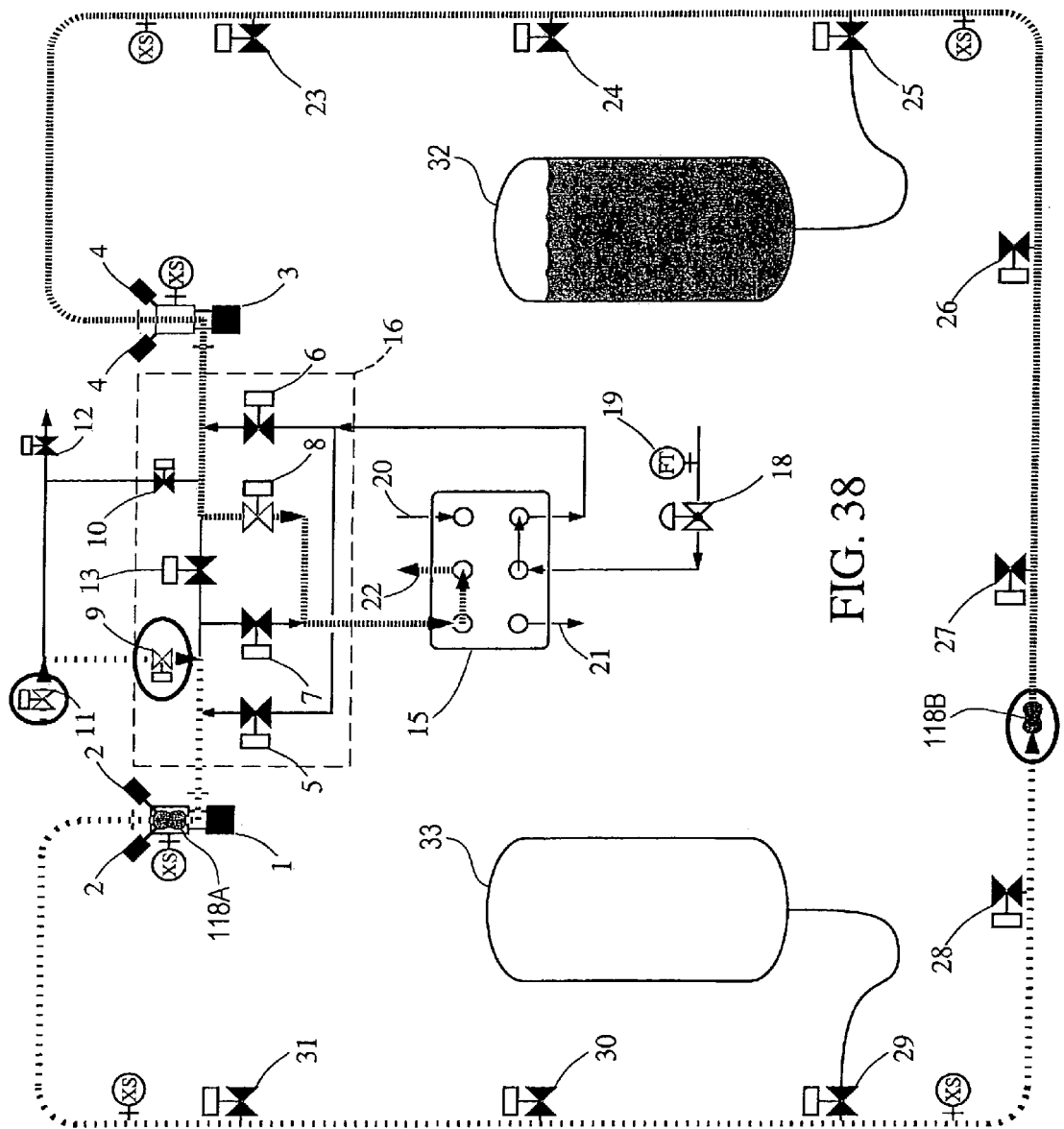

Now referring to FIG. 38, left manifold purge valve 9 is opened, and compressed air supply valve 11 is opened. As compressed air enters the system, pig 118B is pushed in a counterclockwise direction around manifold 114, pushing rinse liquid ahead of the pig and out of the manifold through drain valve 8 to drain 22.

Figure 39:
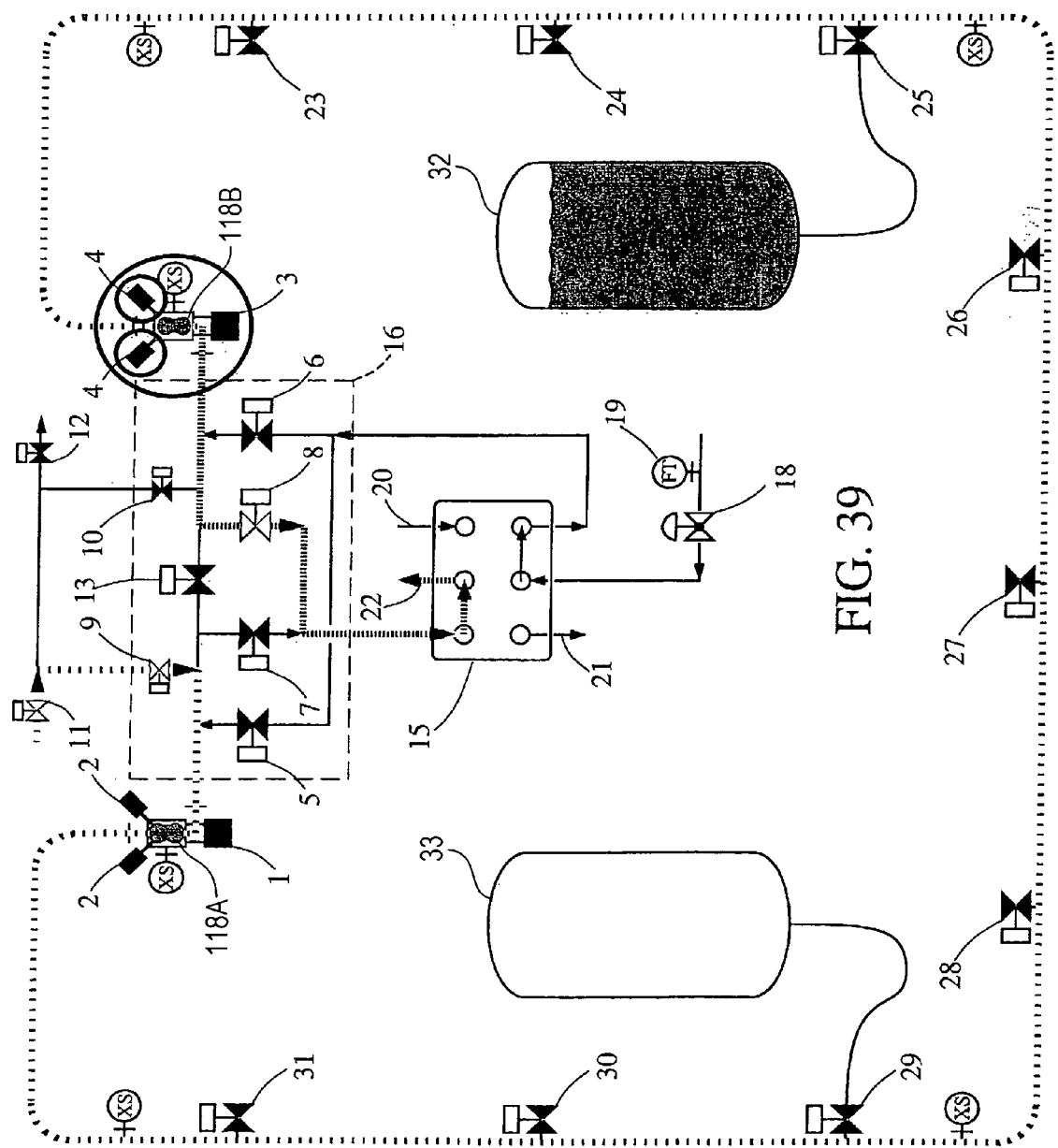

Referring to FIG. 39, the compressed air pushes pig 118B toward and into right pig launcher 3. Once pig 118B has arrived in pig launcher 3, retaining pins 4 are inserted into the retaining chamber of the pig launcher, so as to capture, trap, and retain pig 118B in pig launcher 3. Additional compressed air continues to flow through and past pig launcher 3, through drain valve 8 and out through drain 22. Such movement of compressed air from pig launcher 3 through valve 8 and out at drain 22 pushes additional rinse liquid from the respective conduits, thereby to further clean and empty that portion of liquid transport system 110. The extent of removal of cleaning liquid from the liquid carrier pipe between pig launcher 3 and drain 22 depends on the pressure and volume of air flowing through valve 11, as well as on the viscosity and other flow properties of the cleaning/rinse liquid and any residual product liquid which may reside in the respective liquid carrier pipe at that time, and on orientation of the corresponding elements of the piping between pig launcher 3 and drain 22.

Figure 40:
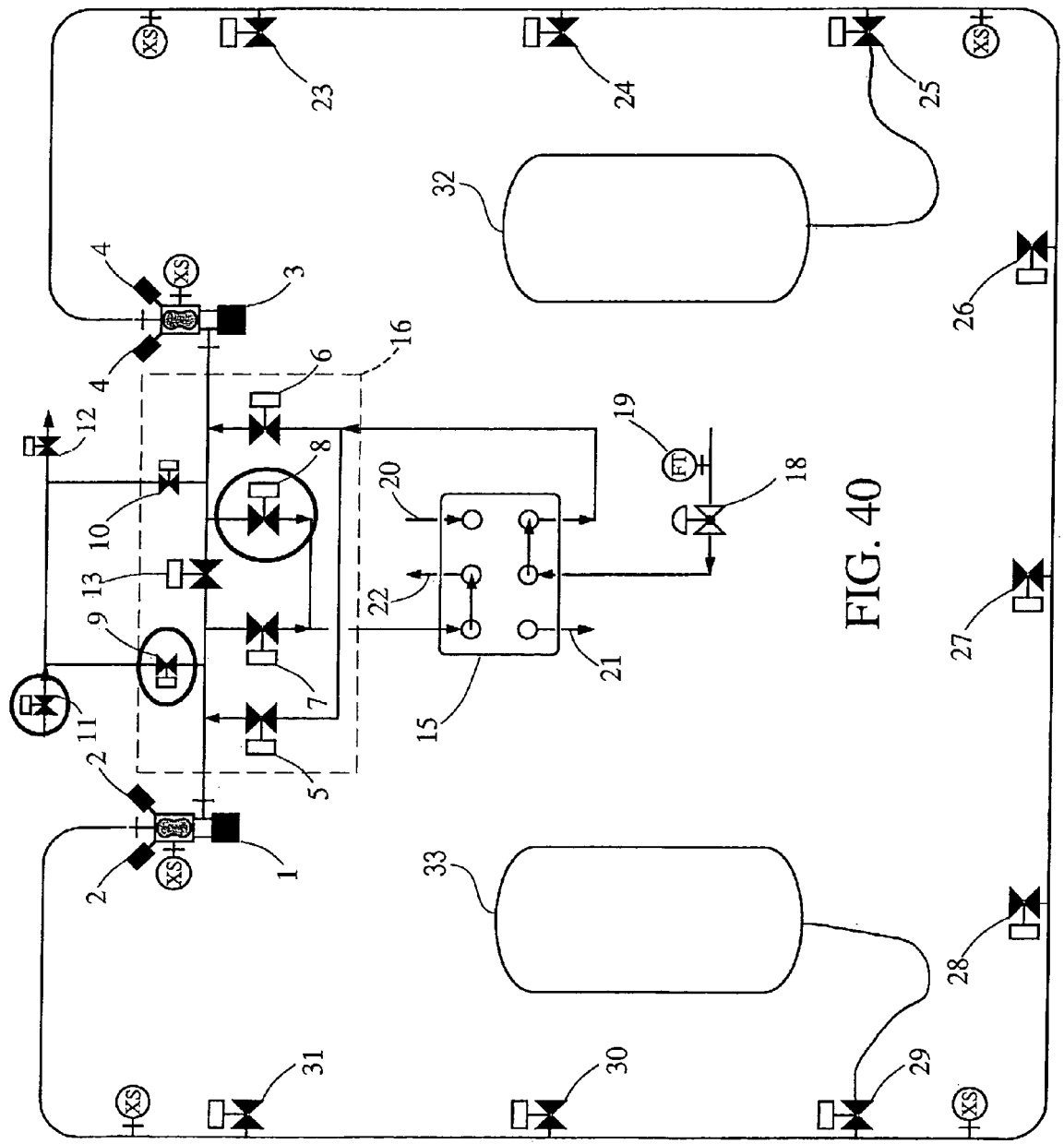

Referring to FIG. 40, left manifold purge valve 9 is closed, compressed air valve 11 is closed, and right manifold drain valve 8 is closed. The liquid transport system is now substantially clean and substantially empty, namely devoid of both product liquid and cleaning/rinse liquid, and is ready for another transfer of liquid.

The embodiment illustrated in FIGS. 41-45 is designed and configured to illustrate a clean-in-place system, and method of operating such clean-in-place system, which can clean in place a closed loop/endless pipe liquid transport system which is connected to a multiplicity of source and/or destination nodes, and which is otherwise designed and configured to transport and/or transfer liquid from a first node 116 in the liquid transport/transfer system to a second node in the system, such as the liquid transport systems illustrated in FIGS. 1-40. Such liquid transport system can be connected to a relatively large number of nodes/tanks, typically greater than 3 such source and/or destination tanks, thereby to use a single clean-in-place system to provide a clean-in-place capability to a relatively large number of tanks.

The embodiment illustrated in FIGS. 41-45 shows a single pig. Embodiments employing a second pig can be cleaned in substantially the same, or an obviously similar, manner.

Figure 41:
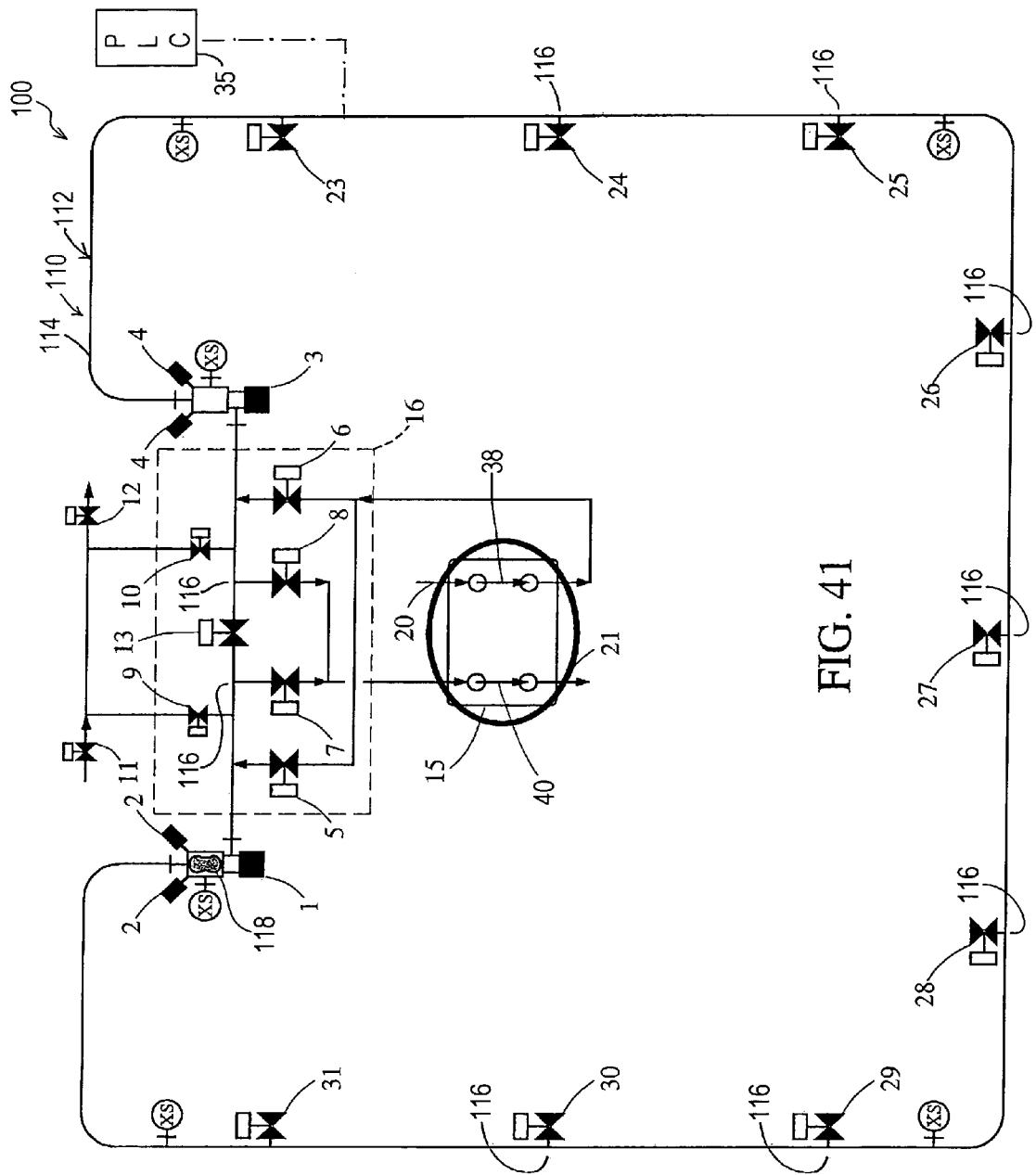
FIGS. 41-45 illustrate, in general, how the pigging systems of the invention can operate as clean-in-place piping systems.

Referring to FIG. 41, a first jumper pipe is connected on hook-up panel 15 between clean-in-place supply line 20 (CIPSL), and right and left manifold fill valves 5 and 6. A second jumper pipe is connected between clean-in-place return line 21 (CIPRL), and left and right manifold drain valves 7 and 8.

Figure 42:
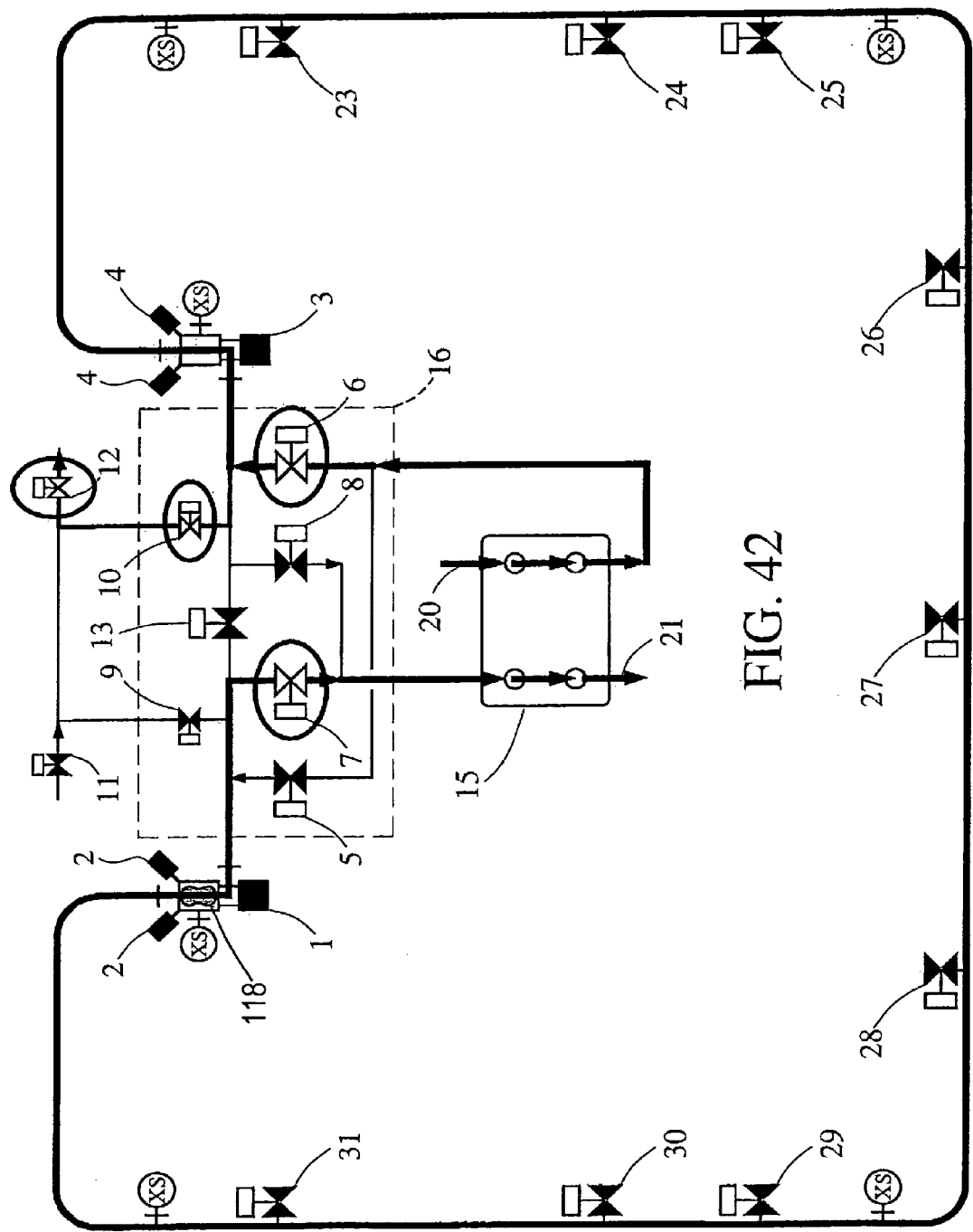

Turning now to FIG. 42, left manifold drain valve 7 is opened. Right manifold fill valve 6 is opened. Clean-in-place solution flows in at supply line 20, through valve 6, and around manifold 114 in a clockwise direction, including through both of pig launchers 1 and 3. Right manifold purge valve 10 and compressed air drain valve 12 are pulsed open for one or more short periods of time, enabling a small amount of clean-in-place liquid to flow through valves 10 and 12 and thence to a drain.

Figure 43:
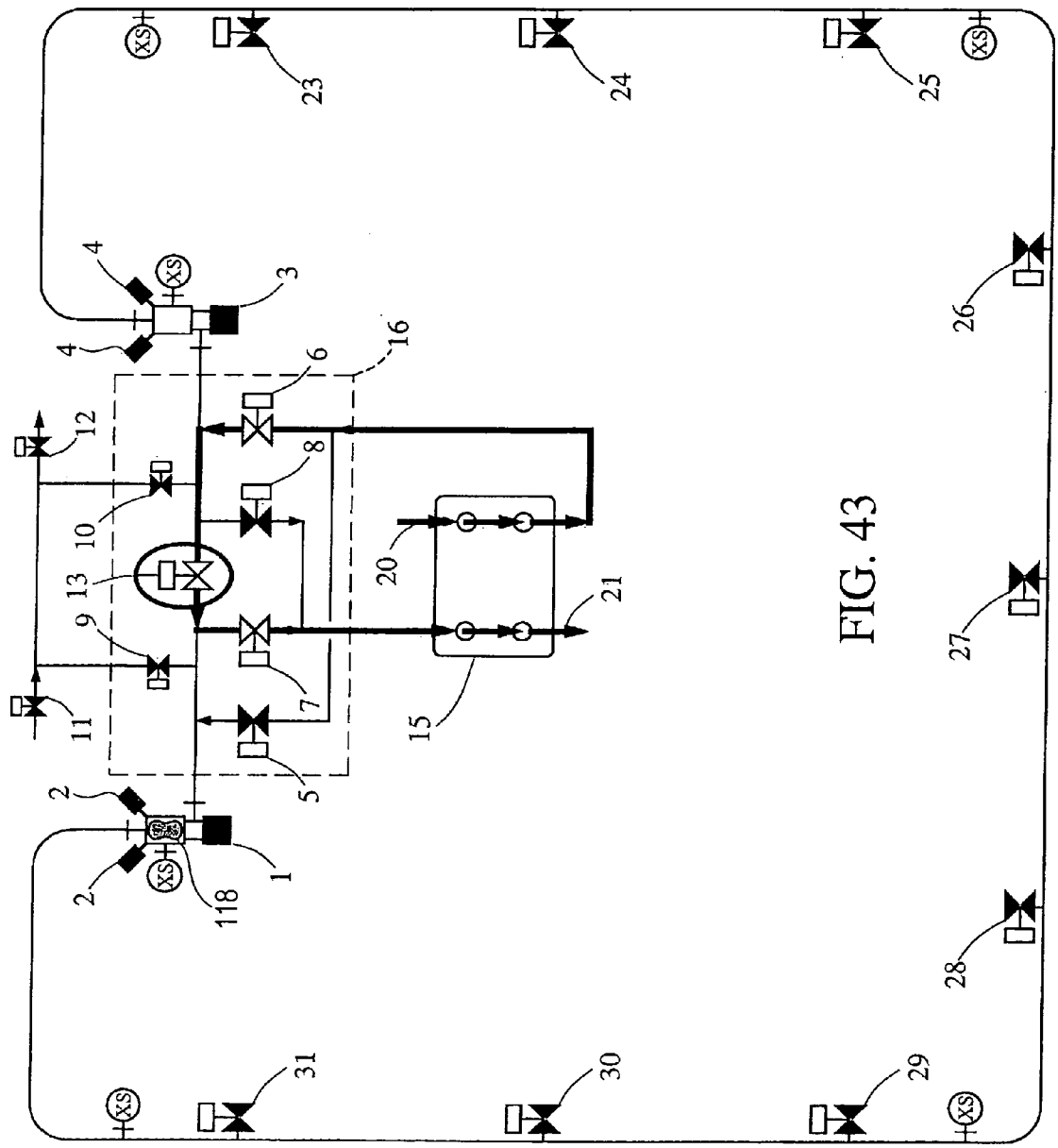

Turning to FIG. 43, manifold by-pass valve 13 is opened. Since there is less dynamic head in the flow path through valve 13 than around the entirety of manifold 114, the bulk of the cleaning liquid now flows through valve 13, with a relatively smaller flow, if any, in e.g. a clockwise direction around manifold 114. Thus, most if not all of the cleaning liquid now by-passes the manifold and flows through valve 13 and valve 7 to drain 21.

Figure 44:
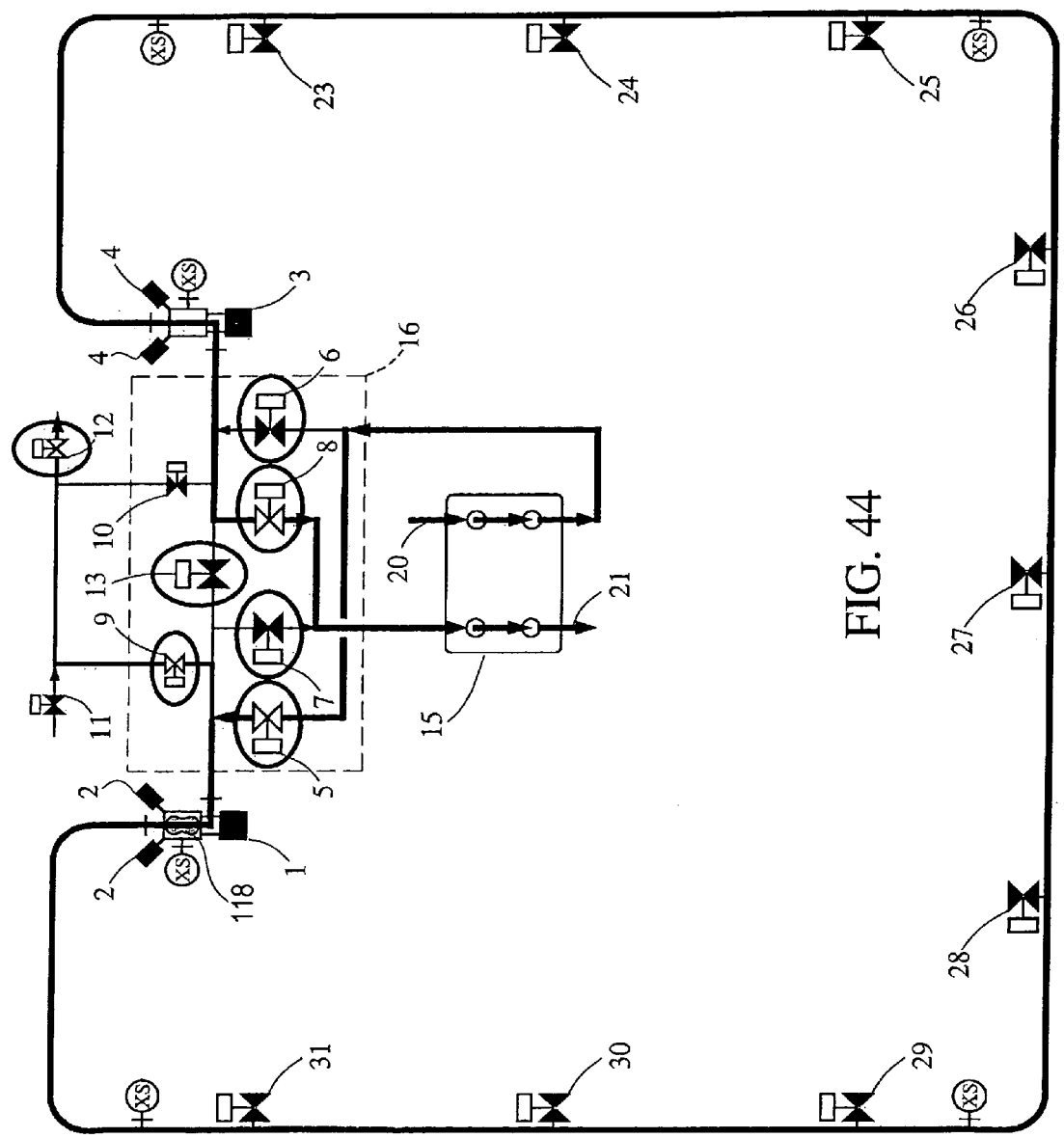

Referring to FIG. 44, right manifold drain valve 8 is opened. Then left manifold drain valve 7 is closed, and manifold by-pass valve 13 is closed. Then manifold fill valve 5 is opened. Finally, right manifold fill valve 6 is closed. Clean-in-place liquid flows from source 20, through valve 5, and into and through manifold 114 in a counterclockwise direction. Left manifold purge valve 9 and compressed air drain valve 12 are pulsed open for one or more short periods of time to enable a small amount of clean-in-place liquid to flow through valve 9 and thence through drain valve 12 to a drain.

Figure 45:
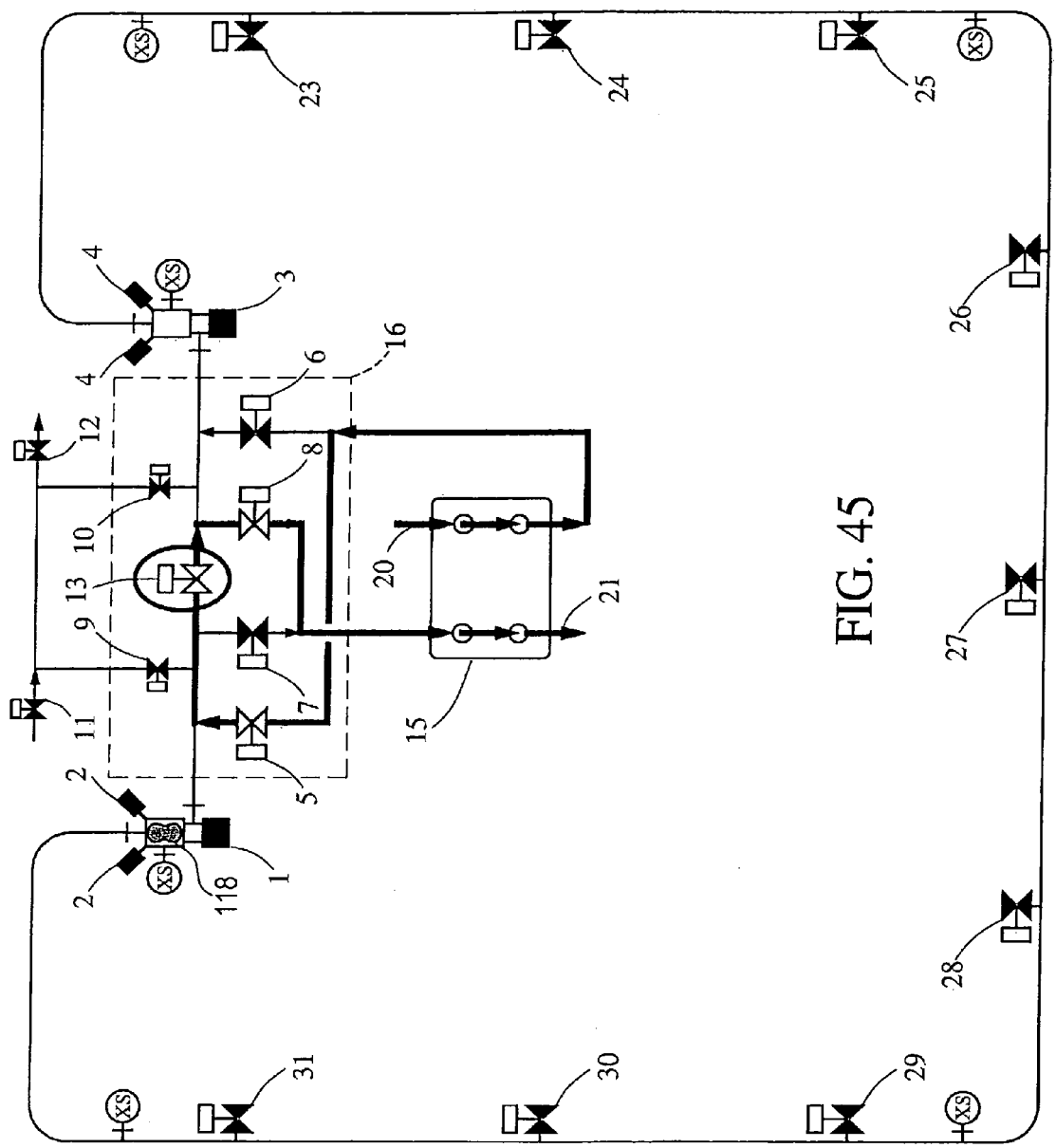

Referring to FIG. 45, manifold by-pass valve 13 is now opened. Since there is less dynamic head in the flow path through valve 13 than around the entirety of manifold 114, the bulk of the cleaning liquid now flows through valve 13, with a relatively smaller flow, if any, in e.g. a counterclockwise direction around manifold 114. Thus, most if not all of the cleaning liquid now by-passes the manifold and flows through valve 13 and valve 8 to drain 21.

The steps illustrated in FIGS. 42-45 can be repeated as many times as required in order to achieve the desired degree of cleaning in liquid transport system 110.

As illustrated above, the basic concept of the invention is to connect a plurality of tanks/access points, referred to herein generally as nodes, to an endless loop of piping such that liquid flowing in the system to move the liquid from a first node to a second node, flows typically in two generally separate paths, channels, from a source node to a destination node. In general, any node can facilitate a connection to either a supply source/tank or a destination receiver/tank. Further, a source tank in a first liquid transfer can act as a destination tank in a subsequent liquid transfer. Similarly, a destination tank in a first liquid transfer can act as a source tank in a subsequent liquid transfer.

A single pigging system can be used to clean substantially the entirety of the liquid transport system among all tanks, except for leads from the endless loop to the tanks. The liquid transport system can be cleaned in place, thus to clean all of the piping which runs between the respective nodes in endless loop piping manifold 114.

As used herein, a source/receptacle can be a local tank, or can be a remote reservoir or other source of liquid wherein the liquid can be delivered to manifold 114 through any selected node 116, at a desired time. Similarly, a destination/receptacle can be a local tank, or can be a remote reservoir or other destination receiver which can receive liquid from the manifold through any selected node 116, at a desired time.

Any such tank, as connected to any node 116, can be a portable tank such as tank 34 on truck 36, or can be a fixed-in-place tank such as tank 32.

At least two of the nodes 116 are associated with the manifold 114 at loci along the path of travel of one or more of pigs 118, e.g. pigged portion, through the manifold. One or more nodes 116 can be associated with the manifold at a locus which is not along the path of travel of any pig in the manifold e.g. non-pigged portion of the manifold. Exemplary such nodes 116 are illustrated adjacent valve 13 in e.g. FIG. 1.

In a first set of implementations of the invention, manifold 114 is confined to a single industrial facility such as a manufacturing facility or a warehousing facility, and all nodes which are associated with a source receptacle or a destination receptacle are connected to local tanks which are located relatively closely adjacent a manifold node 116. Accordingly, in such implementation, any distance between a node 116 and the respective tank, and any volume of liquid which might be trapped or otherwise retained in the flow conduit between such node and such tank, is de minimis and can typically be ignored for purposes of maintaining quality of the liquids being handled in transport system 110.

While the description herein has illustrated transfer of product liquid, from e.g. a product source structure to a product destination structure, the invention can be employed to transfer any liquid having sufficient value to justify the cost of the transfer. Thus, there can be mentioned, as additional transfer candidate liquids, raw materials, intermediates and/or partially processed and/or partially finished liquids, processing liquids, and the like, all of which are included in the claims which follow in recitations of product and/or liquid and/or product source structure and/or product destination structure.

Those skilled in the art will now see that certain modifications can be made to the apparatus and methods herein disclosed with respect to the illustrated embodiments, without departing from the spirit of the instant invention.

And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A liquid transport system, comprising:
    (a) a pipeline defining a closed loop fluid transfer path wherein a transfer fluid can be caused to flow, from a starting location, to a destination location;
    (b) at least first and second transfer fluid source/destination nodes disposed along the fluid transfer path, a separate joining conduit joining each said transfer fluid source/destination node to a liquid source/destination;
    (c) first and second pig launchers operatively connected to said fluid transfer path such that said first and second pig launchers are always in the fluid transfer path;
    (d) at least one pig operative with said pig launchers and wherein said at least one pig can be moved along the fluid transfer path between said first and second pig launchers thereby to remove such transfer fluid from such fluid transfer path; and
    (e) one of said source/destination nodes being connectable to both a source/destination and to a non-product liquid supply, through a hook-up panel.

2. A liquid transport system as in claim 1 wherein said at least one pig, while in one of said first and second pig launchers, is in said closed loop fluid transfer path such that a stream of such transfer fluid, flowing from a first said transfer fluid source/destination node to a second said transfer fluid source/destination node, flows through said one pig launcher and past said at least one pig in the respective said one pig launcher while the respective said pig is being retained in the respective said pig launcher.

3. A liquid transport system as in claim 1, said fluid transfer path comprising an endless loop of piping, and wherein a transfer fluid flowing from a first transfer fluid source/destination node to a second transfer fluid source/destination node, moves simultaneously as first and second different transfer fluid flow streams traversing first and second respective different portions of said endless loop of piping.

4. A liquid transport system as in claim 3 wherein transfer fluid flowing through said endless loop of piping can flow through a said pig launcher, and past the respective said pig while said pig is disposed in the respective said pig launcher.

5. A liquid transport system as in claim 3, said liquid transport system further comprising a clean-in-place cleaning system, adapted to clean substantially an entirety of the endless loop of piping.

6. A liquid transport system as in claim 5, said cleaning system including at least one of a compressed gas inlet and said non-product liquid supply.

7. A liquid transport system as in claim 6 wherein at least one of said at least one of a compressed gas inlet and a cleaning liquid inlet is connected to said closed loop pipeline through a said node which is also a connection locus into said closed loop pipeline for at least one product source/destination tank.

8. A liquid transport system as in claim 1 wherein a transfer fluid flowing from a first said transfer fluid source/destination node to a second said transfer fluid source/destination node flows along first and second different paths so as to approach said second transfer fluid source/destination node from at least two different directions.

9. A liquid transport system as in claim 1, said first pig launcher being configured in said liquid transport system to release a first said pig for pigging movement through said pipeline in a first direction, said second pig launcher being adapted to release a second said pig for pigging movement through said pipeline in a second opposite direction such that the first and second pigs pass through two different portions of the pipeline.

10. A liquid transport system, comprising:
(a) a closed loop pipeline defining an endless loop fluid transfer path-wherein a transfer fluid can be caused to flow, from a starting location, in a single direction through the closed loop pipeline along the fluid transfer path, back to the starting location;
(b) first and second pig launchers operatively connected to the fluid transfer path;
(c) at least first and second discrete transfer fluid source/destination nodes disposed along the fluid transfer path, including at least one said node which can function as a source node and at least one said node which can function as a destination node, each said transfer fluid source/destination node being associated with a corresponding joining conduit;
(d) first and second pigs operative with said pig launchers such that said first pig can be moved in a first direction along the fluid transfer path and said second pig can be moved in a second direction along the transfer path opposed to the direction in which said first pig has moved; and
(e) flow control apparatus effective to stop movement of said first and second pigs on opposing sides of, and proximate, a common said joining conduit.

11. A liquid transport system as in claim 10, said closed loop pipeline being adapted and configured to define a first pigged portion of said endless loop fluid transfer path which can be traversed by such pigs as launched from said first and second pig launchers, and a second non-pigged portion of said fluid transfer path which cannot be traversed by such pigs, and further comprising at least a third said transfer fluid source/destination node, said at least first, second, and third transfer fluid source/destination nodes connecting said closed loop pipeline to respective first, second, and third receptacles, at least one of said first, second, and third transfer fluid source/destination nodes being disposed in said pigged portion of said endless loop fluid transfer path, and at least one of said first, second, and third transfer fluid source/destination nodes being disposed outside said pigged portion of said endless loop fluid transfer path.

12. A liquid transport system as in claim 10, further comprising a clean-in-place cleaning system, adapted and configured to clean substantially all product liquid from said closed loop pipeline.

13. A liquid transport system as in claim 12, said clean-in-place system including at least one of a compressed gas inlet and a non-product liquid inlet.

14. A liquid transport system as in claim 10, said first pig launcher being configured in said liquid transport system to release a first said pig for movement through said closed loop pipeline in a first direction, said second pig launcher being adapted to release a second said pig for movement through said closed loop pipeline in a second opposite direction, said liquid transport system further comprising a pig-moving non-product liquid supply entering said closed loop pipeline at a location effective to move said first and second pigs in the respective first and second directions.

15. A liquid transport system as in claim 10 wherein said first and second pigs are in the fluid transfer path such that fluid transfer flow streams flowing from a first said product source/destination node to a second said product source/destination node, flow around substantially an entire outer surface of at least a first or second said pig.

16. A liquid transport system as in claim 10 wherein transfer fluid flowing through said closed loop pipeline can flow through a said pig launcher while a said pig is disposed in the respective said pig launcher.

17. A liquid transport system as in claim 10, said liquid transfer system further comprising a clean-in-place cleaning system, adapted to clean substantially an entirety of the closed loop pipeline.

18. A liquid transport system as in claim 10 wherein said flow control apparatus comprises a liquid metering device.

19. A liquid transport system as in claim 10 wherein said flow control apparatus comprises at least one proximity sensor disposed proximate at least one of said transfer fluid source/destination nodes.

20. A liquid transport system as in claim 10 wherein said flow control apparatus comprises at least one proximity sensor disposed proximate at least one of said product source/destination nodes, in combination with a liquid metering device.

21. A liquid transport system as in claim 10 wherein movement of said first pig can be stopped, and said first pig can be held stationary while said second pig is moved along the fluid transfer path.

22. A liquid transport system, comprising:
(a) a closed loop pipeline, an endless loop fluid transfer path being defined in said closed loop pipeline, and wherein a transfer fluid can be caused to flow, from a starting location, in a single direction through the closed loop pipeline along the fluid transfer path, back to the starting location;
(b) first and second pig launchers operative to launch one or more pigs into said closed loop pipeline;
(c) at least a first pig in said closed loop pipeline;
(d) a plurality of transfer fluid source/destination nodes in said closed loop pipeline defining segments of the fluid transfer path between respective ones of said source/destination nodes;
(e) node control valves disposed at or adjacent said transfer fluid source/destination nodes, said node control valves being outside said closed loop pipeline such that transfer fluid flowing through said closed loop pipeline does not flow through said node control valves; and
(f) no more than one of the fluid transfer segments having a segment control valve which can control flow of transfer fluid through the respective segment of the fluid transfer path, such that such transfer fluid can be caused to flow, from such starting location, in a single direction through said closed loop pipeline along the fluid transfer path, back to the starting location in said closed loop pipeline while traversing no more than one such valving-controlled segment of the fluid transfer path.

23. A liquid transport system as in claim 22, a joining conduit being disposed at each said source/destination node, in fluid communication with said closed loop pipeline, and wherein a node control valve is disposed at or adjacent each said node and is adapted to control liquid flow in a respective said joining conduit.

24. A liquid transport system as in claim 22, one said node, which is connected to at least one such source structure/receptacle and/or one such destination structure/receptacle, being disposed between said first and second pig launchers, said first and second pig launchers collectively being disposed between said one node and the remaining said nodes.

25. A liquid transport system as in claim 24, said closed loop pipeline being adapted and configured to define a first pigged portion of said closed loop pipeline, devoid of said one node, and which can be traversed by said pigs as launched from said first and second pig launchers and a second non-pigged portion of said closed loop pipeline, associated with said one node, and which cannot be traversed by said pigs, said liquid transport system further comprising a clean-in-place cleaning system, adapted to clean substantially all of said closed loop pipeline which is commonly traversed by such transfer fluids when such transfer fluids are being transported through said liquid transport system to and from different ones of said nodes, said cleaning system being disposed in, and operating from, said non-pigged portion of said closed loop pipeline.

26. A liquid transport system as in claim 22, said first pig launcher being configured in said liquid transport system to release a first said pig for movement through said closed loop pipeline in a first direction, said second pig launcher being adapted to release a second said pig for movement through said closed loop pipeline in a second opposite direction, said liquid transport system further comprising a pig-moving non-product liquid supply entering said closed loop pipeline at a location effective to move said first and second pigs in the respective first and second directions.

27. A liquid transport system as in claim 22 wherein at least one of said first and second pigs is in the fluid transfer path such that liquid flow streams flowing from a first said fluid transfer source/destination node to a second fluid transfer source/destination node, flows past the respective said pig while the respective said pig is being retained in the respective said pig launcher.

28. A liquid transport system, comprising:
(a) a closed loop pipeline defining an endless fluid transfer path wherein a product liquid can be caused to flow, from a starting location, in a single direction through the closed loop pipeline, back to the starting location;
(b) first and second pig launchers operatively connected to the fluid transfer path;
(c) first and second pigs in said closed loop pipeline; and
(d) at least first and second transfer fluid source/destination nodes in said closed loop pipeline,
said fluid transfer path being configured so as to accommodate at least one of said first and second pigs being disposed in the fluid transfer path while product liquid is being transferred from a first one of said transfer fluid source/destination nodes, through one of said pig launchers, to a second one of said transfer fluid source/destination nodes, such that a liquid flow stream, flowing from the first one of said transfer fluid source/destination nodes, through the respective said first or second pig launcher, to the second one of said transfer fluid source/destination nodes, flows through the respective said first or second pig launcher and past the respective said first or second pig while the respective said pig is being retained in the respective said first or second pig launcher.

29. A liquid transport system as in claim 28, further comprising a third transfer fluid source/destination node, one said transfer fluid source/destination node being connected to at least one source/receptacle structure and/or destination/receptacle structure, said one transfer fluid source/destination node being disposed between said first and second pig launchers, said first and second pig launchers collectively being disposed between said one transfer fluid source/destination node and the remaining said transfer fluid source/destination nodes.

30. A liquid transport system as in claim 29, said closed loop pipeline being adapted and configured to define a first pigged portion of said closed loop pipeline which can be traversed by said pigs as launched from said first and second pig launchers and a second non-pigged portion of said closed loop pipeline which cannot be traversed by said pigs, said liquid transport system further comprising a clean-in-place cleaning system, adapted to clean substantially all of said closed loop pipeline, said cleaning system being disposed in, and operating through, said non-pigged portion of said closed loop pipeline.

31. A liquid transport system as in claim 29, said pig launchers and said closed loop pipeline being configured such that transfer fluid can flow from a first said source/destination node, through at least one of said first and second pig launchers, to a second said source/destination node while at least one of said first and second pigs is disposed in the respective at least one of said first and second pig launchers.

32. A liquid transport system as in claim 28, said first pig launcher being configured in said liquid transport system to release a first said pig for movement through said closed loop pipeline in a first direction, said second pig launcher being adapted to release a second said pig for movement through said closed loop pipeline in a second opposite direction, said liquid transport system further comprising a pig-moving non-product liquid supply entering said closed loop pipeline at a location effective to move said first and second pigs in the respective first and second directions.

33. A liquid transport system as in claim 28 wherein fluid flowing through said closed loop pipeline can flow through a said pig launcher while the respective said pig is disposed in the respective said pig launcher.

34. A method of transferring transfer fluid through a liquid handling system from a transfer fluid source, to a transfer fluid destination in a pipeline, the liquid handling system comprising first and second pig launchers operative to launch first and second pigs into the pipeline, the transfer fluid source and the transfer fluid destination having access to the pipeline through respective first and second nodes in the pipeline, the transfer fluid source being connected to the pipeline through a first such node, the transfer fluid destination being connected to the pipeline through a second such node, the method comprising:
(a) transferring transfer fluid from the transfer fluid source to the transfer fluid destination through the pipeline;
(b) terminating access from the transfer fluid source to the pipeline;
(c) launching the first pig from the first pig launcher toward the second node, and stopping the first pig proximate but not past the second node; and
(d) launching the second pig toward the second node, and stopping the second pig proximate both the second node and the first pig.

35. A method as in claim 34, further comprising traversing both the first pig and the second pig together toward the first pig launcher, capturing the first pig in the first pig launcher, traversing the second pig back to the second pig launcher, capturing the second pig in the second pig launcher, and introducing compressed gas into the pipeline and thereby removing cleaning liquid from the pipeline.

36. A method as in claim 34 wherein said pipeline is a closed loop pipeline which defines a fluid transfer path, the closed loop pipeline being adapted and configured to define a first pigged portion which can be traversed by such pigs as launched from the pig launchers, and a second non-pigged portion which cannot be traversed by the pigs, the transfer fluid destination being connected to the pigged portion and the transfer fluid source having access to the closed loop pipeline at a second locus in the closed loop pipeline, the transferring of the transfer fluid from the transfer fluid-source to the transfer fluid destination comprising the transfer fluid traversing the pigged portion of the closed loop pipeline.

37. A method as in claim 34 wherein said first pig traverses the closed loop pipeline and approaches the second node from a first direction, and wherein said second pig traverses the pipeline and approaches the second node from a second opposing direction.

38. A method as in claim 37 wherein the first and second pigs, after such traverse of the pipeline toward the second node, are in such pipeline, on opposing sides of, and proximate, the second node.

39. A liquid transport system as in claim 34, further comprising stopping movement of the first pig proximate the second node, and holding the first pig stationary proximate the second node while the second pig is moved along the fluid transfer path.

40. A method of transferring a defined quantity of transfer fluid through a liquid handling system from a transfer fluid source, through a closed loop pipeline, to a transfer fluid destination, the liquid handling system comprising first and second pig launchers, the transfer fluid source and the transfer fluid destination having access to the closed loop pipeline through a first node and a second node, the liquid product source being connected to the closed loop pipeline through the first node and through the second node, respectively the method comprising:
  (a) initiating a transfer of a defined quantity of a transfer fluid from the transfer fluid source, through the closed loop pipeline, to the transfer fluid destination, including concurrent flow of the transfer fluid along at least first and second separate and distinct flow paths in the closed loop pipeline, while a pig is being retained in one of the first and second pig launchers, in at least one of the separate and distinct flow paths, such that the transfer fluid flows past the respective pig while the pig is being retained in the respective pig launcher; and
  (b) completing the transfer of the defined quantity of transfer fluid from the transfer fluid source to the closed loop pipeline while the pig is being retained in the respective pig launcher.

41. A method as in claim 40, further comprising
  (b) terminating access from the transfer fluid source to the pipeline, which leaves an increment of the transfer fluid in the pipeline, and
  (c) after terminating access from the transfer fluid source to the pipeline, releasing a cleaning fluid into the pipeline and releasing the respective pig ahead of the cleaning fluid such that the pig separates the transfer fluid from the cleaning fluid and pushes the transfer fluid toward the transfer fluid destination.

42. A liquid transport system, comprising:
  (a) a closed loop pipeline defining an endless fluid transfer path wherein a product liquid can be caused to flow, from a starting location, in a single direction through the closed loop pipeline, back to the starting location;
  (b) first and second pig launchers operatively connected to the fluid transfer path;
  (c) a pig in said closed loop pipeline;
  (d) a plurality of source/destination nodes including at least a first source node in said closed loop pipeline, and at least a first destination node in said closed loop pipeline;
  (e) a compressed gas source in fluid communication with said closed loop pipeline; and
  (f) a valve, proximate each said source/destination node, and outside said closed loop pipeline,
said valves, in combination with additional flow control structure in said liquid transport system, and compressed gas from said compressed gas source, being adapted to deliver substantially all of a product liquid, which enters said closed loop pipeline through a said source/destination node, to a destination.

43. A method of transferring liquid product through a liquid handling system from a liquid product source along a transfer path, through a closed loop pipeline, to a liquid product destination, the liquid handling system comprising first and second pig launchers, the liquid product source and the liquid product destination having access to the closed loop pipeline through respective first and second nodes, the liquid product source being connected to the closed loop pipeline through a first such node, the liquid product destination being connected to the closed loop pipeline through a second such node, the method comprising
  transferring a specified quantity of liquid product from the liquid product source, into the closed loop pipeline at the first node, through the closed loop pipeline to the second node, and from the second node, out of the closed loop pipeline to the liquid product destination, including concurrent flow of the liquid product along at least first and second separate and distinct flow paths in the closed loop pipeline,
  upon having transferred the specified quantity of the liquid product into the closed loop pipeline, terminating transfer of the liquid product into the closed loop pipeline,
  subsequent to the termination of the transfer of such liquid product into the closed loop pipeline, and while the closed loop pipeline still contains a portion of such liquid product between the liquid product source and the liquid product destination, closing a flow control device and thus closing off flow of fluid at a location in the closed loop pipeline,
  after closing off the flow of fluid at the location in the closed loop pipeline, introducing a compressed gas into the closed loop pipeline adjacent the flow control device and between the flow control device and one of the pig launchers, which pig launcher has therein a pig, the compressed gas moving product liquid in the closed loop pipeline toward and through the respective pig launcher, such that the product liquid is all ahead of the pig in the closed loop pipeline,
  after the compressed gas has moved the product liquid through the pig launcher, launching the pig, and thus driving the product liquid ahead of the pig, in the closed loop pipeline,
  after launching the pig into the closed loop pipeline, using the compressed gas to move the pig, and the product liquid ahead of the pig, through the closed loop pipeline to the second pig launcher, after the pig has reached the second pig launcher, continuing to move the product liquid ahead of the compressed gas, past the pig launcher and out of the closed loop pipeline toward the product liquid destination, after the product liquid leaves the closed loop pipeline, continuing to feed the compressed gas along the transfer path to the liquid product destination, thereby delivering, to the liquid product destination, substantially all of the liquid product which was in the closed loop pipeline when transfer of the liquid product into the closed loop pipeline was terminated.

* * * * *

UNITED STATES PATENT AND TRADEMARK OFFICE
CERTIFICATE OF CORRECTION

PATENT NO. : 7,739,767 B2  Page 1 of 1
APPLICATION NO. : 11/588556
DATED : June 22, 2010
INVENTOR(S) : Tod R. Galoway It is certified that error appears in the above-identified patent and that said Letters Patent is hereby corrected as shown below:

IN THE DESCRIPTION OF THE ILLUSTRATED EMBODIMENTS:

In Column 5, Line 3, add a "," after the word "joining".
    [i.e., it should read, "...through a joining, e.g. product-carrying,..."]

In Column 5, Line 67, remove "34" and replace with "36".
    [i.e., it should read, "...valves 7, 8 and truck 36."]

In Column 7, Line 34, remove "34" and replace with "36".
    [i.e., it should read, "...thence into the tank on truck 36..."]

In Column 8, Line 1, remove "hoop-up" and replace with "hook-up",
    [i.e., it should read, "...thence to hook-up panel 15..."]

Signed and Sealed this

Twenty-fourth Day of August, 2010

David J. Kappos
*Director of the United States Patent and Trademark Office*